(12) United States Patent
Nose et al.

(10) Patent No.: US 9,340,634 B2
(45) Date of Patent: May 17, 2016

(54) POLYMER FOR USE IN LIQUID CRYSTAL ALIGNMENT LAYER

(75) Inventors: Sayaka Nose, Kitaadachi-gun (JP); Yutaka Nagashima, Kitaadachi-gun (JP); Isa Nishiyama, Kitaadachi-gun (JP); Haruyoshi Takatsu, Kitaadachi-gun (JP); Martin Schadt, Seltisberg (CH); Vladimir Chigrinov, Hong Kong (CN); Hoi Sing Kwok, Hong Kong (CN)

(73) Assignee: DIC CORPORATION, Tokyo (JP)

( * ) Notice: Subject to any disclaimer, the term of this patent is extended or adjusted under 35 U.S.C. 154(b) by 372 days.

(21) Appl. No.: 13/522,801

(22) PCT Filed: Mar. 29, 2011

(86) PCT No.: PCT/JP2011/057745
§ 371 (c)(1),
(2), (4) Date: Jan. 23, 2013

(87) PCT Pub. No.: WO2011/122598
PCT Pub. Date: Oct. 6, 2011

(65) Prior Publication Data
US 2013/0116396 A1 May 9, 2013

(30) Foreign Application Priority Data

Mar. 29, 2010 (JP) .................. 2010-074891
Mar. 31, 2010 (JP) .................. 2010-081254
Jan. 17, 2011 (JP) .................. 2011-006844

(51) Int. Cl.
| | | |
|---|---|---|
| C08F 220/10 | (2006.01) | |
| C08F 220/30 | (2006.01) | |
| G02F 1/133 | (2006.01) | |
| C08F 222/10 | (2006.01) | |
| C08F 220/26 | (2006.01) | |
| C09B 69/10 | (2006.01) | |
| C08F 220/36 | (2006.01) | |
| G02F 1/1337 | (2006.01) | |

(52) U.S. Cl.
CPC .............. *C08F 222/10* (2013.01); *C08F 220/26* (2013.01); *C08F 220/30* (2013.01); *C09B 69/106* (2013.01); *G02F 1/133788* (2013.01); *C08F 220/36* (2013.01); *C08F 2220/305* (2013.01); *C08F 2220/365* (2013.01); *G02F 1/133711* (2013.01); *G02F 2001/133742* (2013.01); *Y10T 428/1005* (2015.10)

(58) Field of Classification Search
CPC ............ Y10T 428/10; Y10T 428/1005; C08F 220/26; C08F 220/30; C08F 220/36; C09B 69/106; G02F 1/133742; G02F 1/133711; G02F 1/133788; G02F 2001/133742
USPC .................... 428/1.2; 526/263, 309, 311, 312
See application file for complete search history.

(56) References Cited

U.S. PATENT DOCUMENTS

| | | | |
|---|---|---|---|
| 5,539,074 A * | 7/1996 | Herr ...................... | C08F 246/00 526/245 |
| 2007/0148328 A1* | 6/2007 | Shukla et al. .................... | 427/58 |
| 2010/0085523 A1* | 4/2010 | Terashita .......... | G02F 1/133711 349/123 |
| 2011/0098454 A1* | 4/2011 | Nakanishi ............. | C07C 253/30 534/577 |
| 2014/0121345 A1* | 5/2014 | Schadt et al. .................. | 526/261 |
| 2014/0154428 A1* | 6/2014 | Schadt et al. .................. | 428/1.2 |
| 2014/0221574 A1* | 8/2014 | Schadt et al. .................. | 525/303 |

FOREIGN PATENT DOCUMENTS

| | | |
|---|---|---|
| CN | 1091458 A | 8/1994 |
| CN | 101489993 A | 7/2009 |
| WO | WO 9400797 A1 * | 1/1994 |
| WO | 2008/117615 A1 | 10/2008 |

* cited by examiner

*Primary Examiner* — Shean C Wu
(74) *Attorney, Agent, or Firm* — Westerman, Hattori, Daniels & Adrian, LLP

(57) ABSTRACT

The present invention relates to materials used for aligning liquid crystals of liquid crystal display elements and to a polymer for use in liquid crystal vertical alignment layer used in producing a liquid crystal vertical alignment layer.

The polymer for use in a liquid crystal vertical alignment layer includes (a) a moiety that is photochemically isomerizable but not photochemically crosslinked, (b) a moiety that is photochemically crosslinkable, and (c) a moiety that stabilizes a vertical alignment. The polymer can be used to produce a vertical alignment layer that has a liquid crystal alignment property enabling control of alignment at a low UV dose and that offers a large pretilt angle and superior optical stability.

24 Claims, No Drawings

POLYMER FOR USE IN LIQUID CRYSTAL ALIGNMENT LAYER

TECHNICAL FIELD

The present invention relates to materials used for aligning liquid crystals of liquid crystal display elements and, in particular, to a polymer for use in a liquid crystal vertical alignment layer used in producing a vertical alignment layer for liquid crystals.

BACKGROUND ART

Alignment layers for aligning liquid crystals are important for keeping the order of alignment of liquid crystals and realizing optical characteristics based on refractive index anisotropy of liquid crystal molecules, and are essential parts of liquid crystal display elements. Alignment of liquid crystals significantly affects display characteristics of liquid crystal display elements and thus various methods for aligning liquid crystals have been investigated. In particular, a liquid crystal display apparatus that uses a vertical-alignment-type liquid crystal layer (this apparatus is also called a VA-mode liquid crystal display apparatus) has excellent display characteristics and has been widely used in displays instead of liquid crystal display apparatuses that use horizontal-alignment-type liquid crystal layers. However, VA-mode liquid crystal display apparatuses do not necessarily have sufficient viewing angle characteristics compared to emission-type display elements and various techniques have been investigated to improve the viewing angle characteristics.

A multi-domain vertical-alignment technology (MVA) has become prevalent in improving the viewing angle characteristics of VA-mode liquid crystal display apparatuses. The MVA technology employs a domain-dividing structure to create a plurality of liquid crystal domains in one pixel. In MVA technology, controlling the inclination of liquid crystal molecules is critical in creating a domain-dividing structure and the inclination has been controlled by forming slits (openings) or ribs (projections) in electrodes. However, unlike in a conventional TN mode where the pretilt direction has been regulated by alignment films, when slits and ribs, which are linear, are used, the force of regulating alignment of liquid crystals becomes uneven within a pixel and thus a distribution occurs in terms of response speed. Another problem is that regions where slits and ribs are formed exhibit decreased optical transmittance, resulting in a decrease in display luminance.

Another technique for controlling the inclination is a polymer sustained alignment (PSA) technique in which a photo- or thermo-polymerizable monomer added to liquid crystals is polymerized by voltage application while tilting liquid crystal molecules so that the liquid crystal molecules memorize the tilt direction (refer to PTL 1). This technique can overcome the problem of response speed distribution and a decrease in optical transmittance that has occurred in the slits-and-ribs technique. However, this technique faces other problems such as changes in characteristics caused by addition of monomer to the liquid crystal material, difficulty of controlling the process, adverse effects of remaining monomers, etc.

In order to avoid these problems, it is preferable even for VA-mode liquid crystal display apparatuses to form a domain-dividing structure by controlling the inclination by using alignment films. One way to apply force for controlling the inclination to a vertical alignment film is a rubbing technique. However, it is difficult to form a precise domain-dividing structure by a rubbing technique and problems such as static electricity caused by friction and occurrence of impurity components arise.

A photoalignment technique is another technique for controlling the inclination by using an alignment film other than the rubbing process (refer to PTL 2). In a photoalignment technique, a more precise domain-dividing structure can be easily fabricated by changing the light irradiation pattern and occurrence of static electricity and impurities is less compared to a rubbing process since the alignment film can be processed without requiring contact. However, although it is widely known that the conventional photoalignment technique is used in controlling horizontal alignment, in order to control the vertical alignment which has a completely different direction of alignment from the horizontal alignment, a vertical alignment layer composition that has a structure completely different from that of a conventional photoalignment film for horizontal alignment must be used. This composition is required to exhibit an ability to control the inclination of liquid crystals at a small optical exposure dose and various characteristics, such as reliability, that make the composition applicable to active matrix driving. Materials for forming liquid crystal vertical alignment layers satisfying these requirements have not been known heretofore.

A photoalignment layer composition that has an azo-containing skeleton as a moiety that is photochemically isomerizable but not photochemically crosslinked and a cinnamic acid skeleton as a moiety that is photochemically crosslinkable has already been disclosed (refer to PTL 3, 4, and 5). However, in these literatures, the composition is used to align liquid crystal molecules horizontally with respect to a substrate and it is impossible to use the photoalignment layer composition having these skeletons in a vertical alignment layer having a completely different alignment. Moreover, since the literatures are silent as to specific means used in vertical alignment, development of polymers for use in liquid crystal alignment layers for vertical alignment has been desired.

CITATION LIST

Patent Literature

PTL 1: Japanese Unexamined Patent Application Publication No. 2003-149647
PTL 2: Japanese Patent No. 2682771
PTL 3: Japanese Unexamined Patent Application Publication No. 6-287453
PTL 4: Japanese Unexamined Patent Application Publication No. 10-310613
PTL 5: PCT Japanese Translation Patent Publication No. 2002-517605

SUMMARY OF INVENTION

Technical Problem

An object of the invention is to provide a polymer for use in a liquid crystal vertical alignment layer, the polymer having a liquid crystal alignment property that enables control of alignment by a low UV dose and offering a large pretilt angle and superior optical stability, and to provide a vertical alignment layer using the polymer.

Solution to Problem

The inventors of the subject application have conducted extensive research on various materials to achieve the aforementioned object and found that the object can be achieved by using a liquid crystal vertical alignment layer that employs a polymer (including a mixture of polymers) that has three distinctive structures. Therefore, the present invention has been made.

The invention set forth in the subject application provides a polymer for use in a liquid crystal vertical alignment layer, the polymer including (a) a moiety that is photochemically isomerizable but not photochemically crosslinked, (b) a moiety that is photochemically crosslinkable, and (c) a moiety that stabilizes a vertical alignment. A vertical alignment layer that uses this composition is also provided.

Advantageous Effects of Invention

When the polymer for use in a liquid crystal vertical alignment layer of the present invention is used, a vertical alignment layer that can control alignment can be fabricated at a low UV dose. Since this vertical alignment layer offers a large pretilt angle and superior optical stability, VA-mode liquid crystal display apparatuses having a domain-dividing structure and superior viewing angle characteristics can be efficiently manufactured.

DESCRIPTION OF EMBODIMENTS

A polymer for use in a liquid crystal vertical alignment layer used in the invention includes (a) a moiety that is photochemically isomerizable but not photochemically crosslinked; (b) a moiety that is photochemically crosslinkable; and (c) a moiety that stabilizes the vertical alignment. The form in which these moieties are bonded is preferably as follows.

Embodiment 1 of a Polymer for Use in a Liquid Crystal Vertical Alignment Layer

The polymer is a cured product of monomers represented by general formulae (Iaaa-1), (Iaaa-2), and (Iaaa-3):

[Chem. 1]

$$M_a\text{-}S_a\text{-}P \quad \quad \quad (\text{Iaaa-1})$$

$$M_b\text{-}S_b\text{-}D \quad \quad \quad (\text{Iaaa-2})$$

$$M_c\text{-}S_c\text{-}V_c \quad \quad \quad (\text{Iaaa-3})$$

(where $M_a$, $M_b$, and $M_c$ each represent a monomer unit of the polymer and may be different from one another; $S_a$, $S_b$, and $S_c$ each represent a spacer unit and may be different from one another; P represents a moiety that is photochemically isomerizable but not photochemically crosslinked; D represents a moiety that is photochemically crosslinkable; and $V_c$ represents a moiety that stabilizes the vertical alignment) or
the polymer is the cured product and has a structural unit represented by general formula (Iaaa):

[Chem. 2]

(Iaaa)

(where $M_a$, $M_b$, $M_c$, and Q each represent a monomer unit of the polymer and may be different from one another; x, y, z, and w each represent a molar fraction of the monomer units in the polymer and satisfy $0<x<1$, $0<y<1$, $0<z<1$, and $0\leq w<1$; $S_a$, $S_b$, and $S_c$ each represent a spacer unit and may be different from one another; P represents a moiety that is photochemically isomerizable but not photochemically crosslinked; D represents a moiety that is photochemically crosslinkable; $V_c$ represents a moiety that stabilizes the vertical alignment; n represents 4 to 100,000; the order in which $M_a$, $M_b$, $M_c$, and Q are arranged may be the same as or different from that shown in the formula; and Q may be one monomer unit or two or more different monomer units.)

Embodiment 2 of a Polymer for Use in a Liquid Crystal Vertical Alignment Layer

The polymer is a cured product of monomers represented by general formulae (Ibbb-1) and (Ibbb-2):

[Chem. 3]

$$M_a\text{-}S_a\text{-}P\text{-}S_{aa}\text{-}V_a \quad \quad \quad (\text{Ibbb-1})$$

$$M_b\text{-}S_b\text{-}D \quad \quad \quad (\text{Ibbb-2})$$

(where $M_a$ and $M_b$ each represent a monomer unit of the polymer and may be different from one another; $S_a$, $S_b$, and $S_{aa}$ each represent a spacer unit and may be different from one another; P represents a moiety that is photochemically isomerizable but not photochemically crosslinked; D represents a moiety that is photochemically crosslinkable; and $V_a$ represents a moiety that stabilizes the vertical alignment), or the polymer is the cured product and has a structural unit represented by general formula (Ibbb):

[Chem. 4]

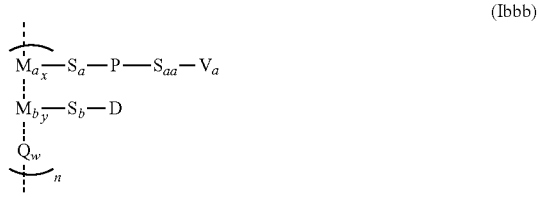
(Ibbb)

(where $M_a$, $M_b$, and Q each represent a monomer unit of the polymer and may be different from one another; x, y, and w each represent a molar fraction of the monomer units in the polymer and satisfy $0<x<1$, $0<y<1$, and $0\leq w<1$; $S_a$, $S_b$, and $S_{aa}$ each represent a spacer unit and may be different from one another; P represents a moiety that is photochemically isomerizable but not photochemically crosslinked; D represents a moiety that is photochemically crosslinkable; $V_a$ represents a moiety that stabilizes the vertical alignment; n represents 4 to 100,000; the order in which $M_a$, $M_b$, and Q are arranged may be the same as or different from that shown in the formula; and Q may be one monomer unit or two or more different monomer units.)

Embodiment 3 of a Polymer for Use in a Liquid Crystal Vertical Alignment Layer

The polymer is a cured product of monomers represented by general formulae (Iccc-1) and (Iccc-2):

[Chem. 5]

$$M_a\text{-}S_a\text{-}D\text{-}S_{aa}\text{-}V_a \quad \quad \quad (\text{Iccc-1})$$

$$M_b\text{-}S_b\text{-}P \quad \quad \quad (\text{Iccc-2})$$

(where $M_a$ and $M_b$ each represent a monomer unit of the polymer and may be different from one another; $S_a$, $S_b$, and $S_{aa}$ each represent a spacer unit and may be different from one another; P represents a moiety that is photochemically isomerizable but not photochemically crosslinked; D represents a moiety that is photochemically crosslinkable; and $V_a$ represents a moiety that stabilizes the vertical alignment) or, the polymer is the cured product and has a structural unit represented by general formula (Iccc):

[Chem. 6]

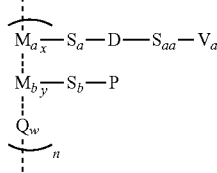
(Iccc)

(where $M_a$, $M_b$, and Q each represent a monomer unit of the polymer and may be different from one another; x, y, and w each represent a molar fraction of the monomer units in the polymer and satisfy $0<x<1$, $0<y<1$, and $0 \leq w<1$; $S_a$, $S_b$, and $S_{aa}$ each represent a spacer unit and may be different from one another; P represents a moiety that is photochemically isomerizable but not photochemically crosslinked; D represents a moiety that is photochemically crosslinkable; $V_a$ represents a moiety that stabilizes the vertical alignment; n represents 4 to 100,000; the order in which $M_a$, $M_b$, and Q are arranged may be the same as or different from that shown in the formula; and Q may be one monomer unit or two or more different monomer units.)

Embodiment 4 of a Polymer for Use in a Liquid Crystal Vertical Alignment Layer

The polymer is a cured product of monomers represented by general formulae (Iddd-1) and (Iddd-2):

[Chem. 7]

$M_a\text{-}S_a\text{-}P\text{-}S_{aa}\text{-}V_a$ (Iddd-1)

$M_b\text{-}S_b\text{-}D\text{-}S_{bb}\text{-}V_b$ (Iddd-2)

(where $M_a$ and $M_b$ each represent a monomer unit of the polymer and may be different from one another; $S_a$, $S_b$, $S_{aa}$, and $S_{bb}$ each represent a spacer unit and may be different from one another; P represents a moiety that is photochemically isomerizable but not photochemically crosslinked; D represents a moiety that is photochemically crosslinkable; and $V_a$ and $V_b$ each represent a moiety that stabilizes the vertical alignment and may be different from one another), or
the polymer is the cured product and has a structural unit represented by general formula (Iddd):

[Chem. 8]

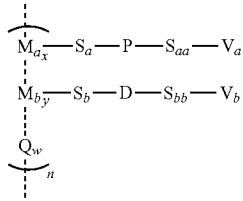
(Iddd)

(where $M_a$, $M_b$, and Q each represent a monomer unit of the polymer and may be different from one another; x, y, and w each represent a molar fraction of the monomer units in the polymer and satisfy $0<x<1$, $0<y<1$, and $0 \leq w<1$; $S_a$, $S_b$, $S_{aa}$, $S_{bb}$ each represent a spacer unit and may be different from one another; P represents a moiety that is photochemically isomerizable but not photochemically crosslinked; D represents a moiety that is photochemically crosslinkable; $V_a$ and $V_b$ each represent a moiety that stabilizes the vertical alignment and may be different from each other; n represents 4 to 100,000; the order in which $M_a$, $M_b$, and Q are arranged may be the same as or different from that shown in the formula; and Q may be one monomer unit or two or more different monomer units.)

Embodiment 5 of a Polymer for Use in a Liquid Crystal Vertical Alignment Layer

The polymer is a cured product of a monomer represented by general formula (Iaa-1) or (Ibb-1):

[Chem. 9]

$M_a\text{-}S_a\text{-}P\text{-}S_{aa}\text{-}D\text{-}S_{aaa}\text{-}V_a$ (Iaa-1)

$M_a\text{-}S_a\text{-}D\text{-}S_{aa}\text{-}P\text{-}S_{aaa}\text{-}V_a$ (Ibb-1)

(where $M_a$ each represent a monomer unit of the polymer and may be different from one another; $S_a$, $S_{aa}$, and $S_{aaa}$ each represent a spacer unit and may be different from one another; P represents a moiety that is photochemically isomerizable but not photochemically crosslinked; D represents a moiety that is photochemically crosslinkable; and $V_a$ represents a moiety that stabilizes the vertical alignment); a cured product of monomers represented by general formulae (Icc-1) and (Icc-2):

[Chem. 10]

$M_a\text{-}S_a\text{-}P\text{-}S_{aa}\text{-}D$ (Icc-1)

$M_c\text{-}S_c\text{-}V_c$ (Icc-2)

(where $M_a$ and $M_c$ each represent a monomer unit of the polymer and may be different from one another; $S_a$, $S_{aa}$, and $S_c$ each represent a spacer unit and may be different from one another; P represents a moiety that is photochemically isomerizable but not photochemically crosslinked; D represents a moiety that is photochemically crosslinkable; and $V_c$ represents a moiety that stabilizes the vertical alignment), or a cured product of monomers represented by general formulae (Idd-1) and (Idd-2):

[Chem. 11]

$M_a\text{-}S_a\text{-}D\text{-}S_{aa}\text{-}P$ (Idd-1)

$M_c\text{-}S_c\text{-}V_c$ (Idd-2)

(where $M_a$ and $M_c$ each represent a monomer unit of the polymer and may be different from one another; $S_a$, $S_{aa}$, and $S_c$ each represent a spacer unit and may be different from one another; P represents a moiety that is photochemically isomerizable but not photochemically crosslinked; D represents a moiety that is photochemically crosslinkable; and $V_c$ represents a moiety that stabilizes the vertical alignment.)

Alternatively, the polymer is the cured product and has a structural unit represented by general formula (Iaa), general formula (Ibb), general formula (Icc), or general formula (Idd):

[Chem. 12]

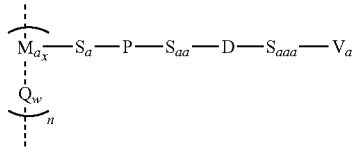
(Iaa)

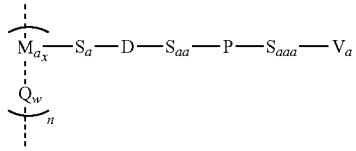
(Ibb)

(where $M_a$ and Q each represent a monomer unit of the polymer; Q may be one monomer unit or two or more different monomer units; x and w represent molar fractions of the monomer units in general formula (Iaa) and general formula (Ibb) and satisfy $0<x\leq1$ and $0\leq w<1$; $S_a$, $S_{aa}$, and $S_{aaa}$ each represent a spacer unit and may be different from one another; P represents a moiety that is photochemically isomerizable but not photochemically crosslinked; D represents a moiety that is photochemically crosslinkable; $V_a$ represents a moiety that stabilizes the vertical alignment; and n represents 4 to 100,000);

[Chem. 13]

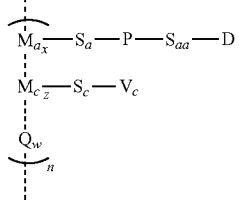
(Icc)

(where $M_a$, $M_c$, and Q each independently represent a monomer unit of the polymer and may be different from one another; the order in which $M_a$, $M_c$, and Q are arranged may be the same as or different from that shown in the formula; Q may be one monomer unit or two or more different monomer units; x, z, and w represent molar fractions of the monomer units and satisfy $0<x<1$, $0<z<1$, and $0\leq w<1$; $S_a$, $S_{aa}$, and $S_c$ each represent a spacer unit and may be different from one another; P represents a moiety that is photochemically isomerizable but not photochemically crosslinked; D represents a moiety that is photochemically crosslinkable; $V_c$ represents a moiety that stabilizes the vertical alignment; and n represents 4 to 100,000);

[Chem. 14]

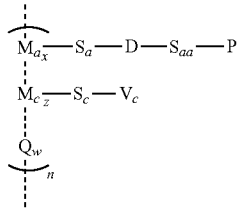
(Idd)

(where $M_a$, $M_c$, and Q each independently represent a monomer unit of the polymer; the order in which $M_a$, $M_c$, and Q are arranged may be the same as or different from that shown in the formula; Q may be one monomer unit or two or more different monomer units; x, z, and w represent molar fractions of the monomer units in the polymer and satisfy $0<x<1$, $0<z<1$, and $0\leq w<1$; $S_a$, $S_{aa}$, and $S_c$ each represent a spacer unit and may be different from one another; P represents a moiety that is photochemically isomerizable but not photochemically crosslinked; D represents a moiety that is photochemically crosslinkable; $V_c$ represents a moiety that stabilizes the vertical alignment; and n represents 4 to 100,000).

In Embodiment 5, a moiety (P) that is photochemically isomerizable but not photochemically crosslinked and a moiety (D) that is photochemically crosslinkable are serially linked. Thus, these moieties can also give favorable effects on the vertical alignment property due to an increase in rigidity and/or an increase in molecular length of these moieties.

Embodiment 6 of a Polymer for Use in a Liquid Crystal Vertical Alignment Layer

The cured product contains (a) a polymer having a moiety that is photochemically isomerizable but not photochemically crosslinked and (b) a polymer having a moiety that is photochemically crosslinkable, and the polymer (a) and the polymer (b) have structures different from each other.

Embodiment 6 may further include at least one monomer or polymer. Two or more polymers having a moiety that is photochemically isomerizable may be contained, two or more polymers having a moiety that is photochemically crosslinkable may be contained, or a moiety that is photochemically isomerizable but not photochemically crosslinked and a moiety that is photochemically crosslinkable may be contained in the same polymer.

The polymer having a moiety that is photochemically isomerizable but not photochemically crosslinked preferably contains a structural unit represented by general formula (Ia-1), (Ib-1), or (Ic-1):

[Chem. 15]

$$M_a\text{-}S_a\text{-}P\text{-}S_{aa}\text{-}V \qquad (\text{Ia-1})$$

$$M_a\text{-}S_a\text{-}P\text{-}S_{aa}\text{-}D\text{-}S_{aaa}\text{-}V \qquad (\text{Ib-1})$$

$$M_a\text{-}S_a\text{-}D\text{-}S_{aa}\text{-}P\text{-}S_{aaa}\text{-}V \qquad (\text{Ic-1})$$

(where $M_a$ each represent a monomer unit of the polymer and may be different from one another; $S_a$, $S_{aa}$, and $S_{aaa}$ each represent a spacer unit and may be different from one another; P represents a moiety that is photochemically isomerizable but not photochemically crosslinked; D represents a moiety that is photochemically crosslinkable; and V represents a moiety that stabilizes the vertical alignment); structural units represented by general formulae (Id-1) and (Id-2):

[Chem. 16]

$$M_a\text{-}S_a\text{-}P\text{-}S_{aa}\text{-}V_a \qquad (\text{Id-1})$$

$$M_b\text{-}S_b\text{-}D\text{-}S_{bb}\text{-}V_b \qquad (\text{Id-2})$$

(where $M_a$ and $M_b$ each represent a monomer unit of the polymer and may be different from one another; $S_a$, $S_{aa}$, $S_b$, and $S_{bb}$ each represent a spacer unit and may be different from one another; P represents a moiety that is photochemically isomerizable but not photochemically crosslinked; D represents a moiety that is photochemically crosslinkable; and $V_a$ and $V_b$ each represent a moiety that stabilizes the vertical alignment); a structural unit represented by general formula (If-1), (Ig-1), or (Ih-1):

[Chem. 17]

$$M_a\text{-}S_a\text{-}P \quad (\text{If-1})$$

$$M_a\text{-}S_a\text{-}P\text{-}S_{aa}\text{-}D \quad (\text{Ig-1})$$

$$M_a\text{-}S_a\text{-}D\text{-}S_{aa}\text{-}P \quad (\text{Ih-1})$$

(where $M_a$ each represent a monomer unit of the polymer and may be different from one another; $S_a$ and $S_{aa}$ each represent a spacer unit and may be different from one another; P represents a moiety that is photochemically isomerizable but not photochemically crosslinked; and D represents a moiety that is photochemically crosslinkable); or structural units represented by general formulae (Ii-1) and (Ii-2):

[Chem. 18]

$$M_a\text{-}S_a\text{-}P \quad (\text{Ii-1})$$

$$M_b\text{-}S_b\text{-}D \quad (\text{Ii-2})$$

(where $M_a$ and $M_b$ represent monomer units of the polymer and may be different from one another; $S_a$ and $S_b$ each represent a spacer unit and may be different from one another; P represents a moiety that is photochemically isomerizable but not photochemically crosslinked; and D represents a moiety that is photochemically crosslinkable). More preferably, the polymer contains a polymer selected from the group consisting of polymers represented by general formulae (Ia) to (Id), (If) to (Ii), and (Im) to (Ip) below:

[Chem. 19]

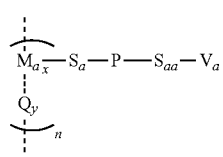

(Ia)

(where $M_a$ and Q each represent a monomer unit of the polymer and may be different from one another; Q may be one monomer unit or two or more different monomer units; $S_a$ and $S_{aa}$ represent spacer units and may be different from one another; P represents a moiety that is photochemically isomerizable but not photochemically crosslinked; V represents a moiety that stabilizes the vertical alignment; x and y represent molar fractions of the monomer units in the polymer and satisfy $0<x\leq1$ and $0\leq y<1$; and n represents 4 to 100,000);

[Chem. 20]

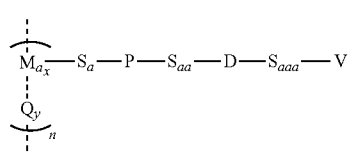

(Ib)

(where $M_a$ and Q each represent a monomer unit of the polymer and may be different from one another; Q may be one monomer unit or two or more different monomer units; $S_a$, $S_{aa}$, and $S_{aaa}$ represent spacer units and may be different from one another; P represents a moiety that is photochemically isomerizable but not photochemically crosslinked; D represents a moiety that is photochemically crosslinkable; V represents a moiety that stabilizes the vertical alignment; x and y represent molar fractions of the monomer units in the polymer and satisfy $0<x\leq1$ and $0\leq y<1$; and n represents 4 to 100,000);

[Chem. 21]

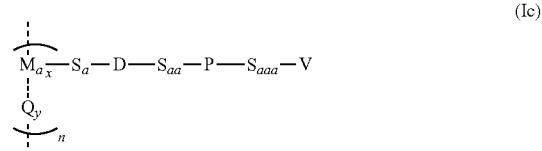

(Ic)

(where $M_a$ and Q each represent a monomer unit of the polymer and may be different from one another; Q may be one monomer unit or two or more different monomer units; $S_a$, $S_{aa}$, and $S_{aaa}$ represent spacer units and may be different from one another; P represents a moiety that is photochemically isomerizable but not photochemically crosslinked; D represents a moiety that is photochemically crosslinkable; V represents a moiety that stabilizes the vertical alignment; x and y represent molar fractions of the monomer units and satisfy $0<x\leq1$ and $0\leq y<1$; and n represents 4 to 1000000);

[Chem. 22]

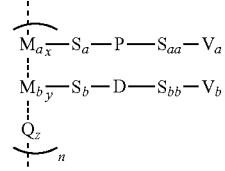

(Id)

(where $M_a$, $M_b$, and Q each represent a monomer unit of the polymer and may be different from one another; the order in which $M_a$, $M_b$, and Q are arranged may be the same as or different from that shown in the formula; Q may be one monomer unit or two or more different monomer units; $S_a$, $S_{aa}$, $S_b$, and $S_{bb}$ represent spacer units and may be different from one another; $V_a$ and $V_b$ each represent a moiety that stabilizes the vertical alignment; x, y, and z represent molar fractions of monomer units in the polymer and satisfy $0<x<1$, $0<y<1$, and $0\leq z<1$; P represents a moiety that is photochemically isomerizable but not photochemically crosslinked; D represents a moiety that is photochemically crosslinkable; and n represents 4 to 1000000);

[Chem. 23]

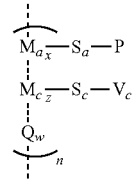

(If)

(where $M_a$, $M_c$, and Q each independently represent a monomer unit of the polymer; the order in which $M_a$, $M_c$, and Q are arranged may be the same as or different from that shown in the formula; Q may be one monomer unit or two or more different monomer units; x, z, and w represent molar fractions of the monomer units in the polymer and satisfy $0<x<1$, $0<z<1$, and $0\leq w<1$; $S_a$ and $S_c$ each represent a spacer unit and may be different from one another; P represents a moiety that is photochemically isomerizable but not photochemically crosslinked; $V_c$ represents a moiety that stabilizes the vertical alignment; and n represents 4 to 100,000);

[Chem. 24]

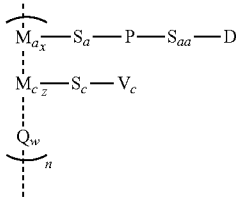

(Ig)

(where $M_a$, $M_c$, and Q each independently represent a monomer unit of the polymer and may be different from one another; the order in which $M_a$, $M_c$, and Q are arranged may be the same as or different from that shown in the formula; Q may be one monomer unit or two or more different monomer units; x, z, and w represent molar fractions of the monomer units and satisfy $0<x<1$, $0<z<1$, and $0\leq w<1$; $S_a$, $S_{aa}$, and $S_c$ each represent a spacer unit and may be different from one another; P represents a moiety that is photochemically isomerizable but not photochemically crosslinked; D represents a moiety that is photochemically crosslinkable; $V_c$ represents a moiety that stabilizes the vertical alignment; and n represents 4 to 100,000);

[Chem. 25]

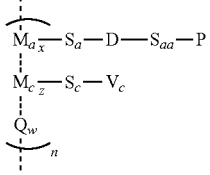

(Ih)

(where $M_a$, $M_c$, and Q each independently represent a monomer unit of the polymer; the order in which $M_a$, $M_c$, and Q are arranged may be the same as or different from that shown in the formula; Q may be one monomer unit or two or more different monomer units; x, z, and w represent molar fractions of the monomer units and satisfy $0<x<1$, $0<z<1$, and $0\leq w<1$; $S_a$, $S_{aa}$, and $S_c$ each represent a spacer unit and may be different from one another; P represents a moiety that is photochemically isomerizable but not photochemically crosslinked; D represents a moiety that is photochemically crosslinkable; $V_c$ represents a moiety that stabilizes the vertical alignment; and n represents 4 to 100,000);

[Chem. 26]

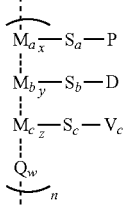

(Ii)

(where $M_a$, $M_b$, $M_c$, and Q each independently represent monomer units of the polymer; x, y, z, and w each represent a molar fraction of the monomer units in the polymer and satisfy $0<x<1$, $0<y<1$, $0<z<1$, and $0\leq w<1$; $S_a$, $S_b$, and $S_c$ each represent a spacer unit and may be different from one another; P represents a moiety that is photochemically isomerizable but not photochemically crosslinked; D represents a moiety that is photochemically crosslinkable; $V_c$ represents a moiety that stabilizes the vertical alignment; n represents 4 to 100,000; the order in which $M_a$, $M_b$, $M_c$, and Q are arranged may be the same as or different from that shown in the formula; and Q may be one monomer unit or two or more different monomer units);

[Chem. 27]

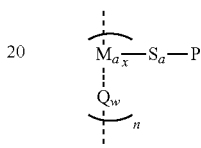

(Im)

(where $M_a$ and Q each represent a monomer unit of the polymer and may be different from one another; Q may be one monomer unit or two or more different monomer units; $S_a$ represents a spacer unit; P represents a moiety that is photochemically isomerizable but not photochemically crosslinked; x and w represent molar fractions of the monomer units in the polymer and satisfy $0<x\leq 1$ and $0\leq w<1$; and n represents 4 to 100,000);

[Chem. 28]

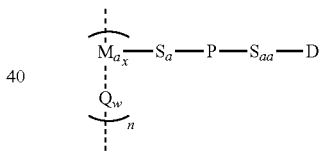

(In)

(where $M_a$ and Q each represent a monomer unit of the polymer and may be different from one another; Q may be one monomer unit or two or more different monomer units; $S_a$ and $S_{aa}$ represent spacer units and may be different from one another; P represents a moiety that is photochemically isomerizable but not photochemically crosslinked; D represents a moiety that is photochemically crosslinkable; x and w represent molar fractions of the monomer units in the polymer and satisfy $0<x\leq 1$ and $0\leq w<1$; and n represents 4 to 100,000);

[Chem. 29]

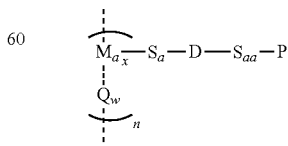

(Io)

(where $M_a$ and Q each represent a monomer unit of the polymer and may be different from one another; Q may be one monomer unit or two or more different monomer units; $S_a$ and $S_{aa}$ represent spacer units and may be different from one another; P represents a moiety that is photochemically isomerizable but not photochemically crosslinked; D represents a moiety that is photochemically crosslinkable; x and w represent molar fractions of the monomer units in the polymer and satisfy $0<x\leq 1$ and $0\leq w<1$; and n represents 4 to 100,000);

[Chem. 30]

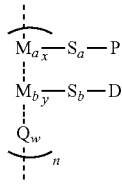
(Ip)

(where $M_a$, $M_b$, and Q each represent a monomer unit of the polymer and may be different from one another; the order in which $M_a$, $M_b$, and Q are arranged may be the same as or different from that shown in the formula; Q may be one monomer unit or two or more different monomer units; $S_a$ and $S_b$ represent spacer units and may be different from one another; P represents a moiety that is photochemically isomerizable but not photochemically crosslinked; D represents a moiety that is photochemically crosslinkable; x, y, and w represent molar fractions of the monomer units in the polymer and satisfy $0<x<1$, $0<y<1$, and $0\leq w<1$; and n represents 4 to 100,000). More preferably, the polymer is a polymer containing an azo group. Particularly preferably, the polymer is a homopolymer containing an azo group.

The polymer having a moiety that is photochemically crosslinkable is preferably a polymer that contains a structural unit represented by general formula (Ie-1):

[Chem. 31]

$$M_a\text{-}S_a\text{-}D\text{-}S_{aa}\text{-}V \qquad (Ie\text{-}1)$$

(where $M_a$ represents a monomer unit of the polymer and may be different from one another; $S_a$ and $S_{aa}$ each represent a spacer unit and may be different from one another; D represents a moiety that is photochemically crosslinkable; and V represents a moiety that stabilizes the vertical alignment); or

[Chem. 32]

$$M_a\text{-}S_a\text{-}D \qquad (Ij\text{-}1)$$

(where $M_a$ represents a monomer unit of the polymer; $S_a$ represents a spacer unit; and D represents a moiety that is photochemically crosslinkable). More preferably, the polymer contains a polymer represented by general formula (Ie):

[Chem. 33]

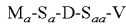
(Ie)

(where $M_a$ and Q each represent a monomer unit of the polymer and may be different from one another; Q may be one monomer unit or two or more different monomer units; $S_a$ and $S_{aa}$ represent spacer units and may be different from one another; D represents a moiety that is photochemically crosslinkable; V represents a moiety that stabilizes the vertical alignment; x and y represent molar fractions of the monomer units in the polymer and satisfy $0<x\leq 1$ and $0\leq y<1$; and n represents 4 to 100,000); general formula (Ij):

[Chem. 34]

(Ij)

(where $M_a$, $M_c$, and Q each independently represent a monomer unit of the polymer; the order in which $M_a$, $M_c$, and Q are arranged may be the same as or different from that shown in the formula; Q may be one monomer unit or two or more different monomer units; x, z, and w represent molar fractions of the monomer units in the polymer and satisfy $0<x<1$, $0<z<1$, and $0\leq w<1$; $S_a$, $S_{aa}$, and $S_c$ each represent a spacer unit and may be different from another; D represents a moiety that is photochemically crosslinkable; $V_c$ represents a moiety that stabilizes the vertical alignment; and n represents 4 to 100,000); or general formula (Iq):

[Chem. 35]

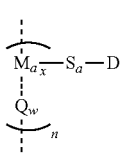
(Iq)

(where $M_a$ and Q each represent a monomer unit of the polymer and may be different from one another; Q may be one monomer unit or two or more different monomer units; $S_a$ represents a spacer unit; D represents a moiety that is photochemically crosslinkable; x and w represent molar fractions of the monomer units in the polymer and satisfy $0<x\leq 1$ and $0\leq w<1$; and n represents 4 to 100,000).

The polymer having a moiety that stabilizes the vertical alignment preferably contains a structural unit represented by general formula (Ik-1):

[Chem. 36]

$$M_c\text{-}S_c\text{-}V_c \qquad (Ik\text{-}1)$$

(where $M_c$ represents a monomer unit of the polymer; $S_c$ represents a spacer unit; and $V_c$ represents a moiety that stabilizes the vertical alignment). More preferably, the polymer contains a polymer represented by general formula (Ik):

[Chem. 37]

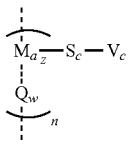
(Ik)

(where $M_c$ and Q each represent a monomer unit of the polymer and may be different from one another; Q may be one monomer unit or two or more different monomer units; $S_c$ represents a spacer unit; $V_c$ represents a moiety that stabilizes the vertical alignment; z and w represent molar fractions of the monomer units in the polymer and satisfy $0<z\leq 1$ and $0\leq w<1$; and n represents 4 to 100,000).

The polymer having a moiety that is photochemically crosslinkable is preferably a polymer that contains a group selected from the group consisting of groups represented by formulae (II-1) to (II-8):

[Chem. 38]

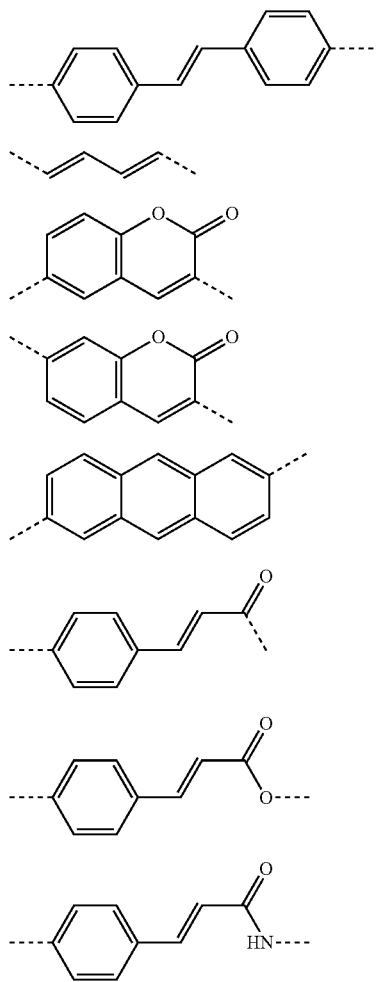

(where a broken line represents a bond to $S_a$, $S_{aa}$, $S_{aaa}$, $S_b$, or $S_{bb}$; any hydrogen atom in each structure may be substituted with a fluorine atom, a chlorine atom, a methyl group, or a methoxy group). The polymer more preferably contains a group represented by formula (II-1), (II-3), (II-4), (II-6), (II-7), or (II-8) and most preferably contains a group represented by formula (II-6), (II-7), or (II-8).

In order to improve the thermal stability of the photoalignment film, formula (II-1), (II-3), (II-4), (II-6), (II-7), or (II-8) is preferable. In order to conduct photoalignment with light having a longer wavelength, formula (II-1), (II-2), or (II-5) is preferable. In order to align the photoalignment film with a smaller irradiation dose, formula (II-3), (II-4), (II-6), (II-7), or (II-8) is preferable and (II-6), (II-7), or (II-8) is particularly preferable.

The monomer units ($M_a$, $M_b$, and $M_c$) are preferably each independently acrylate, methacrylate, acrylamide, methacrylamide, a maleic acid derivative, a siloxane, or an epoxide. The monomer units preferably each independently include an acryloyloxy group, a methacryloyloxy group, a 2-chloroacryloyloxy group, a 2-phenylacryloyloxy group, a 2-phenyloxyacryloyloxy group, an acrylamide group, a methacrylamide group, a 2-chloromethacrylamide group, a 2-phenylacrylamide group, a vinyloxy group, a styryl group, a vinyloxycarbonyl group, a maleimide group, a maleic ester, a fumaric ester, a siloxane, a vinyl group, or an epoxy group. In particular, the monomer units ($M_a$, $M_b$, and $M_c$) are each independently a compound having a group selected from the group consisting of groups represented by formulae (III-1) to (III-17):

[Chem. 39]

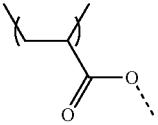
(III-1)

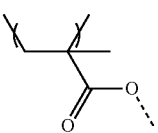
(III-2)

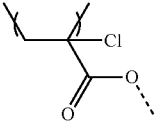
(III-3)

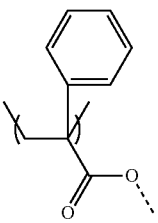
(III-4)

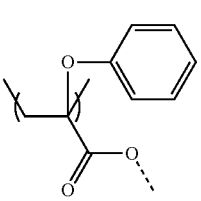
(III-5)

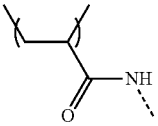
(III-6)

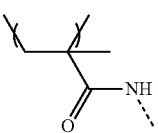
(III-7)

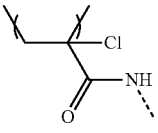
(III-8)

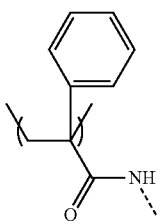
(III-9)

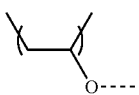
(III-10)

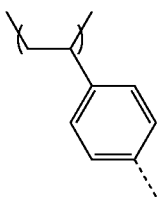
(III-11)

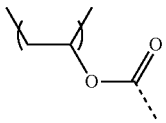
(III-12)

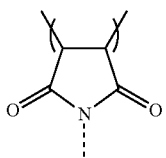
(III-13)

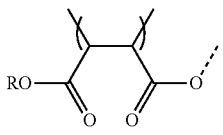
(III-14)

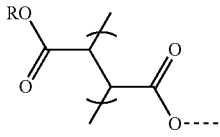
(III-15)

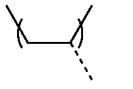
(III-16)

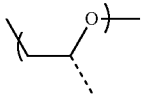
(III-17)

(where a broken line represents a bond to $S_a$, $S_b$, or $S_c$; R independently represents hydrogen or an alkyl group having 1 to 5 carbon atoms; any hydrogen atom in each structure may be substituted with a fluorine atom, a chlorine atom, a methyl group, or a methoxy group). Formula (III-1), (III-2), (III-3), (III-4), (III-6), (III-7), (III-8), (III-9), (III-10), (III-11), (III-13), (III-16), or (III-17) is preferable. Formula (III-1), (III-2), (III-3), (III-6), (III-7), (III-8), (III-13), (III-16), or (III-17) is more preferable. Formula (III-1), (III-2), (III-3), (III-6), (III-7), or (III-13) is particularly preferable.

In order to improve the solubility of the polymer, formula (III-1), (III-2), (III-3), (III-6), (III-7), (III-8), (III-10), (III-12), (III-14), (III-16), or (III-17) is preferable, and formula (III-1), (III-2), (III-10), (III-12), or (III-17) is particularly preferable. In order to improve the polymerization rate, formula (III-3), (III-8), (III-10), (III-12), (III-13), (III-14), (III-15), (III-16), or (III-17) is preferable, and formula (III-3), (III-8), (III-10), (III-12), or (III-17) is particularly preferable. In order to narrow the molecular weight distribution of the polymer, formula (III-2), (III-10), (III-11), or (III-12) is preferable. In order to improve the stability of alignment, formula (III-2), (III-4), (III-5), (III-7), (III-9), (III-13), (III-14), or (III-15) is preferable. In order to improve the adhesion to a substrate, formula (III-1), (III-6), (III-7), (III-8), (III-9), (III-10), (III-12), (III-13), or (III-17) is preferable, and formula (III-6), (III-7), (III-8), or (III-13) is particularly preferable.

The monomer unit (Q) may be the same as or different from the monomer units ($M_a$, $M_b$, and $M_c$) and may be any known monomer unit. The order and randomness in which the monomer units ($M_a$, $M_b$, $M_c$, and Q) in the polymer are arranged are not particularly limited. One monomer unit or a combination of two or more monomer units can be used as the monomer unit (Q). However, the use of the monomer units is preferably limited to a particular extent such that the effects achieved by the moiety (a) that is photochemically isomerizable but not photochemically crosslinked, the moiety (b) that is photochemically crosslinkable, and the moiety (c) that stabilizes the vertical alignment are not obstructed. The monomer unit (Q) is preferably acrylate, methacrylate, acrylamide, methacrylamide, a maleic acid derivative, a siloxane, or an epoxide. Examples thereof include an acryloyloxy group, a methacryloyloxy group, a 2-chloroacryloyloxy group, a 2-phenylacryloyloxy group, a 2-phenyloxyacryloyloxy group, an acrylamide group, a methacrylamide group, a 2-chloromethacrylamide group, a 2-phenylacrylamide group, a vinyloxy group, a styryl group, a vinyloxycarbonyl group, a maleimide group, a maleic ester, a fumaric ester, a siloxane, a vinyl group, and an epoxy group. In particular, formulae (QIII-1) to (QIII-17) can be used.

[Chem. 40]

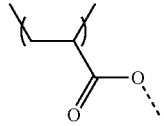
(QIII-1)

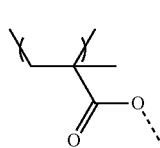
(QIII-2)

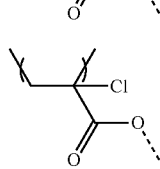
(QIII-3)

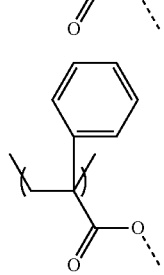
(QIII-4)

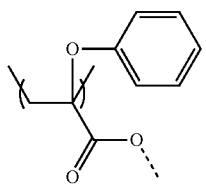
(QIII-5)

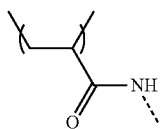
(QIII-6)

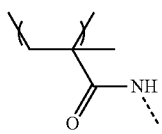
(QIII-7)

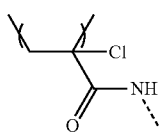
(QIII-8)

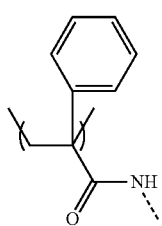
(QIII-9)

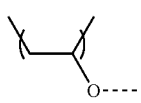
(QIII-10)

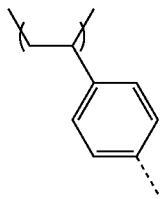
(QIII-11)

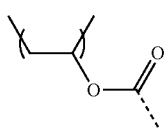
(QIII-12)

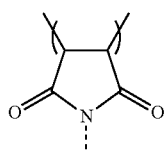
(QIII-13)

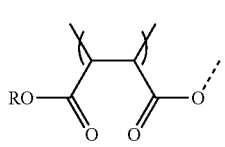
(QIII-14)

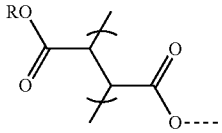
(QIII-15)

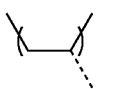
(QIII-16)

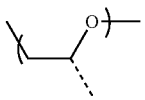
(QIII-17)

(where a broken line represents a bond to a monovalent organic group; R independently represents hydrogen or an alkyl group having 1 to 5 carbon atoms; and any hydrogen in each structure may be substituted with a fluorine atom, a chlorine atom, a methyl group, or a methoxy group.)

Examples of the monovalent organic group include hydrogen and alkyl groups having 1 to 12 carbon atoms (any hydrogen atom in the alkyl group may be substituted with a fluorine atom, a chlorine atom, a methyl group, or a methoxy group, and one $CH_2$ group or two or more non-neighboring $CH_2$ groups in the alkyl group may be substituted with —O—, —CO—O—, —O—CO—, and/or —CH=CH—). Other examples include a trans-1,4-cyclohexylene group, a trans-1,3-dioxan-2,5-diyl group, a 1,4-naphthylene group, a 2,6-naphthylene group, a 2,5-pyridyl group, a 2,5-pyrimidyl group, a 2,5-thiophenylene group, a 2,5-furanylene group, and 1,4-phenylene group (any hydrogen atom in each structure may be substituted with a fluorine atom, a chlorine atom, a methyl group, or a methoxy group).

The spacer units ($S_a$, $S_{aa}$, $S_{aaa}$, $S_b$, $S_{bb}$, and $S_c$) each preferably has a structure represented by general formula (IV) below:

[Chem. 41]

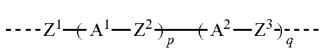
(IV)

(where a broken line represents a bond to $M_a$, $M_b$, $M_c$, P, V, $V_a$, $V_b$, $V_c$, or D;
$Z^1$, $Z^2$, and $Z^3$ each independently represent a single bond, —$(CH_2)_u$—, —$OCH_2$—, —$CH_2O$—, —COO—, —OCO—, —CH=CH—, —CF=CF—, —$CF_2O$—, —$OCF_2$—, —$CF_2CF_2$—, or —C≡C—, u represents 1 to 20, one or more non-neighboring $CH_2$ groups in an alkylene group may be independently substituted with Q representing —O—, —CO—, —CO—O—, —O—CO—, —Si(CH3)$_2$-O—Si(CH$_3$)$_2$—, —NR—, —NR—CO—, —CO—NR—, —NR—CO—O—, —O—CO—NR—, —NR—CO—NR—, —CH=CH—, —C≡C—, or —O—CO—O—, and R independently represents hydrogen or an alkyl group having 1 to 5 carbon atoms;

$A^1$ and $A^2$ each independently represent a trans-1,4-cyclohexylene group, a trans-1,3-dioxan-2,5-diyl group, a 1,4-naphthylene group, a 2,6-naphthylene group, a 2,5-pyridyl group, a 2,5-pyrimidyl group, a 2,5-thiophenylene group, a 2,5-furanylene group, or a 1,4-phenylene group which may be unsubstituted or have one or more hydrogen atoms substituted with a fluorine atom, a chlorine atom, a methyl group, or a methoxy group; and p and q represent 0 or 1)
$Z^1$, $Z^2$, and $Z^3$ are preferably each independently a single bond, —$(CH_2)_u$— (where u represents 1 to 12, one or more non-neighboring $CH_2$ groups independently represent —O—, —CO—, —CO—O—, —O—CO—, —NR—, —NR—CO—, —CO—NR—, —NR—CO—NR—, —CH=CH—, —C≡C—, or —O—CO—O—, and R represents hydrogen, a methyl group, or an ethyl group), —OCH$_2$—, —CH$_2$O—, —COO—, —OCO—, —CH=CH—, —CF$_2$O—, —OCF$_2$—, or —C≡C—. $A^1$ and $A^2$ preferably each independently represent a trans-1,4-cyclohexylene group, a trans-1,3-dioxane-2,5-diyl group, a 1,4-naphthylene group, a 2,6-naphthylene group, a pyridine-2,5-diyl group, a pyrimidine-2,5-diyl group, or a 1,4-phenylene group which may be unsubstituted or have one or more hydrogen atoms substituted with a fluorine atom, a chlorine atom, a methyl group, or a methoxy group. More preferably, $Z^1$, $Z^2$, and $Z^3$ each independently represent a single bond, —$(CH_2)_u$— (where u represents 1 to 10, one or more non-neighboring $CH_2$ groups independently represent —O—, —CO—, —CO—O—, —O—CO—, —NR—, —NR—CO—, —CO—NR—, —CH=CH—, or —C≡C—, and R represents hydrogen, a methyl group, or an ethyl group), —OCH$_2$—, —CH$_2$O—, —COO—, —OCO—, —CH=CH—, or —C≡C—. More preferably, $A^1$ and $A^2$ each independently represent a trans-1,4-cyclohexylene group, a 2,6-naphthylene group, or a 1,4-phenylene group, which may be unsubstituted or have one or more hydrogen atoms substituted with a fluorine atom, a chlorine atom, a methyl group, or a methoxy group. Particularly preferably, $Z^1$, $Z^2$, and $Z^3$ each independently represent a single bond, —$(CH_2)_u$— (where u represents 1 to 6, and one or more non-neighboring $CH_2$ groups independently represent —O—, —CO—O—, —O—CO—, —CH=CH—, or —C≡C—), —OCH$_2$—, —CH$_2$O—, —OCO—, —OCO—, —CH=CH—, or —C≡C—. Particularly preferably, $A^1$ and $A^2$ each independently represent a trans-1,4-cyclohexylene group, a 2,6-naphthylene group, or a 1,4-phenylene group, which may be unsubstituted or have one or more hydrogen atoms substituted with a fluorine atom, a methyl group, or a methoxy group.

In general formula (IV), in order to improve the liquid crystal alignment property, $Z^1$, $Z^2$, and $Z^3$ are preferably each independently a single bond, —$(CH_2)_u$— (where u represents 1 to 8, and one or more non-neighboring $CH_2$ groups independently represent —O—, —CO—O—, —O—CO—, —Si(CH$_3$)$_2$—O—Si(CH$_3$)$_2$—, —CH=CH—, or —C≡C—), —OCO—, —OCO—, —CH=CH—, —CF=CF—, or —C≡C—; and $A^1$ and $A^2$ each independently represent a trans-1,4-cyclohexylene group, a trans-1,3-dioxane-2,5-diyl group, a pyridine-2,5-diyl group, a pyrimidine-2,5-diyl group, a 2,5-thiophenylene group, or a 1,4-phenylene group. In order to improve the thermal stability of the alignment, $Z^1$, $Z^2$, and $Z^3$ are preferably each independently —NR—CO—, —CO—NR—, —NR—CO—O—, —O—CO—NR—, —NR—CO—NR—, or —O—CO—O— and $A^1$ and $A^2$ are preferably each independently a 1,4-naphthylene group, a 2,6-naphthylene group, a pyridine-2,5-diyl group, a pyrimidine-2,5-diyl group, a 2,5-thiophenylene group, a 2,5-furanylene group, or a 1,4-phenylene group. In order to improve the solubility of the polymer, $Z^1$, $Z^2$, and $Z^3$ are preferably each independently —OCH$_2$—, —CH$_2$O—, —CF$_2$O—, —OCF$_2$—, —CF$_2$CF$_2$—, —NR—, or —CO— and $A^1$ and $A^2$ are preferably each independently a trans-1,4-cyclohexylene group, a 1,4-naphthylene group, a 2,6-naphthylene group, or a 2,5-furanylene group.

Many compounds are included in general formula (IV). In particular, compounds represented by formulae (S-a-1) to (S-ad-9) below are preferable.

[Chem. 42]

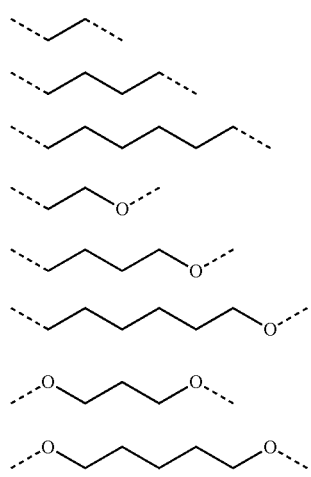

[Chem. 43]

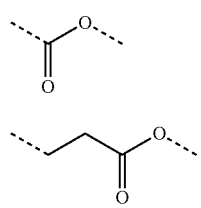

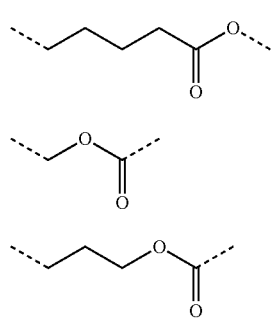
[Chem. 44]
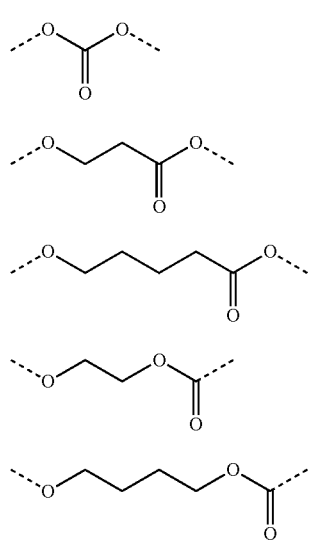
[Chem. 45]
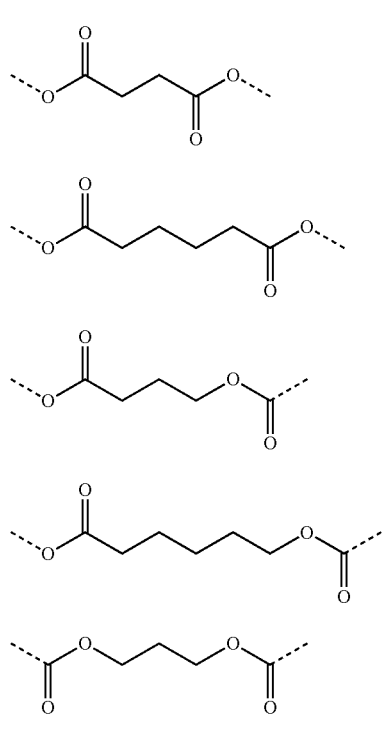
-continued
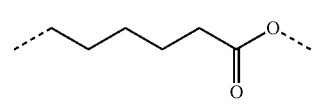 (S-b-6)
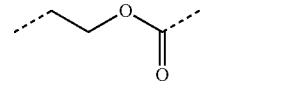 (S-b-8)
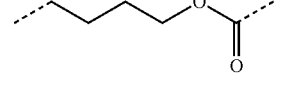 (S-b-10)
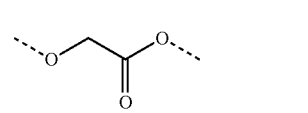 (S-c-2)
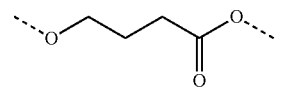 (S-c-4)
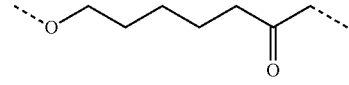 (S-c-6)
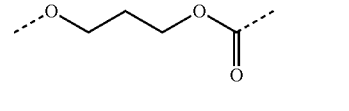 (S-c-8)
 (S-c-10)
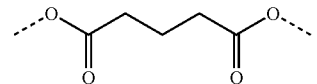 (S-d-2)
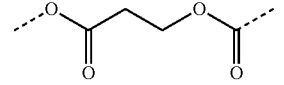 (S-d-4)
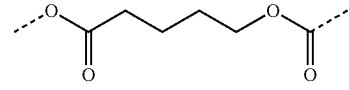 (S-d-6)
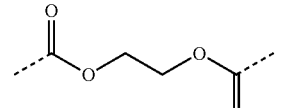 (S-d-8)
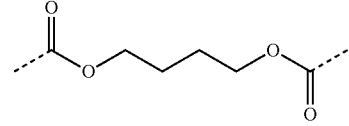 (S-d-10)

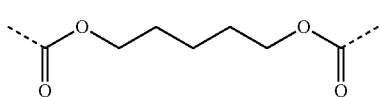
(S-d-11)
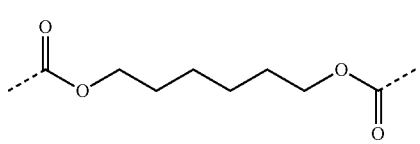
-continued
(S-d-12)
[Chem. 46]
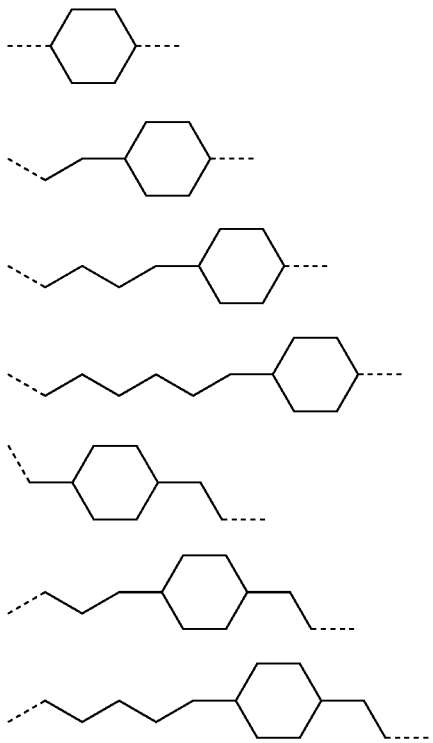
(S-e-1)
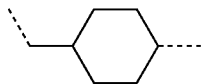
(S-e-2)
(S-e-3)
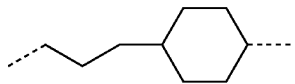
(S-e-4)
(S-e-5)
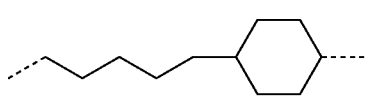
(S-e-6)
(S-e-7)
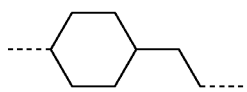
(S-e-8)
(S-e-9)
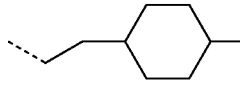
(S-e-10)
(S-e-11)
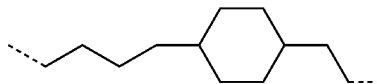
(S-e-12)
(S-e-13)
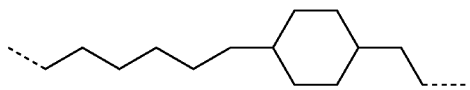
(S-e-14)
[Chem. 47]
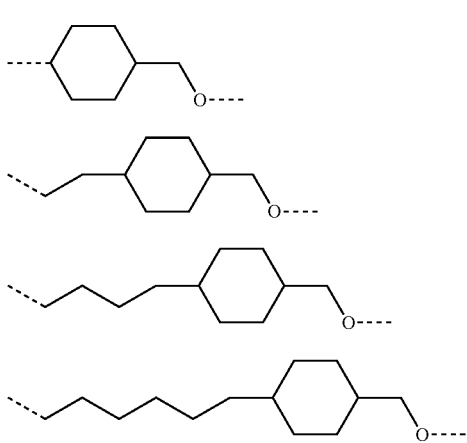
(S-f-1)
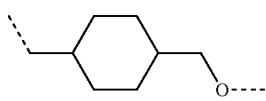
(S-f-2)
(S-f-3)
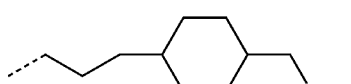
(S-f-4)
(S-f-5)
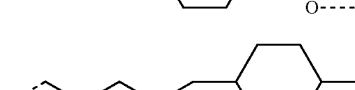
(S-f-6)
(S-f-7)
[Chem. 48]
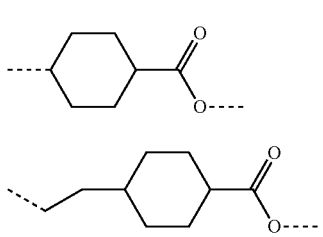
(S-g-1)
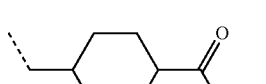
(S-g-2)
(S-g-3)
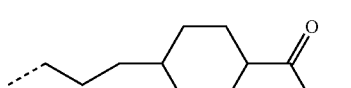
(S-g-4)

-continued
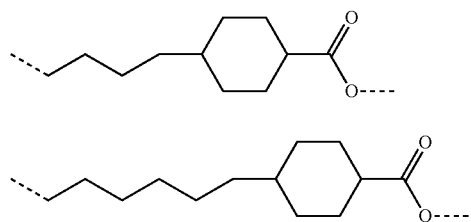
(S-g-5)
(S-g-6)
(S-g-7)
[Chem. 49]
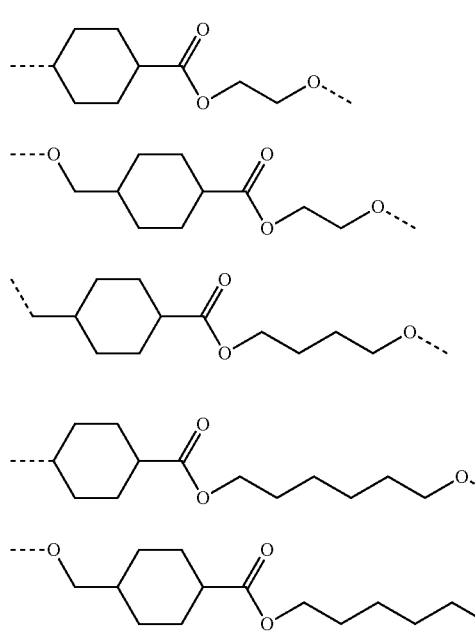
(S-h-1) (S-h-2)
(S-h-3) (S-h-4)
(S-h-5) (S-h-6)
(S-h-7) (S-h-8)
(S-h-9)
[Chem. 50]
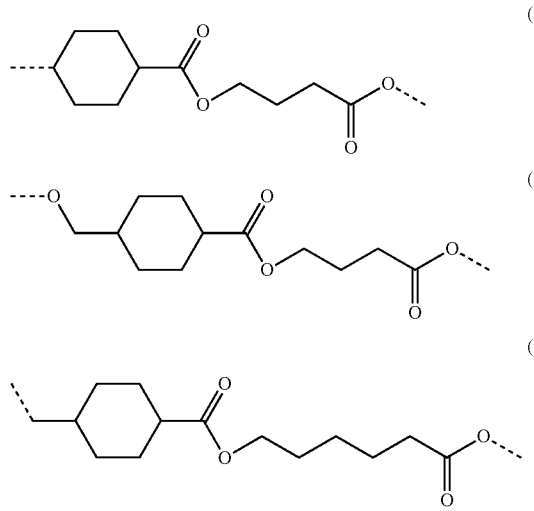
(S-i-1) (S-i-2)
(S-i-3) (S-i-4)
(S-i-5) (S-i-6)
[Chem. 51]
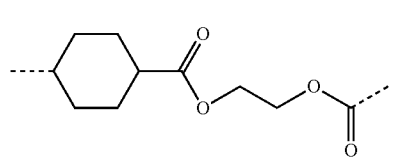
(S-j-1) (S-j-2)

-continued
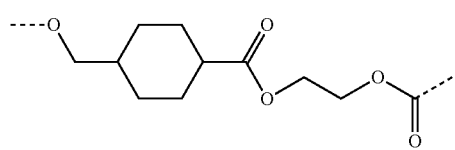 (S-j-3)
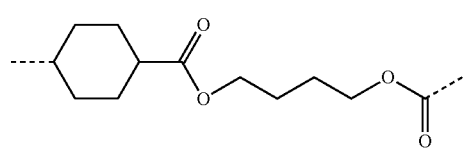 (S-j-4)
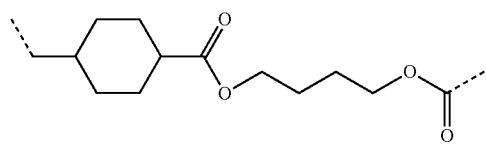 (S-j-5)
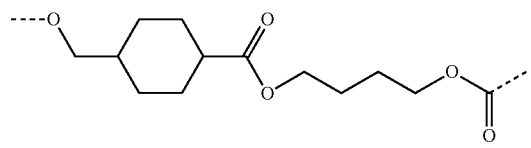 (S-j-6)
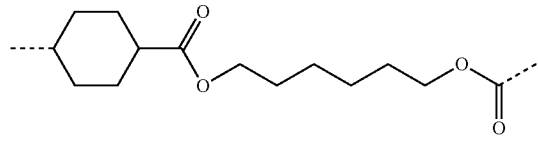 (S-j-7)
(S-j-8)
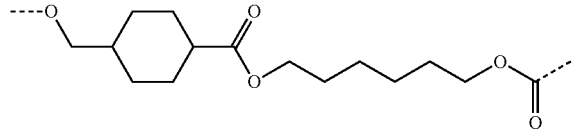 (S-j-9)
[Chem. 52]
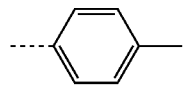 (S-k-1)
(S-k-2)
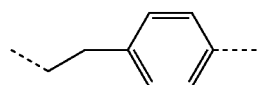 (S-k-3)
(S-k-4)
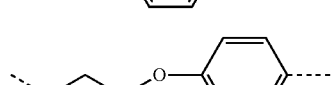 (S-k-5)
(S-k-6)
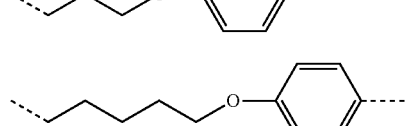 (S-k-7)
(S-k-8)
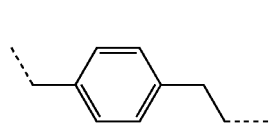 (S-k-9)
(S-k-10)
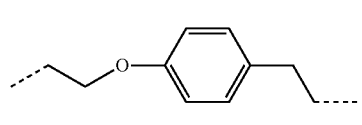 (S-k-11)
(S-k-12)
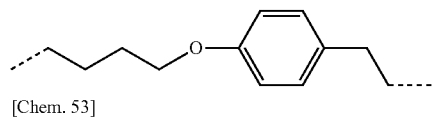 (S-k-13)
(S-k-14)
[Chem. 53]
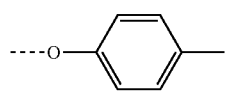 (S-l-1)
(S-l-2)
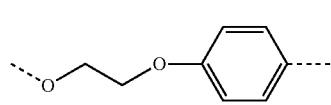 (S-l-3)
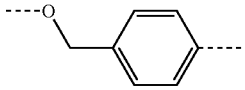 
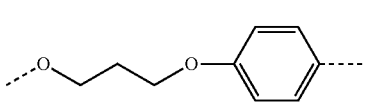 (S-l-4)

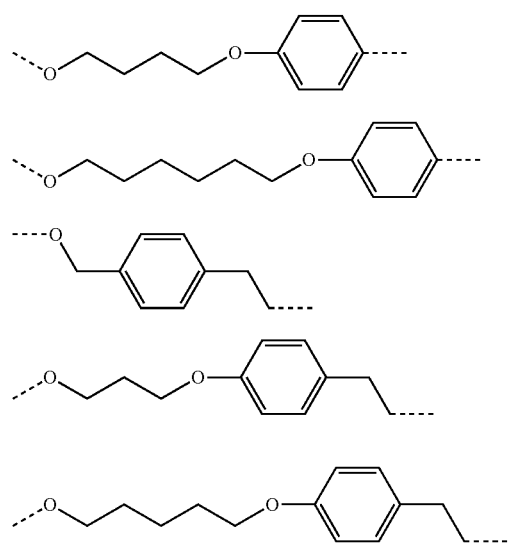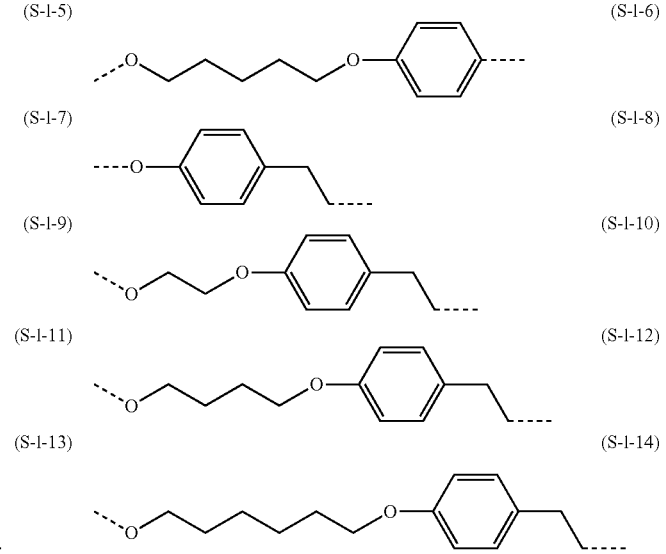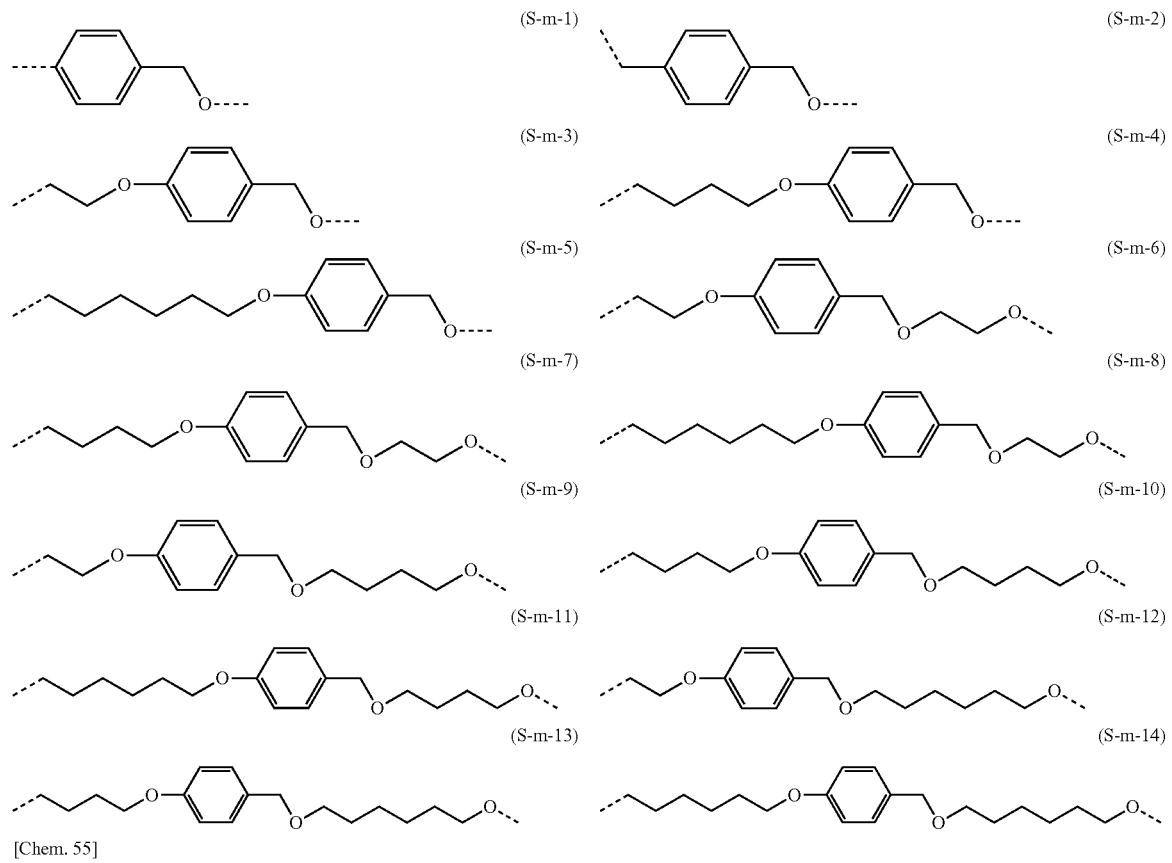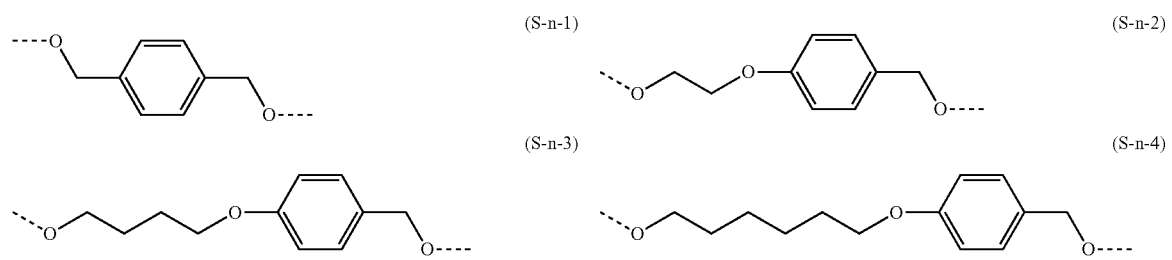

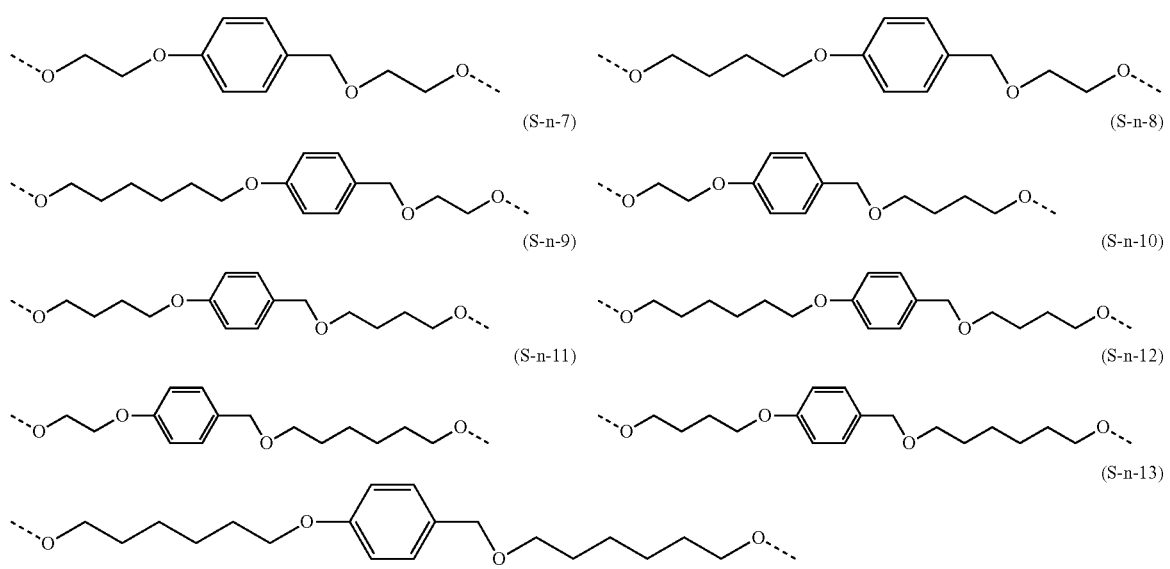
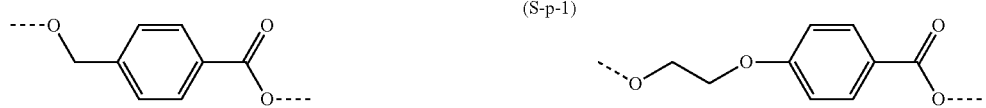

-continued
(S-p-3)
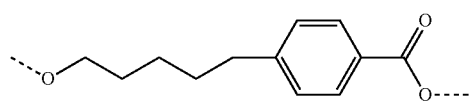
(S-p-4)
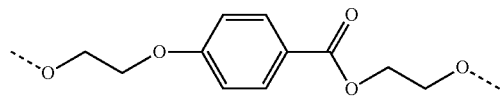
(S-p-5)
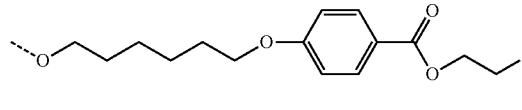
(S-p-6)
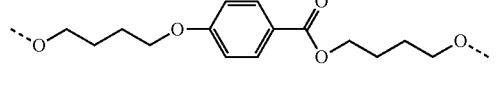
(S-p-7)
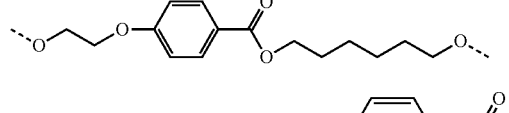
(S-p-8)
(S-p-9)
(S-p-10)
(S-p-11)
(S-p-12)
(S-p-13)
[Chem. 58]
(S-q-1)
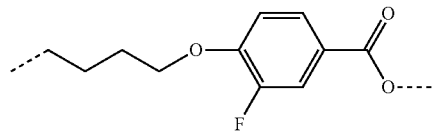
(S-q-2)
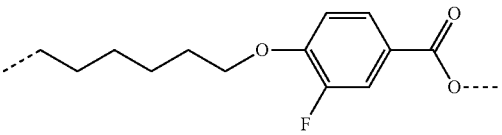
(S-q-3)
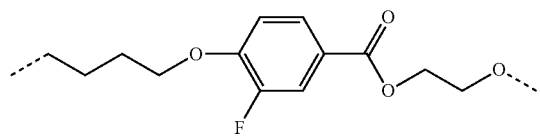
(S-q-4)
(S-q-5)
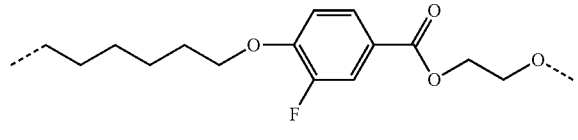
(S-q-6)
(S-q-7)
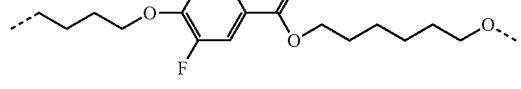
(S-q-8)
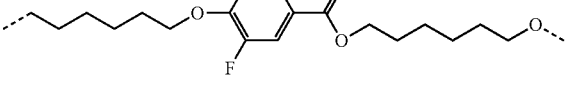

-continued
(S-r-1) 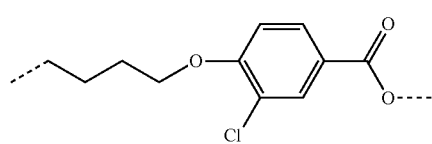
(S-r-2) 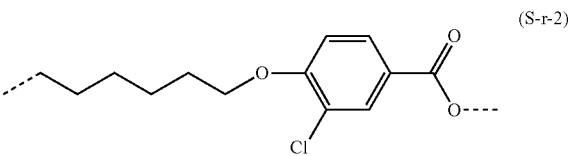
(S-r-3) 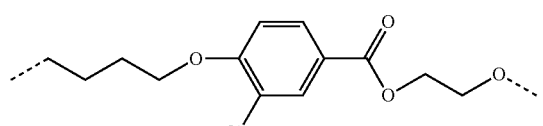
(S-r-4) 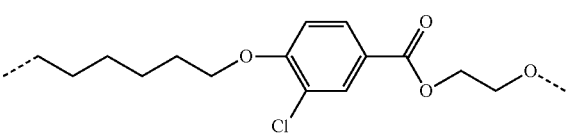
(S-r-5) 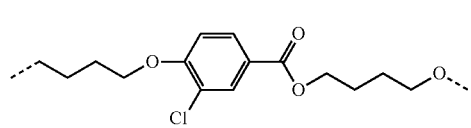
(S-r-6) 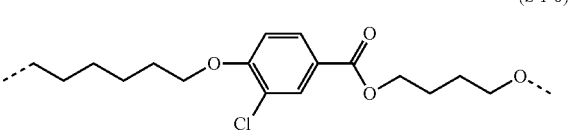
(S-r-7) 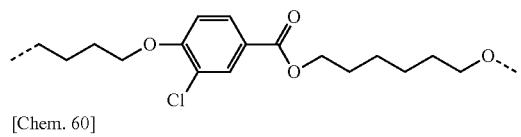
(S-r-8) 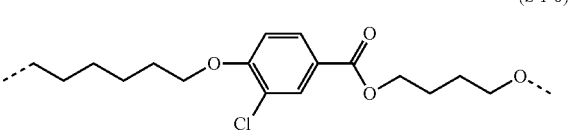
(S-s-1) 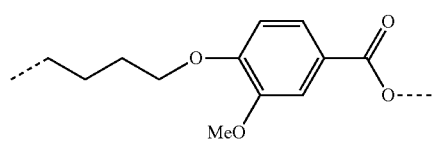
(S-s-2) 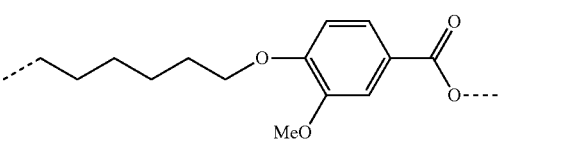
(S-s-3) 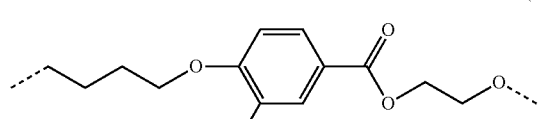
(S-s-4) 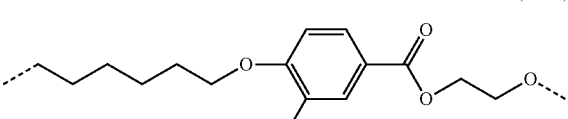
(S-s-5) 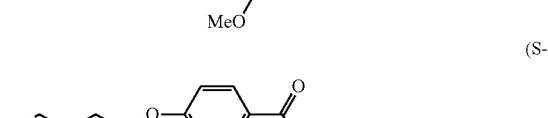
(S-s-6) 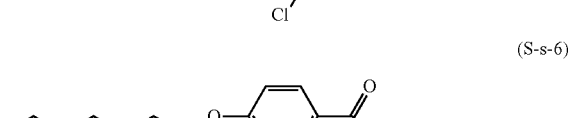
(S-s-7) 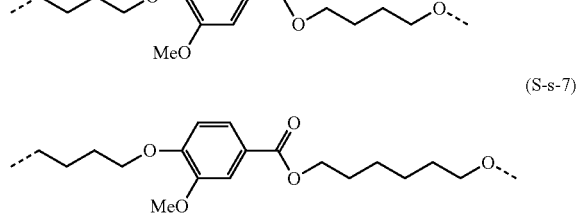
(S-t-1) 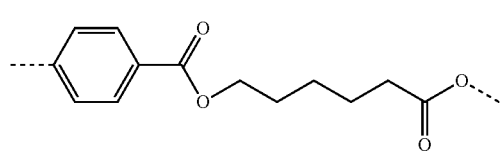
(S-t-2) 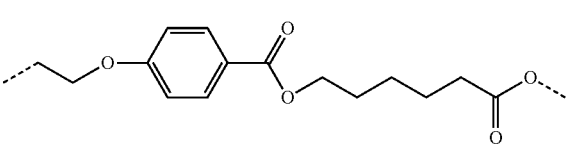
(S-t-3) 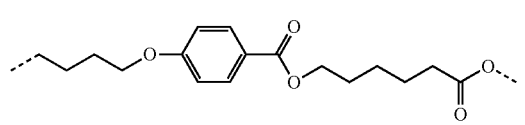
(S-t-4) 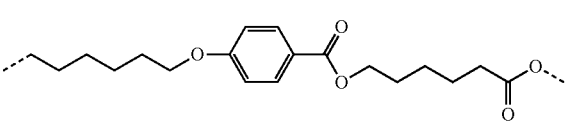

-continued
(S-t-5) 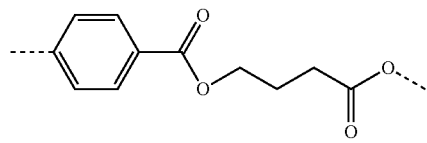
(S-t-6) 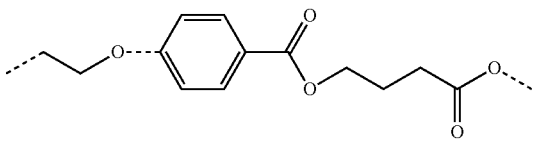
[Chem. 62]
(S-t-7) 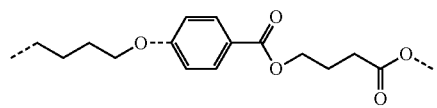
(S-u-1) 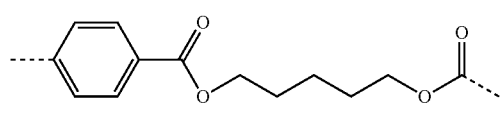
(S-u-2) 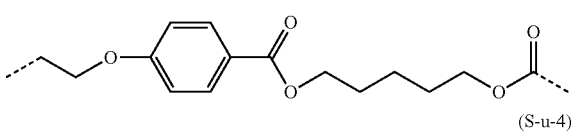
(S-u-3) 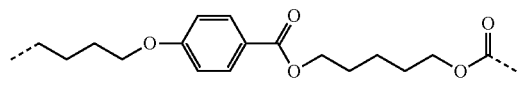
(S-u-4) 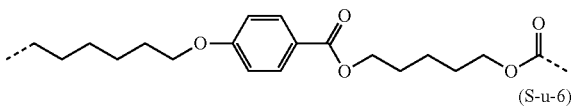
(S-u-5) 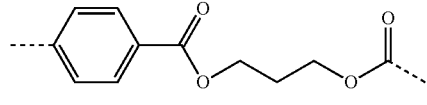
(S-u-6) 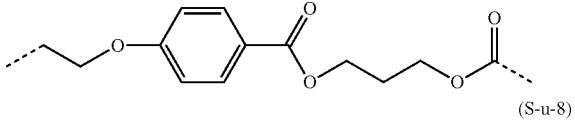
(S-u-7) 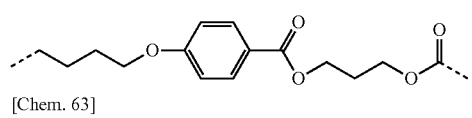
[Chem. 63]
(S-v-1) 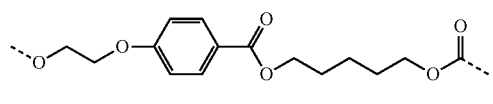
(S-v-2) 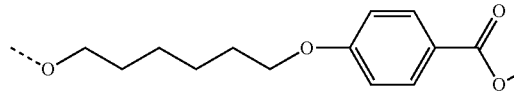
(S-v-3) 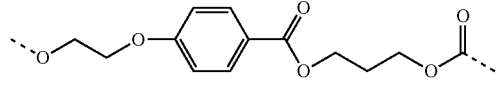
(S-v-4) 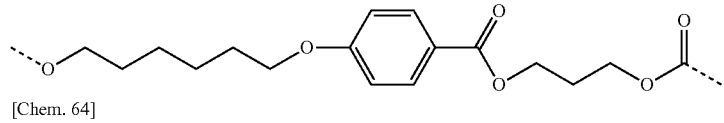
[Chem. 64]
(S-w-1) 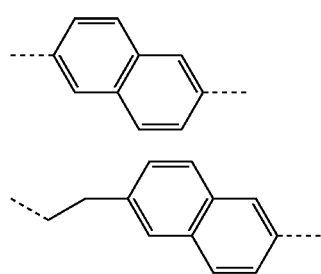
(S-w-2) 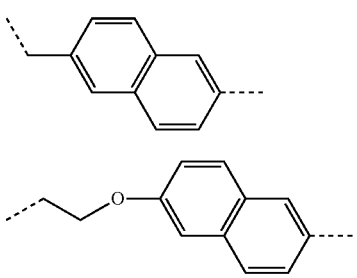

-continued
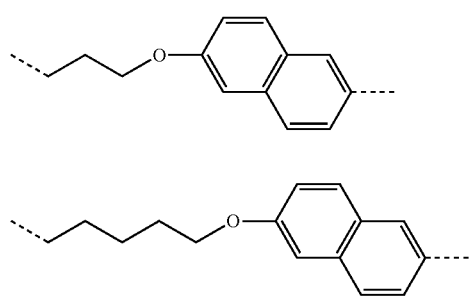
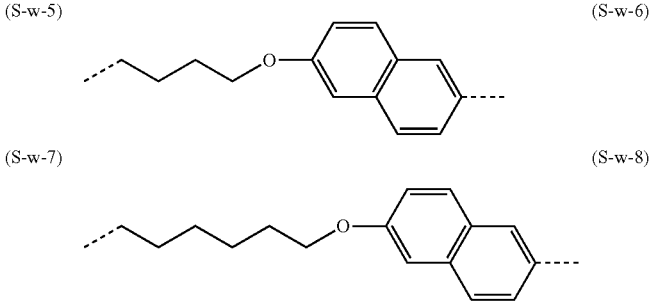
[Chem. 65]
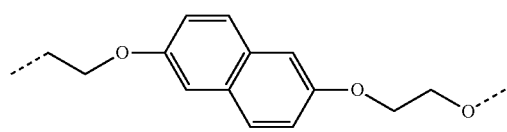
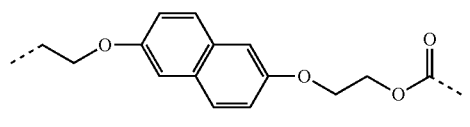
[Chem. 66]
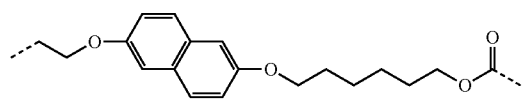
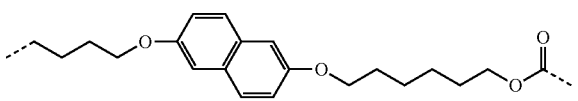

(S-y-9)
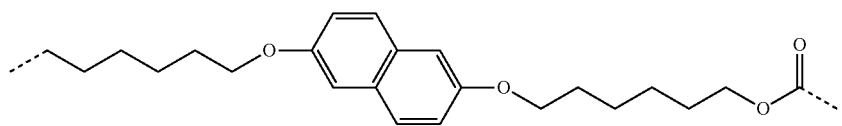
[Chem. 67]
(S-z-1) 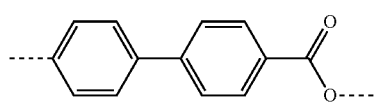  (S-z-2) 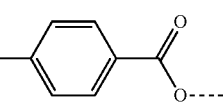
(S-z-3) 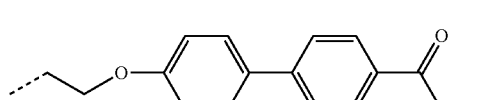  (S-z-4) 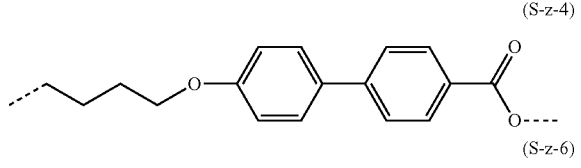
(S-z-5) 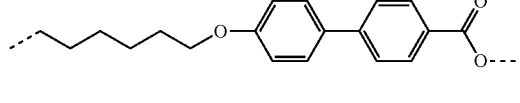  (S-z-6) 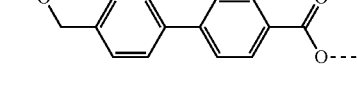
(S-z-7) 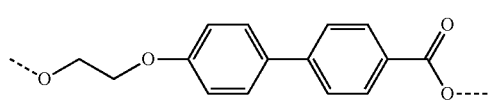  (S-z-8) 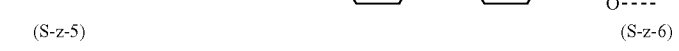
(S-z-9) 
[Chem. 68]
(S-aa-1) 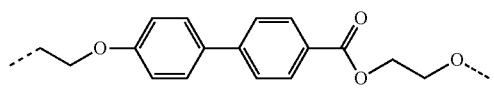  (S-aa-2) 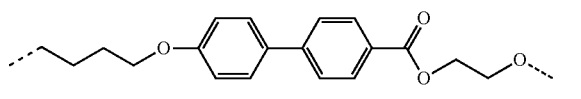
(S-aa-3) 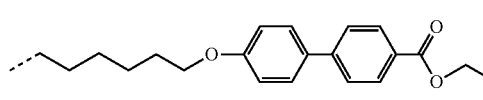  (S-aa-4) 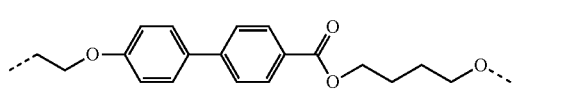
(S-aa-5) 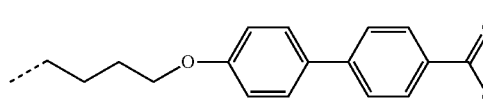
(S-aa-6) 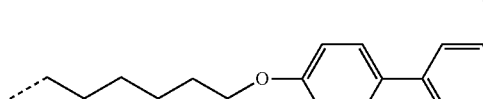
(S-aa-7) 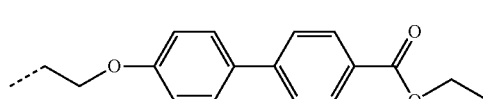
(S-aa-8) 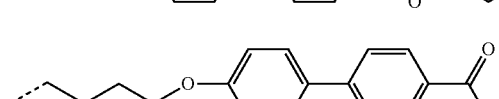
(S-aa-9) 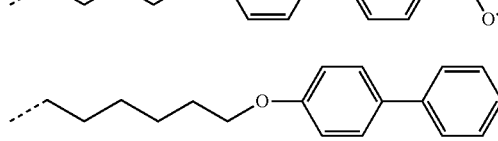

-continued
[Chem. 69]
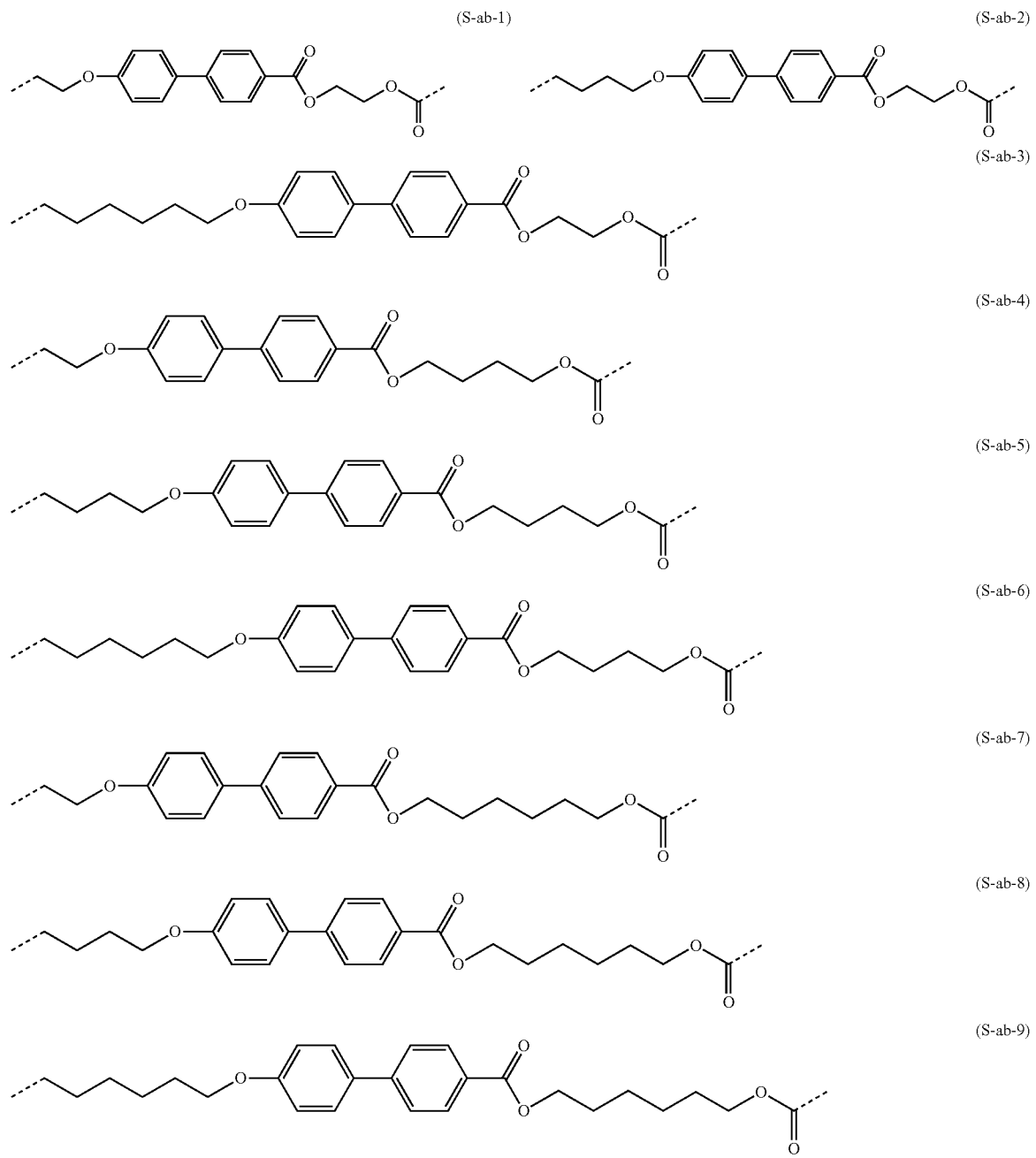
[Chem. 70]
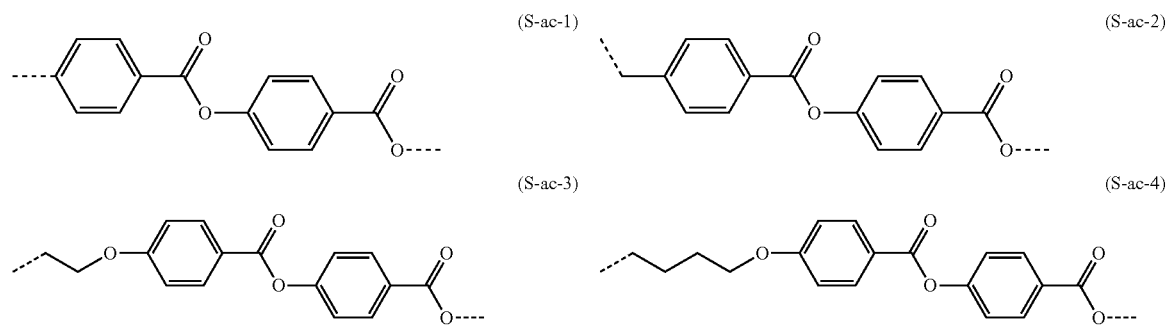

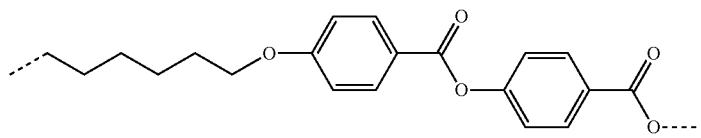
(S-ac-5)
[Chem. 71]
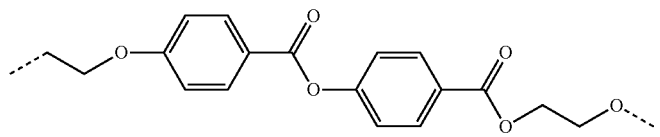
(S-ad-1)
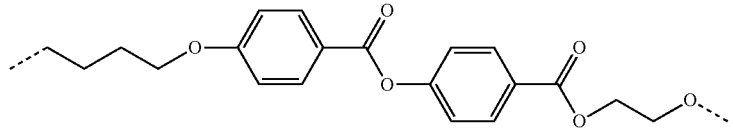
(S-ad-2)
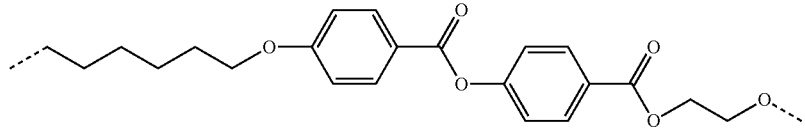
(S-ad-3)
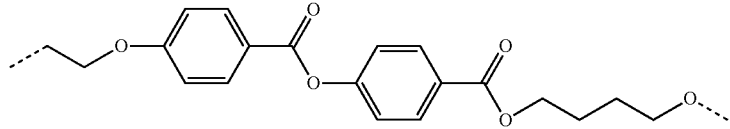
(S-ad-4)
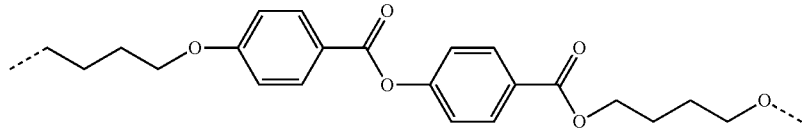
(S-ad-5)
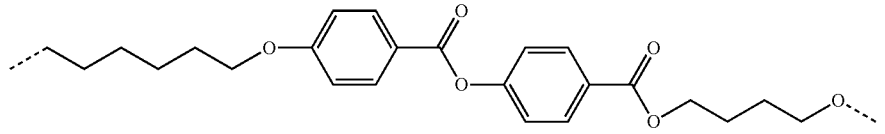
(S-ad-6)
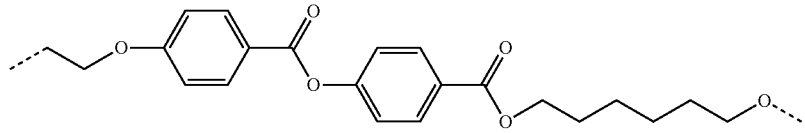
(S-ad-7)
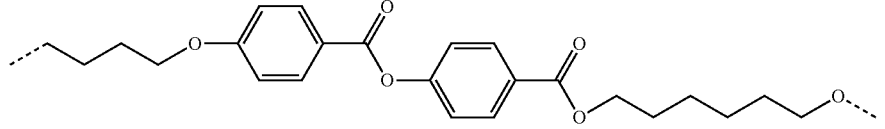
(S-ad-8)
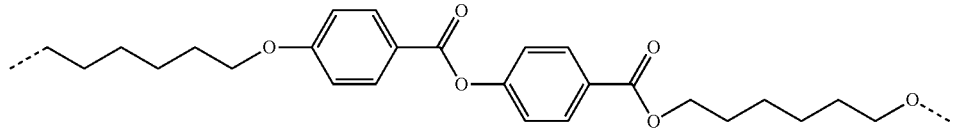
(S-ad-9)

Among these, compounds represented by formulae (S-a-6) to (S-a-16), formulae (S-b-3) to (S-b-10), formulae (S-c-3) to (S-c-10), formulae (S-d-3) to (S-d-12), formulae (S-k-4) to (S-k-7), formulae (S-l-13) to (S-l-17), formulae (S-o-3) to (S-o-14), formulae (S-p-2) to (S-p-13), formulae (S-s-1) to (S-s-8), formulae (S-t-1) to (S-t-8), formulae (S-y-1) to (S-y-9), and formulae (S-aa-1) to (S-aa-9) are more preferable.

The moieties (V, $V_a$, $V_b$, and $V_c$) that stabilize the vertical alignment each preferably has a structure represented by general formula (V) below:

[Chem. 72]

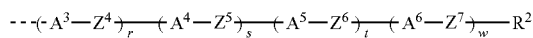

(V)

(where a broken line represents a bond to $S_c$, $S_{aa}$, $S_{bb}$, or $S_{aaa}$; $Z^4$, $Z^5$, $Z^6$ and $Z^7$ each independently represent a single bond, —(CH$_2$)$_u$—, —OCH$_2$—, —CH$_2$O—, —COO—, —OCO—, —CH=CH—, —CF=CF—, —CF$_2$O—, —OCF$_2$—, —CF$_2$CF$_2$—, or —C≡C—, u represents 1 to 20, and one or more non-neighboring CH$_2$ groups in an alkylen group may be independently substituted with Q representing —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH=CH—, —C≡C—, or —O—CO—O—, where R independently represents hydrogen or an alkyl group having 1 to 5 carbon atoms;

$A^3$, $A^4$, $A^5$, and $A^6$ each independently represent a trans-1,4-cyclohexylene group, a trans-1,3-dioxan-2,5-diyl group, a 1,4-naphthylene group, a 2,6-naphthylene group, a 2,5-pyridyl group, a 2,5-pyrimidyl group, a 2,5-thiophenylene group, a 2,5-furanylene group, or a 1,4-phenylene group which may be unsubstituted or have one or more hydrogen atoms substituted with a fluorine atom, a chlorine atom, a methyl group, or a methoxy group;

r, s, t, and w represent 0 or 1; and $R^2$ represents hydrogen, fluorine, chlorine, a cyano group, or an alkyl group having 1 to 20 carbon atoms (which may be substituted with fluorine or have one CH$_2$ group or two or more non-neighboring CH2 groups substituted with —O—, —CO—O—, —O—CO—, and/or —CH=CH—)).

$Z^4$, $Z^5$, $Z^6$, and $Z^7$ are preferably each independently a single bond, —(CH$_2$)$_u$— (where u represents 1 to 12, one or more non-neighboring CH$_2$ groups are independently —O—, —CO—, —CO—O—, —O—CO—, —NR—, —NR—CO—, —CO—NR—, —NR—CO—NR—, —CH=CH—, —C≡C—, or —O—CO—O—, and R independently represents hydrogen, a methyl group, or an ethyl group), —OCH$_2$—, —CH$_2$O—, —OCO—, —OCO—, —CH=CH—, —CF$_2$O—, —OCF$_2$—, or —C≡C—.

$A^3$, $A^4$, $A^5$, and $A^6$ are preferably each independently a trans-1,4-cyclohexylene group, a 2,6-naphthylene group, a pyridine-2,5-diyl group, a pyrimidine-2,5-diyl group, or a 1,4-phenylene group, which may be unsubstituted or have one or more hydrogen atoms substituted with a fluorine atom, a chlorine atom, a methyl group, or a methoxy group.

Preferably, the sum of r, s, t, and u, i.e., r+s+t+u, is 0 or more and 3 or less.

$R^2$ preferably represents hydrogen, fluorine, chlorine, a cyano group, or an alkyl group having 1 to 18 carbon atoms (one CH$_2$ group or two or more non-neighboring CH$_2$ groups in the alkyl group may be substituted with —O—, —CO—O—, —O—CO—, and/or —CH=CH—). More preferably, the polymer contains a polymer represented by general formula (Ie):

In order to improve the liquid crystal alignment property, $Z^4$, $Z^5$, $Z^6$, and $Z^7$ are preferably each independently a single bond, —(CH$_2$)$_u$— (where u represents 1 to 8, one or more non-neighboring CH$_2$ groups independently represent —O—, —CO—O—, —O—CO—, —Si(CH$_3$)$_2$—O—Si(CH$_3$)$_2$—, —CH=CH—, or —C≡C—), —OCO—, —OCO—, —CH=CH—, —CF=CF—, or —C≡C—. $A^3$, $A^4$, $A^5$ and $A^6$ are preferably each a trans-1,4-cyclohexylene group, a trans-1,3-dioxane-2,5-diyl group, a pyridine-2,5-diyl group, a pyrimidine-2,5-diyl group, a 2,5-thiophenylene group, or a 1,4-phenylene group.

In order to improve the thermal stability of the alignment, $Z^4$, $Z^5$, $Z^6$, and $Z^7$ are preferably each independently —NR—CO—, —CO—NR—, —NR—CO—O—, —O—CO—NR—, —NR—CO—NR—, or —O—CO—O— and $A^3$, $A^4$, $A^5$, and $A^6$ are preferably each independently a 1,4-naphthylene group, a 2,6-naphthylene group, a pyridine-2,5-diyl group, a pyrimidine-2,5-diyl group, a 2,5-thiophenylene group, a 2,5-furanylene group, or a 1,4-phenylene group. In order to improve the solubility of the polymer, $Z^4$, $Z^5$, $Z^6$, and $Z^7$ are preferably each independently —OCH$_2$—, —CH$_2$O—, —CF$_2$O—, —OCF$_2$—, —CF$_2$CF$_2$—, —NR—, or —CO— and $A^3$, $A^4$, $A^5$, and $A^6$ are preferably each independently a trans-1,4-cyclohexylene group, a 1,4-naphthylene group, a 2,6-naphthylene group, or a 2,5-furanylene group.

In order to form a pretilt angle of 80 degrees or more, $Z^4$, $Z^5$, $Z^6$, and $Z^7$ are preferably each independently —OCH$_2$—, —CH$_2$O—, —COO—, —OCO—, or —C≡C—, $A^3$, $A^4$, $A^5$, and $A^6$ are each independently a trans-1,4-cyclohexylene group, a trans-1,3-dioxane-2,5-diyl group, or a 1,4-naphthylene group, and $R^2$ is preferably an alkyl group having 1 to 10 carbon atoms, an alkoxy group, fluorine, a trifluoromethyl group, or a trifluoromethoxy group.

Many compounds are included in general formula (V). In particular, compounds represented by formulae (V-a-1) to (V-q-10) below are preferable.

[Chem. 73]

 (V-a-1)

 (V-a-2)

 (V-a-3)

 (V-a-4)

 (V-a-5)

 (V-a-6)

 (V-a-7)

 (V-a-8)

 (V-a-9)

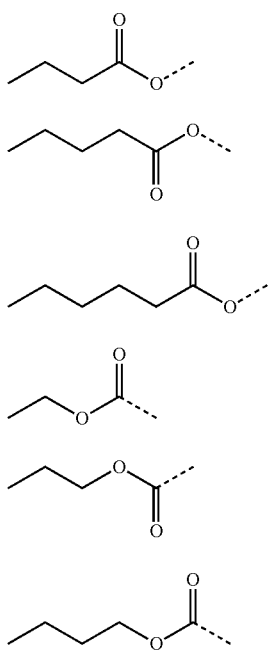
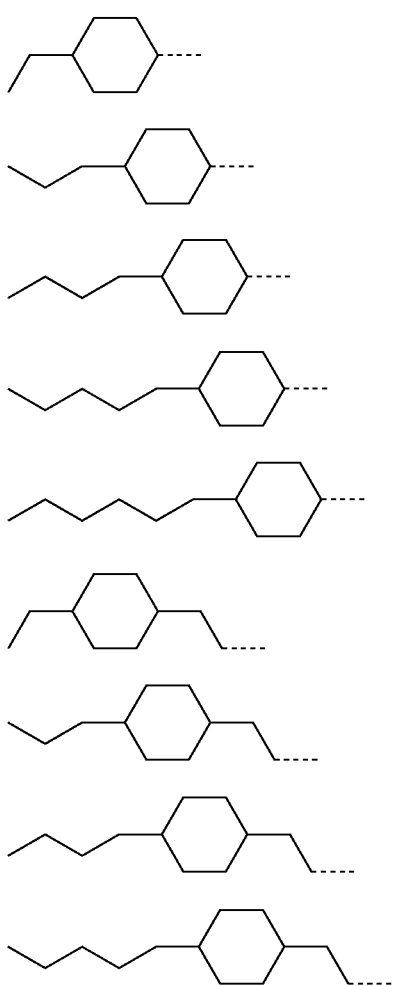
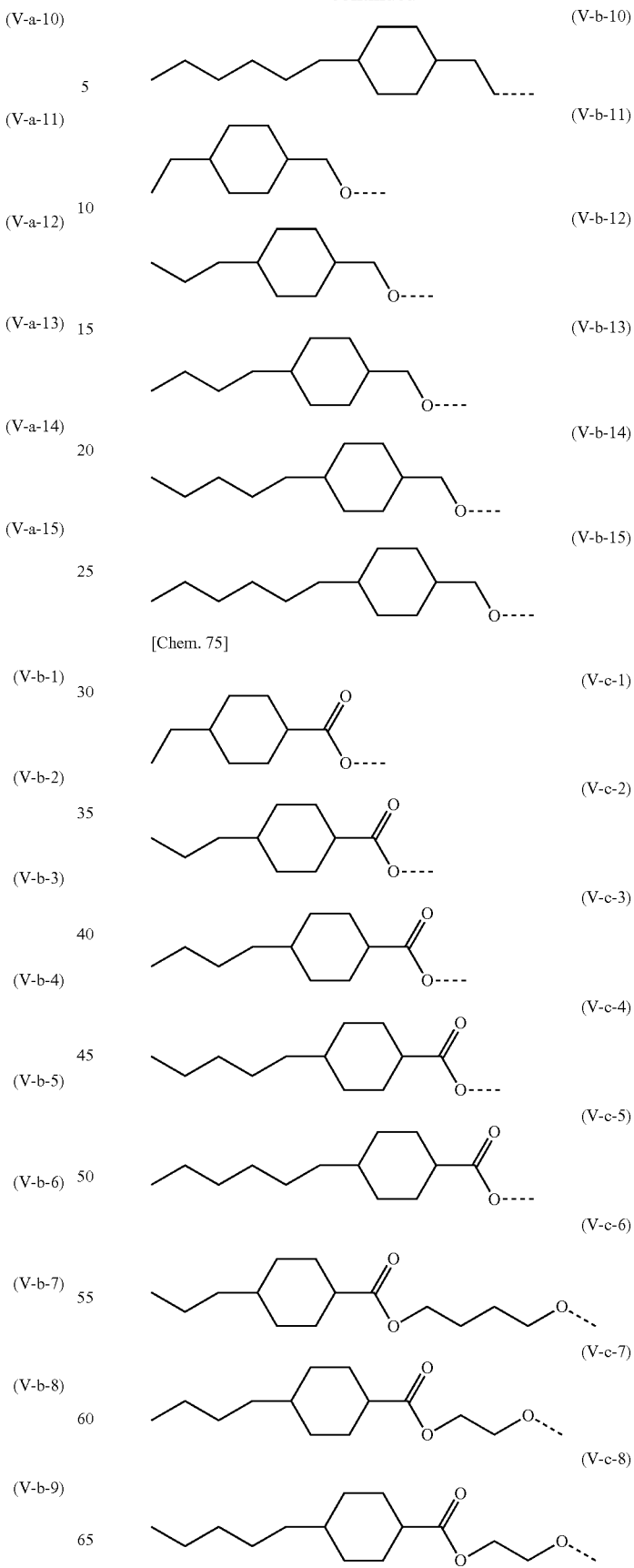

(V-c-9)
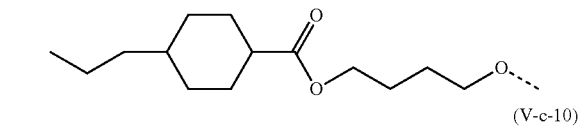
(V-c-10)
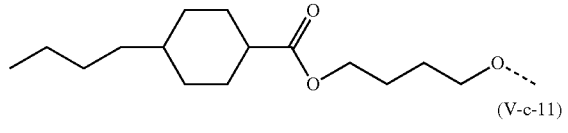
(V-c-11)
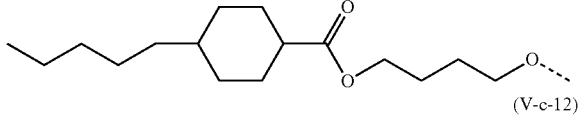
(V-c-12)
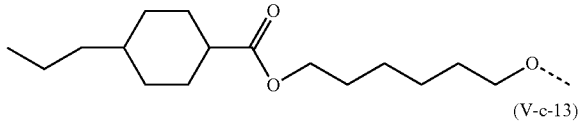
(V-c-13)
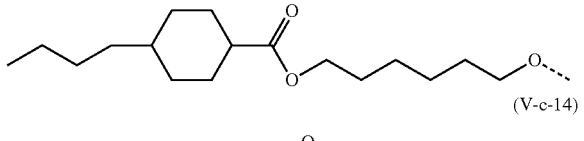
(V-c-14)
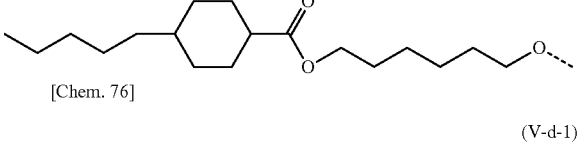
[Chem. 76]
(V-d-1)
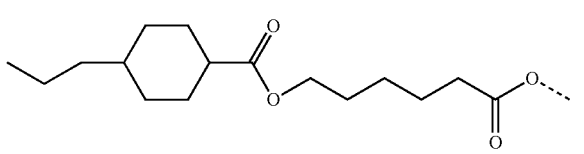
(V-d-2)
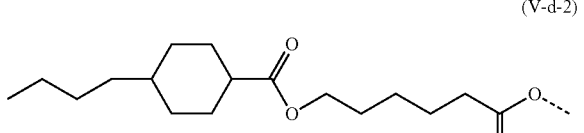
(V-d-3)
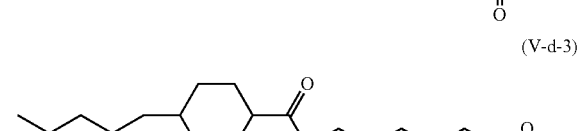
(V-d-4)
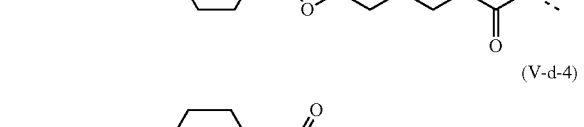
(V-d-5)
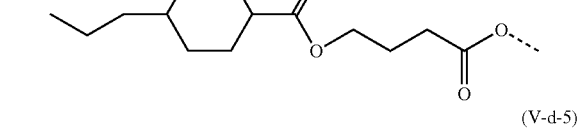
(V-d-6)
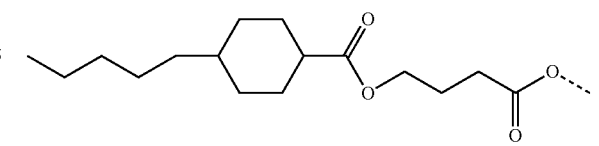
(V-d-7)
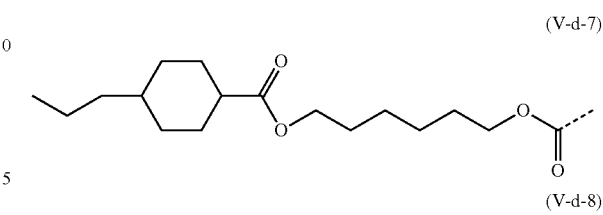
(V-d-8)
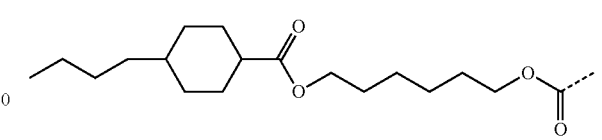
(V-d-9)
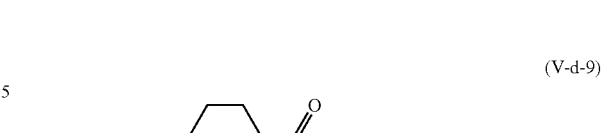
(V-d-10)
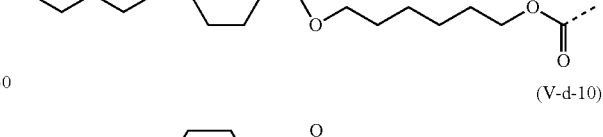
(V-d-11)
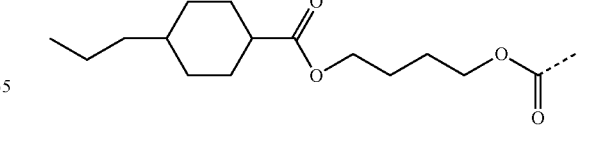
(V-d-12)
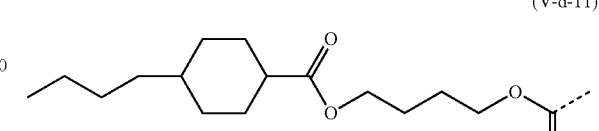
(V-d-13)
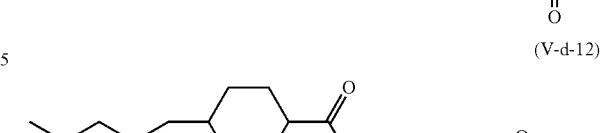
(V-d-14)
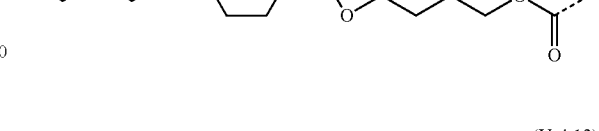
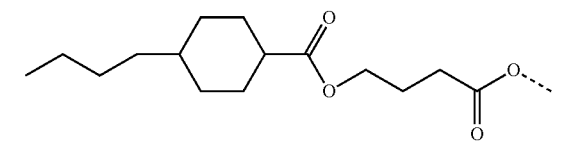
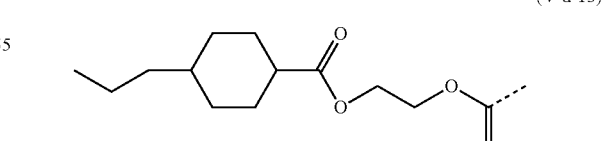
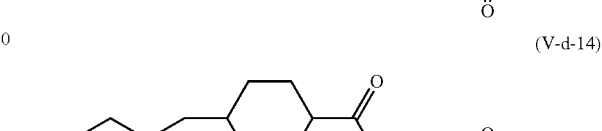

-continued (V-d-15)

[Chem. 77]

(V-e-1)

(V-e-2)

(V-e-3)

(V-e-4)

(V-e-5)

(V-e-6)

(V-e-7)

(V-e-8)

(V-e-9)

[Chem. 78]

(V-f-1)

(V-f-2)

(V-f-3)

(V-f-4)

-continued (V-f-5)

(V-f-6)

(V-f-7)

(V-f-8)

(V-f-9)

(V-f-10)

[Chem. 79]

(V-g-1)

(V-g-2)

(V-g-3)

(V-g-4)

(V-g-5)

(V-g-6)

(V-g-7)

(V-g-8)

(V-g-9)
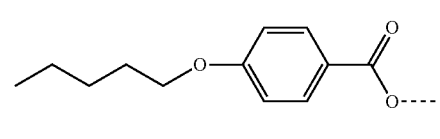
(V-g-10)
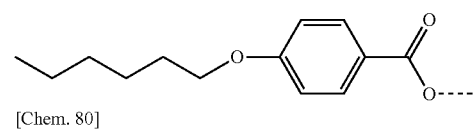
[Chem. 80]
(V-h-1)
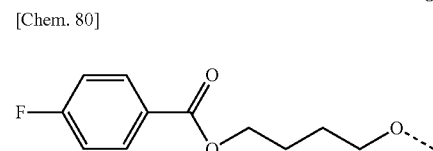
(V-h-2)
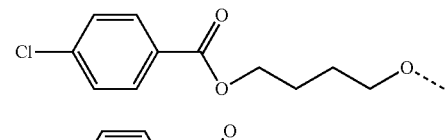
(V-h-3)
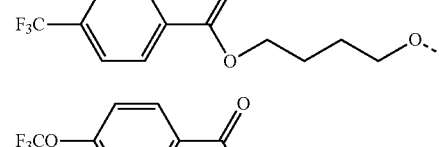
(V-h-4)
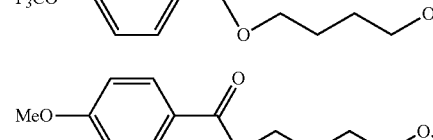
(V-h-5)
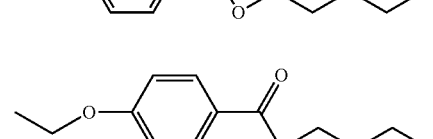
(V-h-6)
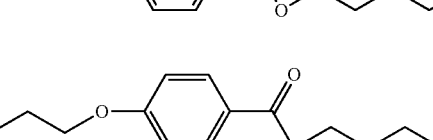
(V-h-7)
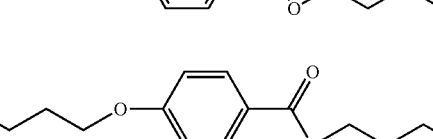
(V-h-8)
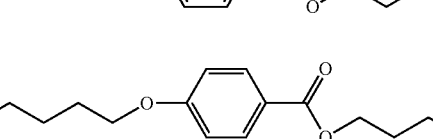
(V-h-9)
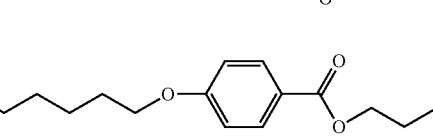
(V-h-10)
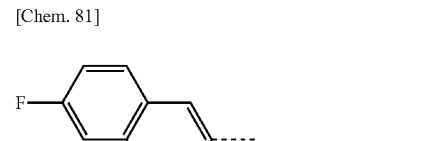
[Chem. 81]
(V-i-1)
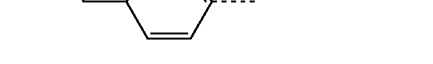
(V-i-2)
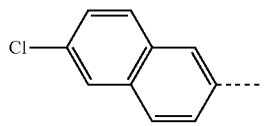
(V-i-3)
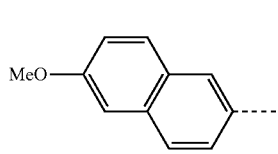
(V-i-4)
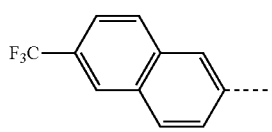
(V-i-5)
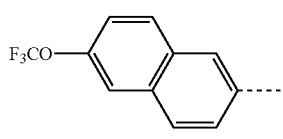
(V-i-6)
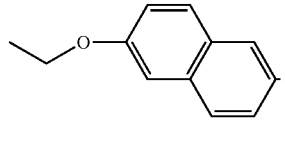
(V-i-7)
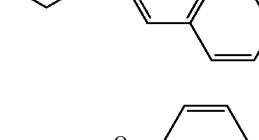
(V-i-8)
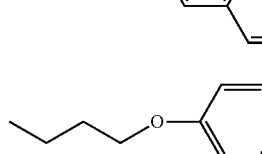
(V-i-9)
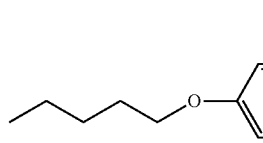
[Chem. 82]
(V-j-1)
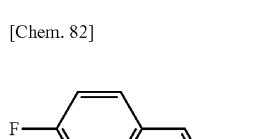
(V-j-2)
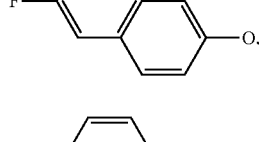
(V-j-3)
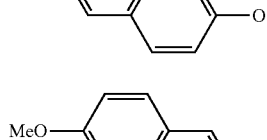

(Chemical structure diagrams for compounds V-j-4 through V-j-9, V-k-1 through V-k-11, and V-l-1 through V-l-9. [Chem. 83] and [Chem. 84] section markers present.)

(V-l-10)
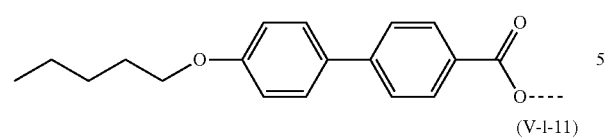
(V-l-11)
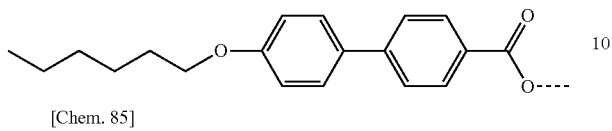
[Chem. 85]
(V-m-1)
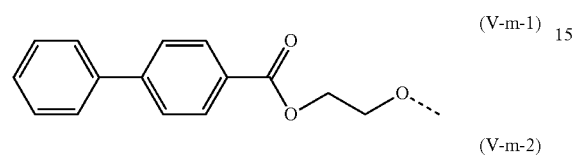
(V-m-2)
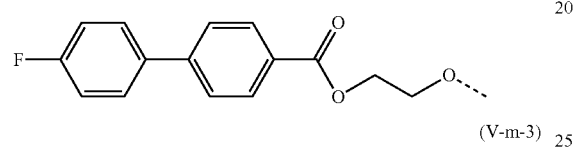
(V-m-3)
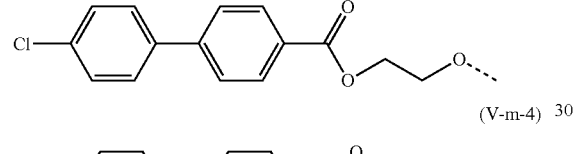
(V-m-4)
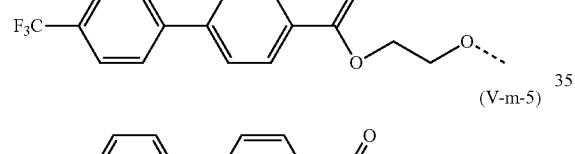
(V-m-5)
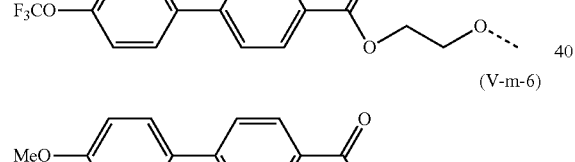
(V-m-6)
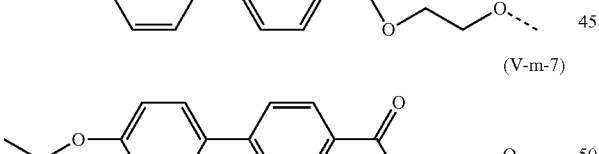
(V-m-7)
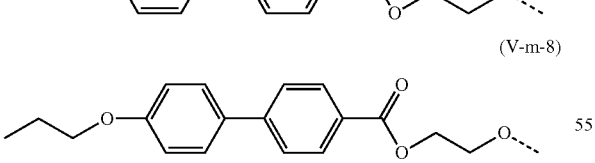
(V-m-8)
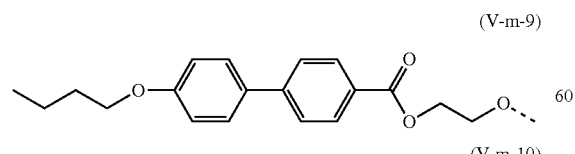
(V-m-9)
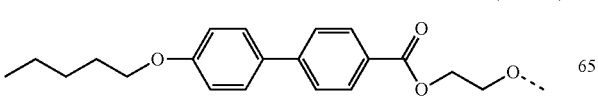
(V-m-10)
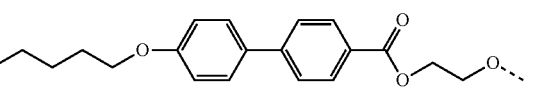
(V-m-11)
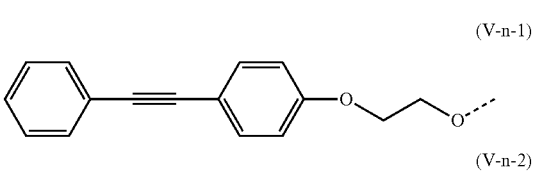
[Chem. 86]
(V-n-1)
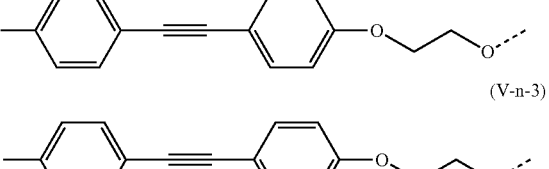
(V-n-2)
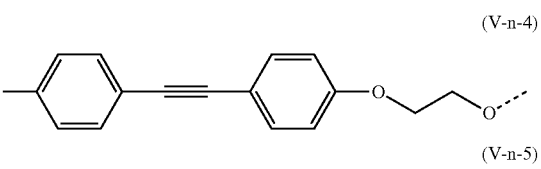
(V-n-3)
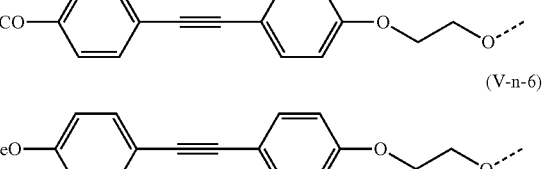
(V-n-4)
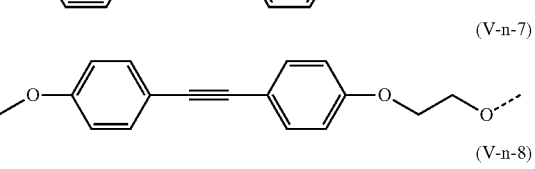
(V-n-5)
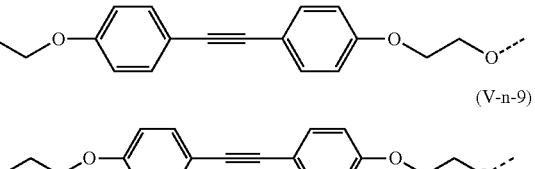
(V-n-6)
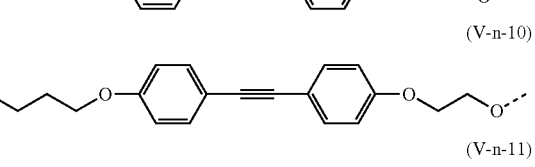
(V-n-7)
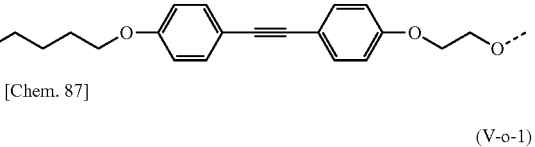
(V-n-8)
(V-n-9)
(V-n-10)
(V-n-11)
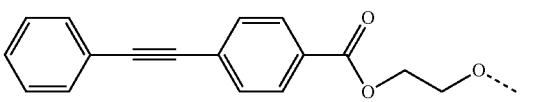
[Chem. 87]
(V-o-1)

(V-o-2)
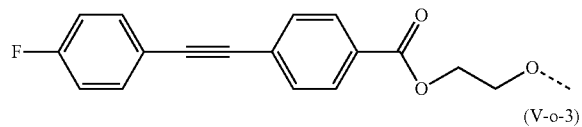
(V-o-3)
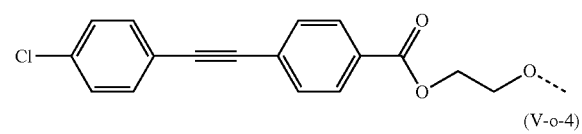
(V-o-4)
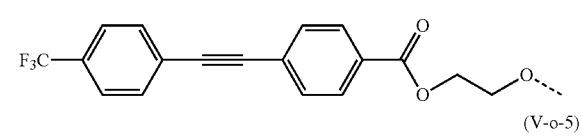
(V-o-5)
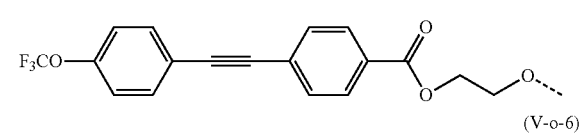
(V-o-6)
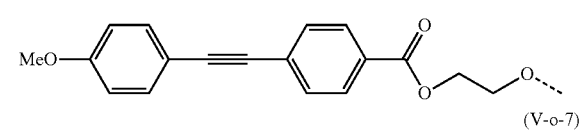
(V-o-7)
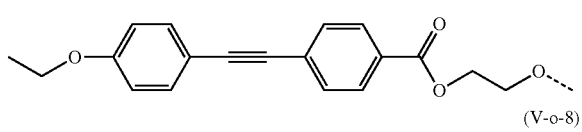
(V-o-8)
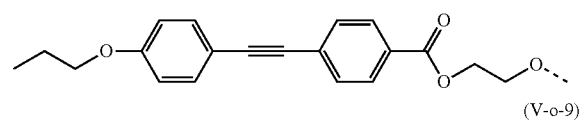
(V-o-9)
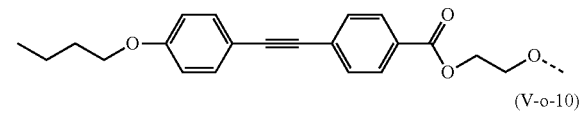
(V-o-10)
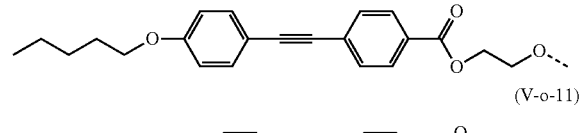
(V-o-11)
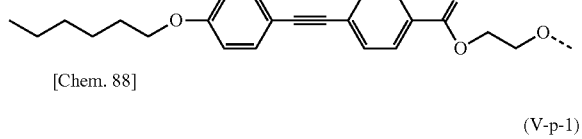
[Chem. 88]
(V-p-1)
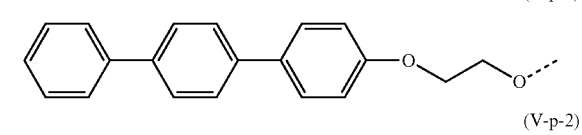
(V-p-2)
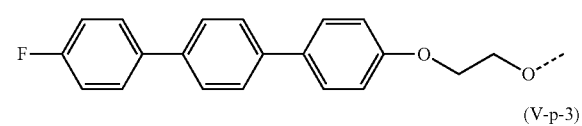
(V-p-3)
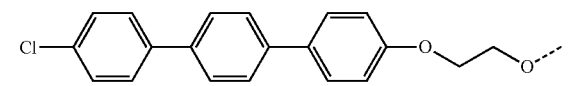
(V-p-4)
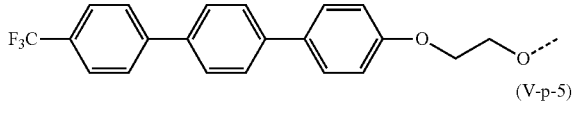
(V-p-5)
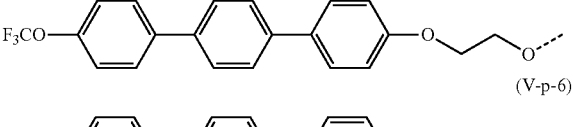
(V-p-6)
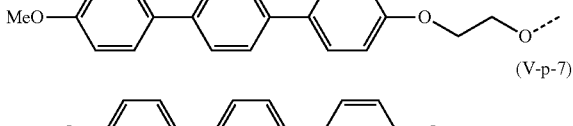
(V-p-7)
(V-p-8)
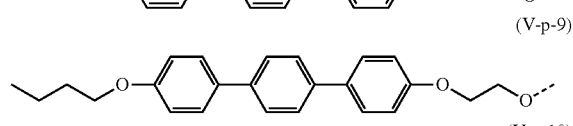
(V-p-9)
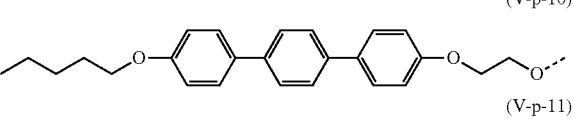
(V-p-10)
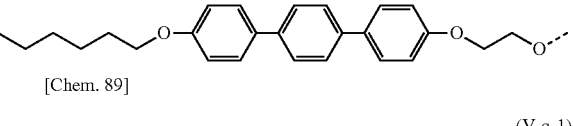
(V-p-11)
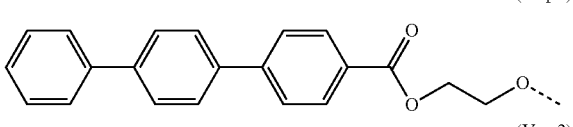
[Chem. 89]
(V-q-1)
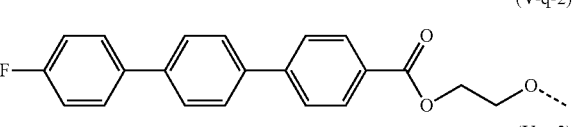
(V-q-2)
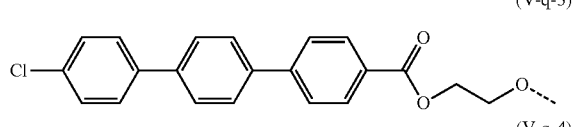
(V-q-3)
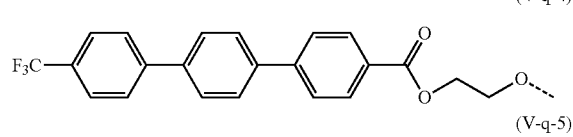
(V-q-4)
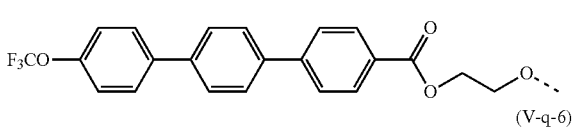
(V-q-5)
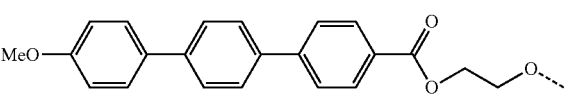
(V-q-6)

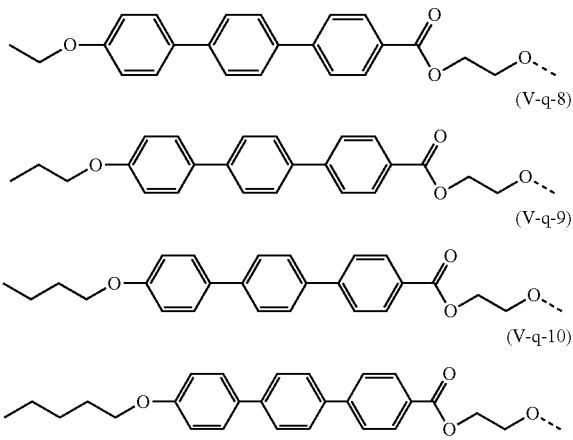

Among these, compounds represented by formulae (V-a-1) to (V-a-15), formulae (V-b-11) to (V-b-15), formulae (V-c-1) to (V-c-11), formulae (V-d-10) to (V-d-15), formulae (V-f-1) to (V-f-10), formulae (V-g-1) to (V-g-10), formulae (V-h-1) to (V-h-10), formulae (V-j-1) to (V-j-9), formulae (V-h-1) to (V-l-11), or formulae (V-m-1) to (V-m-11) are more preferable.

The moiety (P) that is photochemically isomerizable but not photochemically crosslinked preferably has a structure represented by formula (VI) below:

[Chem. 90]

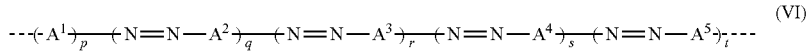

(where broken lines each represent a bond to $S_a$, $S_b$, $S_{aa}$, or $S_{aaa}$ but when the bond is formed only at one of the broken lines, the other broken line represents a bond to a hydrogen atom;

$A^1$, $A^2$, $A^3$, $A^4$, and $A^5$ each independently represent a 1,4-naphthylene group, a 2,6-naphthylene group, a 2,5-pyridyl group, a 2,5-pyrimidyl group, a 2,5-thiophenylene group, a 2,5-furanylene group, or a 1,4-phenylene group which may be unsubstituted or mono- or polysubstituted with a fluorine atom, a chlorine atom, a bromine atom, a methyl group, a methoxy group, a nitro group, a —NR$^1$R$^2$, or a linear or branched alkyl residue having 1 to 10 carbon atoms, where the alkyl residue is unsubstituted or mono- or polysubstituted with fluorine, one or more non-neighboring CH$_2$ groups may be independently substituted with Q representing —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH=CH—, —C≡C—, or —O—CO—O—, and R, R$^1$, and R$^2$ independently represent hydrogen or an alkyl group having 1 to 5 carbon atoms; and p, q, r, s, and t each independently represent 0 or 1 and 0<q+r+s+t).

Preferably, $A^1$, $A^2$, $A^3$, $A^4$, and $A^5$ each independently represent a 1,4-naphthylene group, a 2,6-naphthylene group, a pyridine-2,5-diyl group, a pyrimidine-2,5-diyl group, or a 1,4-phenylene group which may be unsubstituted or have one or more hydrogen atoms substituted with a fluorine atom, a chlorine atom, a methyl group, or a methoxy group. More preferably, $A^1$, $A^2$, $A^3$, $A^4$ and $A^5$ each independently represent a 2,6-naphthylene group, a pyridine-2,5-diyl group, a pyrimidine-2,5-diyl group, or a 1,4-phenylene group, which may be unsubstituted or have one or more hydrogen atoms substituted with a fluorine atom, a chlorine atom, a methyl group, or a methoxy group, and the sum, q+r+s+t is 1 or more and 2 or less. Particularly preferably, $A^1$, $A^2$, $A^3$, $A^4$, and $A^5$ each independently represent a 2,6-naphthylene group or a 1,4-phenylene group which may be unsubstituted or have one or more hydrogen atoms substituted with a fluorine atom, a chlorine atom, a methyl group, or a methoxy group, and p and the sum, q+r+s+t, are each 1.

In order to improve the liquid crystal alignment property, $A^1$, $A^2$, $A^3$, $A^4$, and $A^5$ are preferably each independently a pyridine-2,5-diyl group, a pyrimidine-2,5-diyl group, or a 1,4-phenylene group. In order to improve the solubility of the polymer, $A^1$, $A^2$, $A^3$, $A^4$, and $A^5$ are preferably each independently a 1,4-naphthylene group, a 2,6-naphthylene group, a 2,5-thiophenylene group, or a 2,5-furanylene group. In order to decrease the irradiation dose required to align liquid crystals, $A^1$, $A^2$, $A^3$, $A^4$, and $A^5$ are preferably each independently a pyridine-2,5-diyl group, a pyrimidine-2,5-diyl group, 2,5-thiophenylene group, or a 1,4-phenylene group, and the sum q+r+s+t is preferably 1 to 2. In order to conduct photoalignment at a longer wavelength, $A^1$, $A^2$, $A^3$, $A^4$, and $A^5$ are preferably each independently a pyrimidine-2,5-diyl group, a 2,5-thiophenylene group, a 2,6-naphthylene group, or a 2,5-furanylene group, and the sum q+r+s+t is preferably 1 to 3.

Many compounds are included in general formula (VI). In particular, compounds represented by formulae (P-a-1) to (P-e-7) below are preferable.

[Chem. 91]

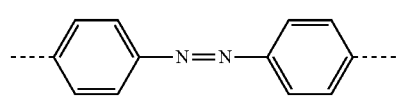
(P-a-1)

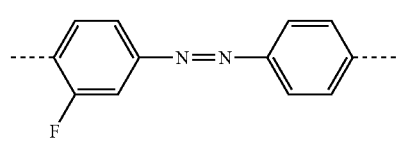
(P-a-2)

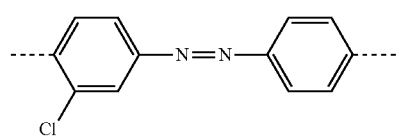
(P-a-3)

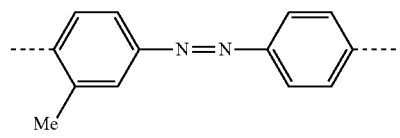
(P-a-4)

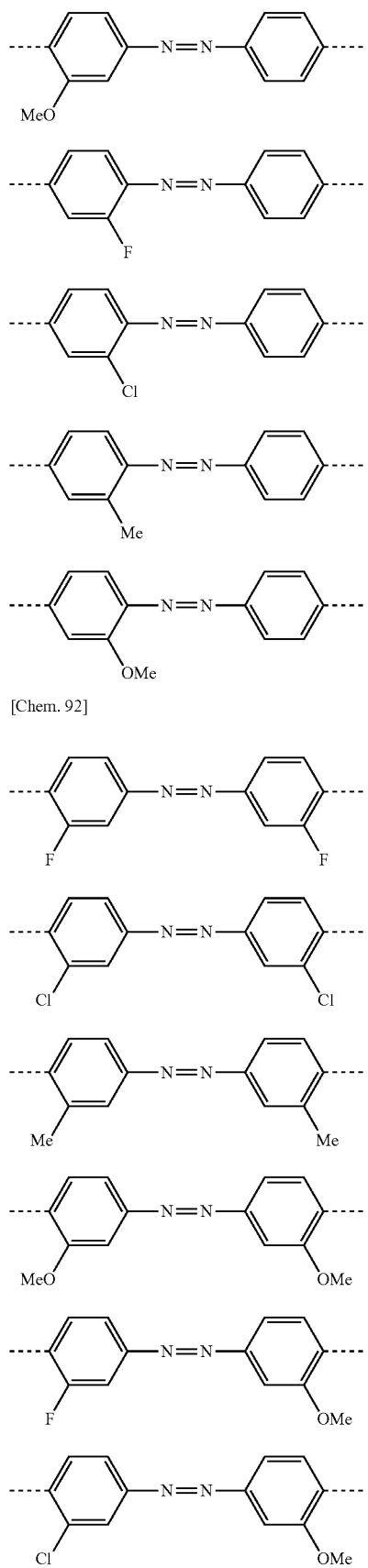
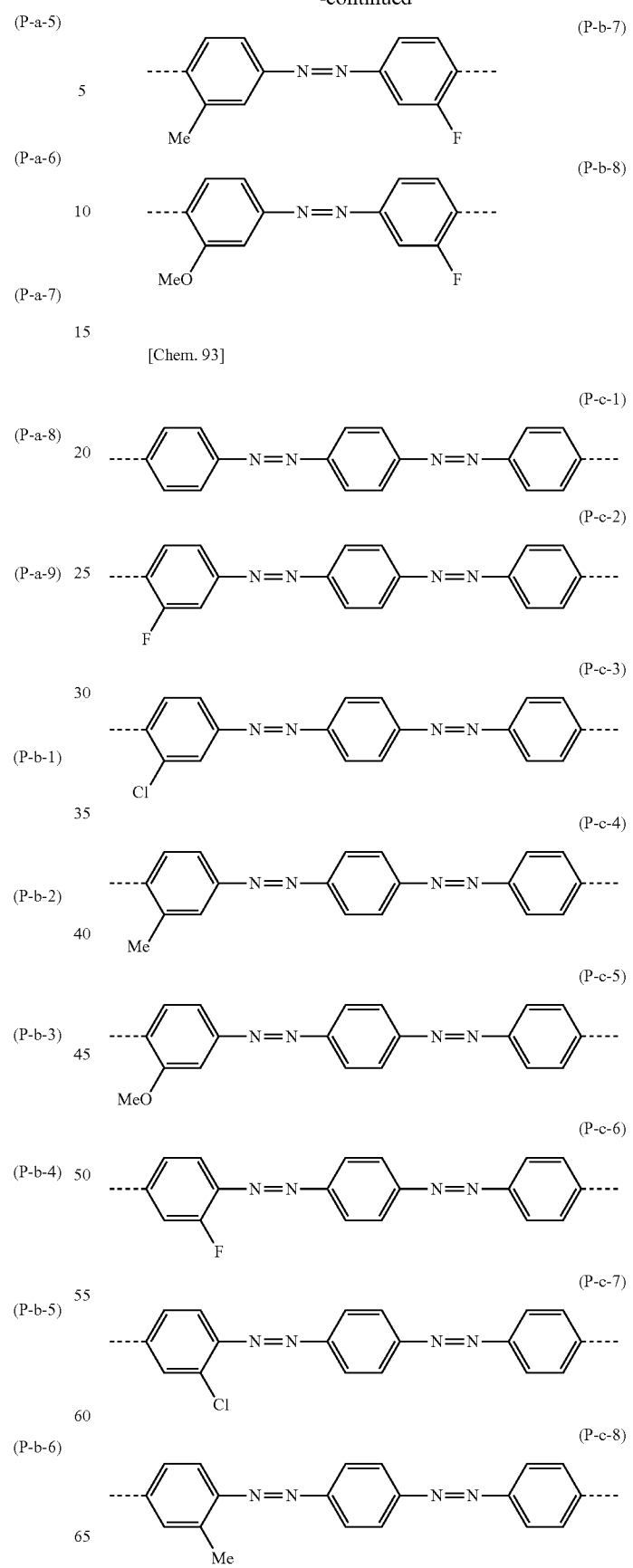

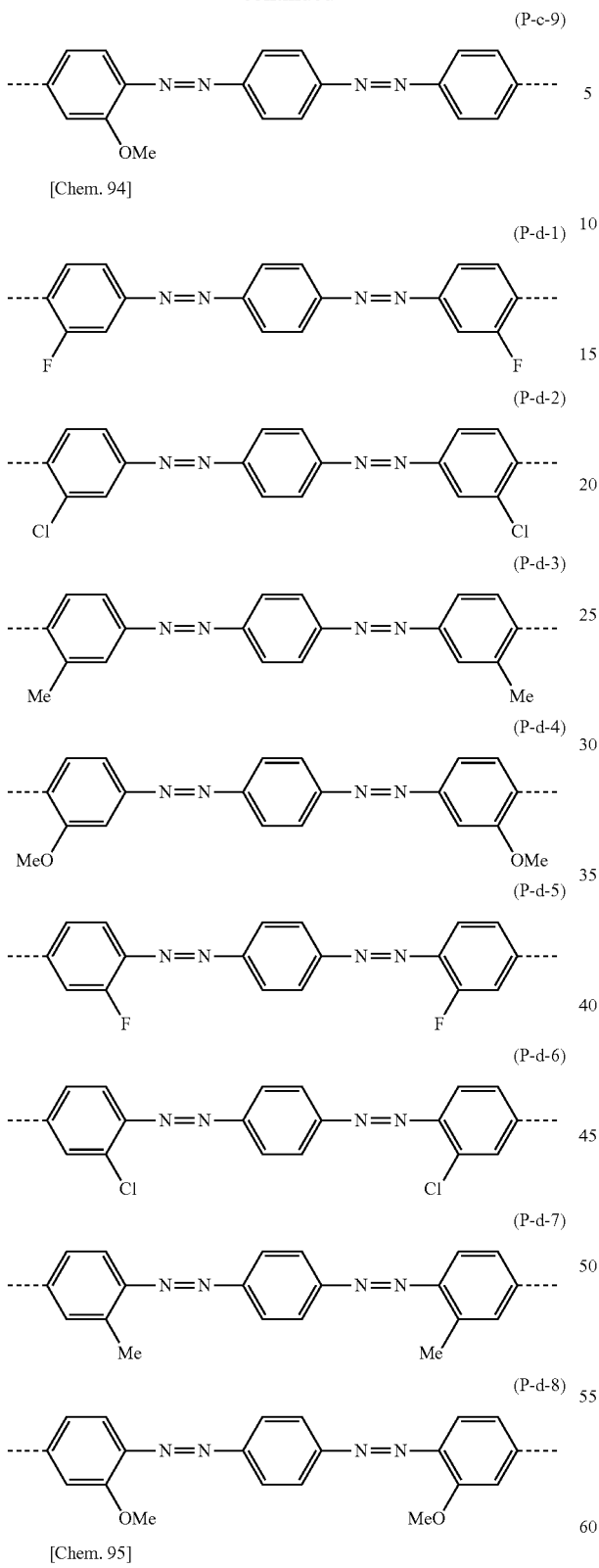

Among these, compounds represented by formulae (P-a-1) to (P-a-9), formulae (P-b-1) to (P-b-8), formula (P-c-1) and formula (P-e-5) are more preferable.

The moiety (D) that is photochemically crosslinkable preferably has a structure represented by general formula (VII) below:

[Chem. 96]

$$\text{---}(\text{A}^7)_r\overset{X}{\underset{Y}{=}}\overset{}{\underset{O}{\diagup}}Z\text{----} \qquad (VII)$$

(where broken lines each represent a bond to $S_a$, $S_{aa}$, $S_{aaa}$, $S_b$, or $S_{bb}$ but when the bond is formed only at one of the broken lines, the other broken line represents a bond to a hydrogen atom;

$A^7$ each independently represent a 1,4-naphthylene group, a 2,6-naphthylene group, a 2,5-pyridyl group, a 2,5-pyrimidyl group, a 2,5-thiophenylene group, a 2,5-furanylene group, or a 1,4-phenylene group which may be unsubstituted or have one or more hydrogen atoms substituted with a fluorine atom, a chlorine atom, a methyl group, or a methoxy group;

X and Y each independently represent hydrogen, fluorine, chlorine, a cyano group, or an alkyl group having 1 to 20 carbon atoms (which may be substituted with fluorine or have one $CH_2$ group or two or more non-neighboring $CH_2$ groups substituted with —O—, —CO—O—, —O—CO—, and/or —CH=CH—);

Z represents a single bond, —O—, or —NR$^1$— (where R$^1$ represents hydrogen, a linear or branched C1-C20 alkyl group which may be substituted with fluorine or chlorine, or a 3- to 8-membered cycloalkyl group which may be substituted with fluorine, chlorine, an alkyl group, or an alkoxy group); and r represents 0, 1, or 2)

In order to improve the thermal stability of the alignment, Z is preferably —NR¹—. In order to improve the liquid crystal alignment property, $A^7$ is preferably a pyridine-2,5-diyl group, a pyrimidine-2,5-diyl group, or a 1,4-phenylene group. In order to improve the solubility of the polymer, $A^7$ is preferably a 1,4-naphthylene group, a 2,6-naphthylene group, a 2,5-thiophenylene group, or a 2,5-furanylene group. In order to decrease the irradiation dose required to align liquid crystals, $A^7$ is preferably a pyridine-2,5-diyl group, a pyrimidine-2,5-diyl group, a 2,5-thiophenylene group, or a 1,4-phenylene group, and Z is preferably a single bond or —O—. In order to conduct photoalignment at a longer wavelength, $A^7$ is preferably a pyrimidine-2,5-diyl group, a 2,5-thiophenylene group, a 2,6-naphthylene group, or a 2,5-furanylene group, and X and Y are preferably a fluorine atom, a chlorine atom, or a cyano group.

A large number of compounds are included in general formula (VII). In particular, compounds represented by formulae (D-a-1) to (D-d-7) below are particularly preferable.

[Chem. 97]

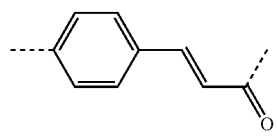
(D-a-1)

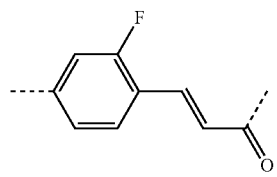
(D-a-2)

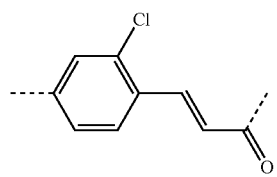
(D-a-3)

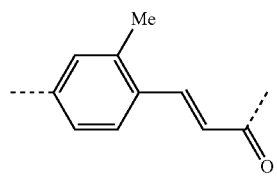
(D-a-4)

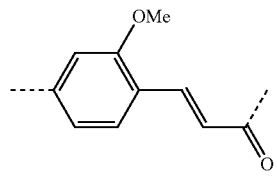
(D-a-5)

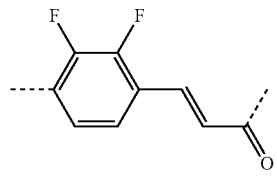
(D-a-6)

-continued

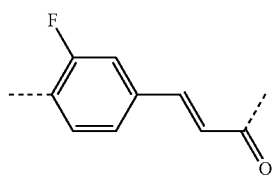
(D-a-7)

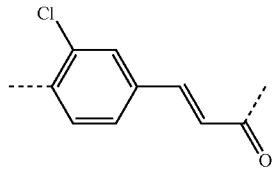
(D-a-8)

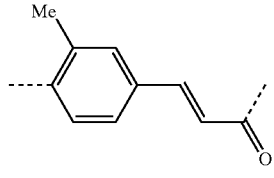
(D-a-9)

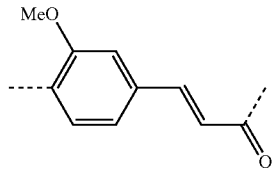
(D-a-10)

[Chem. 98]

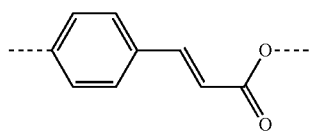
(D-b-1)

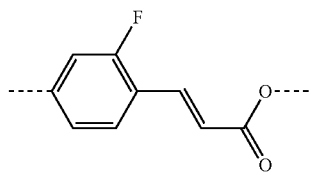
(D-b-2)

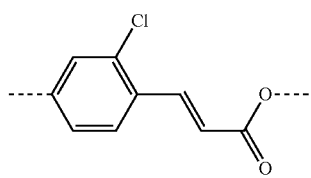
(D-b-3)

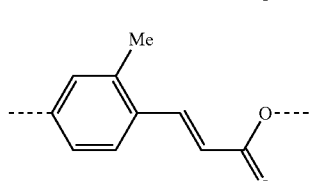
(D-b-4)

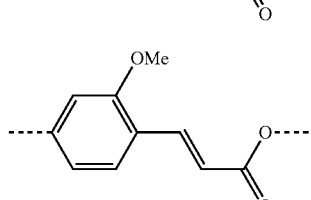
(D-b-5)

(D-b-6)
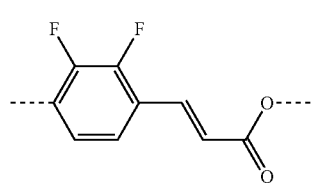
(D-b-7)
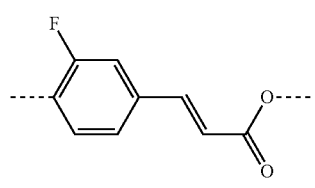
(D-b-8)
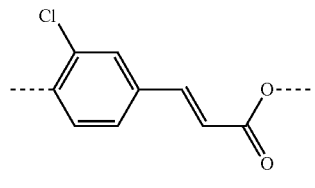
(D-b-9)
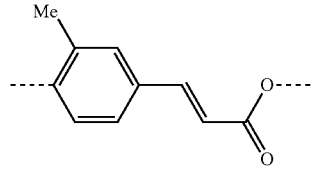
(D-b-10)
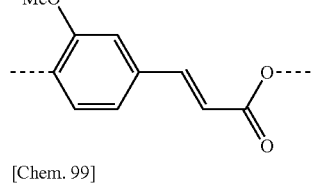
[Chem. 99]
(D-c-1)
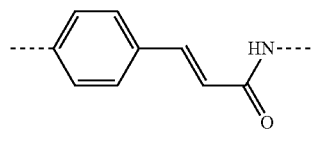
(D-c-2)
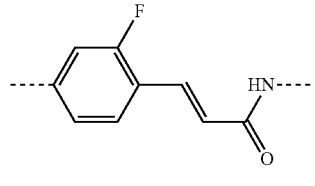
(D-c-3)
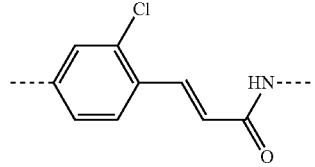
(D-c-4)
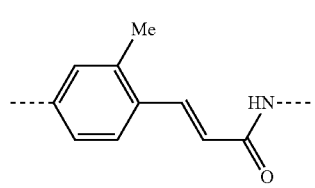
(D-c-5)
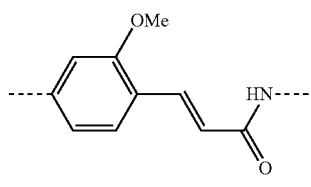
(D-c-6)
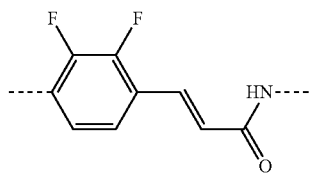
(D-c-7)
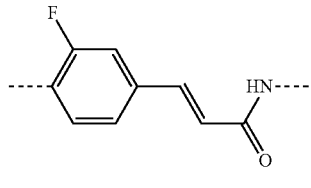
(D-c-8)
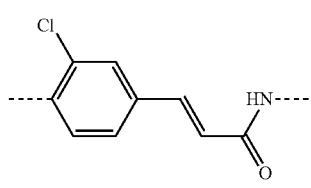
(D-c-9)
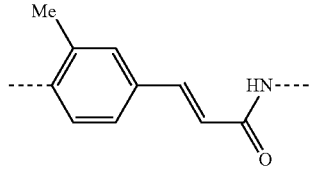
(D-c-10)
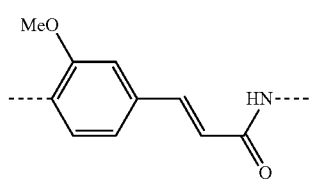
[Chem. 100]
(D-d-1)
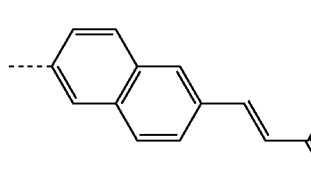
(D-d-2)
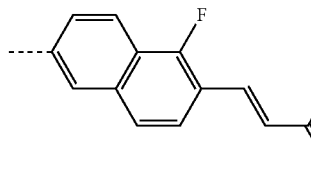

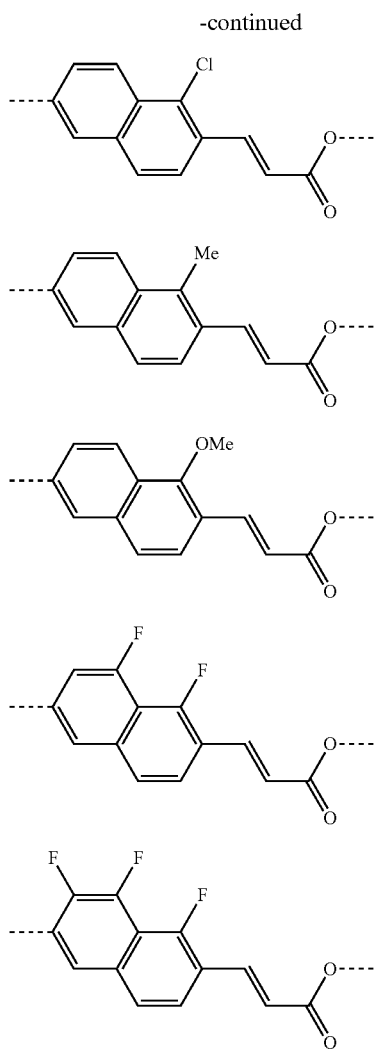

(D-d-3)

(D-d-4)

(D-d-5)

(D-d-6)

(D-d-7)

Among these, compounds represented by formulae (D-a-1) to (D-a-10) or formulae (D-b-1) to (D-b-10) are more preferable.

[Preparation of a Polymer for Use in an Alignment Layer]

A polymer for use in an alignment layer according to the invention is obtained by preparing a cured product that includes (a) a moiety that is photochemically isomerizable but is not photochemically crosslinked; (b) a moiety that is photochemically crosslinkable; and (c) a moiety that stabilizes the vertical alignment. Examples of the method for obtaining the cured product include a method of homopolymerizing a monomer unit having the above-described moieties, a method of copolymerizing monomer units, a method of copolymerizing monomer units and then mixing the resulting copolymers, and a method of homopolymerizing monomer units and then mixing the resulting homopolymers. The above-described moieties may be introduced into one monomer unit or into several different monomers. Specific methods for preparing Embodiments 1 to 6 of the polymers for use in liquid crystal vertical alignment layers are described below.

Embodiment 1 of the polymer for use in a liquid crystal vertical alignment layer can be obtained as a cured product of a composition containing a compound represented by general formula (Xa-1) as a compound having a moiety that is photochemically isomerizable but not photochemically crosslinked, a compound represented by general formula (Xa-2) as a compound having a moiety that is photochemically crosslinkable, and a compound represented by general formula (Xa-3) as a compound having a moiety that stabilizes the vertical alignment.

[Chem. 101]

$$L_a\text{-}S_a\text{-}P \quad (Xa\text{-}1)$$

$$L_b\text{-}S_b\text{-}D \quad (Xa\text{-}2)$$

$$L_c\text{-}S_c\text{-}V_c \quad (Xa\text{-}3)$$

(where $L_a$, $L_b$, and $L_c$ each represent a polymerizable group and may be different from one another; $S_a$, $S_b$, and $S_c$ each represent a spacer unit and may be different from one another; P represents a moiety that is photochemically isomerizable but not photochemically crosslinked; D represents a moiety that is photochemically crosslinkable; and $V_c$ represents a moiety that stabilizes the vertical alignment.)

Embodiment 2 of the polymer for use in a liquid crystal vertical alignment layer can be obtained as a cured product of a composition containing a compound represented by general formula (Xb-1) as a compound having a moiety that is photochemically isomerizable but not photochemically crosslinked and a moiety that stabilizes the vertical alignment, and a compound represented by general formula (Xb-2) as a compound having a moiety that is photochemically crosslinkable.

[Chem. 102]

$$L_a\text{-}S_a\text{-}P\text{-}S_{aa}\text{-}V_a \quad (Xb\text{-}1)$$

$$L_b\text{-}S_b\text{-}D \quad (Xb\text{-}2)$$

(where $L_a$ and $L_b$ each represent a polymerizable group and may be different from one another; $S_a$, $S_b$, and $S_{aa}$ each represent a spacer unit and may be different from one another; P represents a moiety that is photochemically isomerizable but not photochemically crosslinked; D represents a moiety that is photochemically crosslinkable; and $V_a$ represents a moiety that stabilizes the vertical alignment.)

Embodiment 3 of the polymer for use in a liquid crystal vertical alignment layer can be obtained as a cured product of a composition containing a compound represented by general formula (Xc-1) as a compound having a moiety that is photochemically crosslinkable and a moiety that stabilizes the vertical alignment and a compound represented by general formula (Xc-2) as a compound having a moiety that is photochemically isomerizable but not photochemically crosslinked.

[Chem. 103]

$$L_a\text{-}S_a\text{-}D\text{-}S_{aa}\text{-}V_a \quad (Xc\text{-}1)$$

$$L_b\text{-}S_b\text{-}P \quad (Xc\text{-}2)$$

(where $L_a$ and $L_b$ each represent a polymerizable group and may be different from one another; $S_a$, $S_b$, and $S_{aa}$ each represent a spacer unit and may be different from one another; P represents a moiety that is photochemically isomerizable but not photochemically crosslinked; D represents a moiety that is photochemically crosslinkable; and $V_a$ represents a moiety that stabilizes the vertical alignment.)

Embodiment 4 of the polymer for use in a liquid crystal vertical alignment layer can be obtained as a cured product of a composition containing a compound represented by general formula (Xd-1) as a compound having a moiety that is photochemically isomerizable but not photochemically crosslinked and a moiety that stabilizes the vertical alignment, and a compound represented by general formula (Xd-2) as a compound having a moiety that is photochemically crosslinkable and a moiety that stabilizes the vertical alignment.

[Chem. 104]

$$L_a\text{-}S_a\text{-}P\text{-}S_{aa}\text{-}V_a \qquad (Xd\text{-}1)$$

$$L_b\text{-}S_b\text{-}D\text{-}S_{bb}\text{-}V_b \qquad (Xd\text{-}2)$$

(where $L_a$ and $L_b$ each represent a polymerizable group and may be different from one another; $S_a$, $S_b$, $S_{aa}$, and $S_{bb}$ each represent a spacer unit and may be different from one another; P represents a moiety that is photochemically isomerizable but not photochemically crosslinked; D represents a moiety that is photochemically crosslinkable; and $V_a$ and $V_b$ each represent a moiety that stabilizes the vertical alignment and may be different from one another.)

Embodiment 5 of the polymer for use in a liquid crystal vertical alignment layer can be obtained as a cured product of a compound represented by general formula (Xaa-1) or general formula (Xbb-1) as a monomer having a moiety that is photochemically isomerizable but not photochemically crosslinked, a moiety that is photochemically crosslinkable, and a moiety that stabilizes the vertical alignment.

[Chem. 105]

$$L_a\text{-}S_a\text{-}P\text{-}S_{aa}\text{-}D\text{-}S_{aaa}\text{-}V_a \qquad (Xaa\text{-}1)$$

$$L_a\text{-}S_a\text{-}D\text{-}S_{aa}\text{-}P\text{-}S_{aaa}\text{-}V_a \qquad (Xbb\text{-}1)$$

(where $L_a$ represents a polymerizable group; $S_a$, $S_{aa}$, and $S_{aaa}$ each represent a spacer unit and may be different from one another; P represents a moiety that is photochemically isomerizable but not photochemically crosslinked; D represents a moiety that is photochemically crosslinkable; and $V_a$ represents a moiety that stabilizes the vertical alignment.)

The mixing ratio in the composition of Embodiments 1 to 5 of the polymers for use in liquid crystal vertical alignment layers relative to 100 moles of a compound having a moiety that is photochemically crosslinkable is preferably 0.1 to 20 moles of a compound having a moiety that is photochemically isomerizable but not photochemically crosslinked and 0.1 to 30 moles of a compound having a moiety that stabilizes the vertical alignment. More preferably, the mixing ratio relative to 100 moles of a compound having a moiety that is photochemically crosslinkable is 0.3 to 5 moles of a compound having a moiety that is photochemically isomerizable but not photochemically crosslinked and 1 to 15 moles of a compound having a moiety that stabilizes the vertical alignment. These compounds are preferably liquid crystal compounds.

Embodiment 6 of the polymer for use in a liquid crystal vertical alignment layer contains (a) a polymer that has a moiety that is photochemically isomerizable but not photochemically crosslinked and (b) a polymer that has a moiety that is photochemically crosslinkable, the polymer (a) and the polymer (b) having structures different from each other, and can be obtained by mixing the polymers. The mixing ratio of the polymers relative to 100 moles of the moiety that is photochemically crosslinkable in the polymer is preferably 0.1 to 30 moles of a moiety that is photochemically isomerizable in the polymer. More preferably, the mixing ratio of the polymers relative to 100 moles of the moiety that is photochemically crosslinkable in the polymer is 2 to 10 moles of a moiety that is photochemically isomerizable in the polymer. These compounds are preferably liquid crystal compounds.

In preparing a polymer for use in a liquid crystal vertical alignment layer of the invention, a polymerization initiator may optionally be used depending on the method of polymerizing polymerizable functional groups. Examples of the polymerization initiator are publicized in Synthesis and Reaction of Polymers (edited by The Society of Polymer Science, Japan and published by Kyoritsu Shuppan Co., Ltd.) etc. Examples of a thermal polymerization initiator used in radical polymerization include azo compounds such as azobisisobutyronitrile and peroxides such as benzoyl peroxide. Examples of a photopolymerization initiator include aromatic ketone compounds such as benzophenone, a Michler's ketone, xanthone, and thioxanthone, quinones such as 2-ethylanthraquinone, acetophenone compounds such as acetophenone, trichloroacetophenone, 2-hydroxy-2-methylpropiophenone, 1-hydroxycyclohexylphenylketone, benzoin ether, 2,2-diethoxyacetophenone, and 2,2-dimethoxy-2-phenylacetophenone, diketone compounds such as benzyl and methylbenzoyl formate, acyloxime ester compounds such as 1-phenyl-1,2-propanedione-2-(o-benzoyl)oxime, acylphosphine oxide compounds such as 2,4,6-trimethylbenzoyldiphenylphosphine oxide, sulfur compounds such as tetramethylthiuram and dithiocarbamate, organic peroxides such as benzoyl peroxide, and azo compounds such as azobisisobutyronitrile. Examples of the thermal polymerization initiator used in cationic polymerization include aromatic sulfonium salt compounds. Examples of the photopolymerization initiator include organic sulfonium salt compounds, iodonium salt compounds, and phosphonium compounds. The amount of the polymerization initiator added is preferably 0.1 to 10 mass %, more preferably 0.1 to 6 mass %, and most preferably 0.1 to 3 mass % in the composition. A desired polymer can be synthesized by addition reaction to a polymer main chain, such as with a polysiloxane compound.

The polymer in the invention is obtained by conducting a polymerization reaction in a reactor made of glass, stainless steel, or the like and then purifying the resulting polymer. The polymerization reaction may be conducted by dissolution in a solvent. Preferred examples of the solvent include benzene, toluene, xylene, ethylbenzene, pentane, hexane, heptane, octane, cyclohexane, cycloheptane, methanol, ethanol, 1-propanol, 2-propanol, ethylene glycol, ethylene glycol monomethyl ether, ethylene glycol dimethyl ether, 2-butanone, acetone, tetrahydrofuran, γ-butyrolactone, N-methyl-pyrrolidone, dimethyl sulfoxide, and dimethylformamide. Two or more organic solvents may be used in combination. The polymer according to the invention can also be obtained by dissolving the composition in a solvent, applying the solution to a substrate to remove the solvent by drying, and conducting a polymerization reaction by heating or applying light.

[Method for Forming Alignment Layer]

The ability to control alignment of liquid crystal molecules and the stability of the alignment against heat and light can be developed by irradiating the polymer of the present invention with light. An example of a method for producing a photoalignment film of the invention is a method of dissolving the polymer in a solvent, applying the solution to a substrate, and irradiating the coating film with light to allow the alignment controlling ability to develop. The solvent used in dissolving the polymer is preferably a solvent that dissolves but does not react with the polymer of the invention and other components optionally used. Examples of such a solvent include 1,1,2-trichloroethane, N-methylpyrrolidone, butoxyethanol, γ-butyrolactone, ethylene glycol, polyethylene glycol monomethyl ether, propylene glycol, 2-pyrrolidone, N,N-dimethylformamide, phenoxyethanol, tetrahydrofuran, dimethylsulfoxide, methyl isobutyl ketone, and cyclohexanone. Two or more of organic solvents may be used in combination.

Another example of a method for producing a photoalignment film of the invention is a method of dissolving the composition of the invention in a solvent, applying the solution to a substrate, heating the coating film or irradiating the coating film with light to prepare a polymer, and irradiating the polymer with light to allow the alignment controlling ability to develop and to thereby form an alignment film. The solvent used in dissolving the composition may be the same as the solvent used in dissolving the polymer. Preparation of the polymer and allowing the alignment controlling ability to develop may be simultaneously done by light irradiation or separately done by combining heating and light irradiation or by using two or more light beams having different wavelengths. In any of the methods of producing the photoalignment film, an alignment film may be preliminarily formed on a substrate and then a photoalignment film may be formed on the alignment film so that the substrate exhibits the ability to control the alignment direction and the alignment angle due to the composition or polymer of the invention.

Examples of the material for the substrate include glass, silicon, polyethylene terephthalate, polybutylene terephthalate, polyether sulfone, polycarbonate, and triacetyl cellulose. An electrode layer such Cr, Al, an ITO film composed of $In_2O_3$—$SnO_2$, or a nesa film composed of $SnO_2$ may be provided to this substrate. The electrode layer is patterned by, for example, a photoetching method or a method that uses a mask in forming the electrode layer. A color filter layer may additionally be formed.

Examples of the method of applying a solution of the composition or polymer of the invention to a substrate include spin coating, die coating, gravure coating, flexography, and ink jet printing. The solid content in the solution used in the application is preferably 0.5 to 10 wt % and is more preferably selected from this range by considering the method of applying the solution, viscosity, volatility, etc. The coated surface is preferably heated after the application so as to remove the solvent. The drying condition is preferably 50 to 300° C. and more preferably 80 to 200° C. for preferably 5 to 200 minutes and more preferably 10 to 100 minutes.

In the case where the composition of the invention is used, a polymer may be prepared on the substrate by conducting thermal polymerization during the heating process described above. In this case, a polymerization initiator is preferably added to the composition. Alternatively, a polymer may be prepared by photopolymerization through irradiating the composition with unpolarized light after removal of the solvent in the heating process. Alternatively, thermal polymerization and photopolymerization may be combined.

In preparing the polymer by thermal polymerization on the substrate, the heating temperature may be any temperature sufficient for allowing polymerization to proceed. Typically, the heating temperature is about 50 to 250° C. and more preferably about 70 to 200° C. The polymerization initiator may or may not be added to the composition.

In preparing the polymer by photopolymerization on the substrate, unpolarized ultraviolet light is preferably used for irradiation. Moreover, a polymerization initiator is preferably added to the composition. The irradiation energy is preferably 20 mJ/cm$^2$ to 8 J/cm$^2$ and more preferably 40 mJ/cm$^2$ to 5 J/cm$^2$. The luminous intensity is preferably 10 to 1000 mW/cm$^2$ and more preferably 20 to 500 mW/cm$^2$. The wavelength of the radiation preferably has a peak in a range of 250 to 450 nm.

Next, a photoisomerization reaction and a photocrosslinking reaction are conducted on a coating film formed by the aforementioned method by applying linear polarized light in the coated surface normal direction and applying unpolarized or linear polarized light in an oblique direction to allow the alignment controlling ability to develop. These irradiation methods may be combined. In order to form a desired pretilt angle, irradiation with linear polarized light in an oblique direction is preferred. Note that the oblique direction refers to inclination with respect to a direction parallel to the substrate surface and this angle of inclination is called a pretilt angle. When the film is used as the alignment film for vertical alignment, the pretilt angle is typically preferably 70 to 89.8°.

The light to be applied may be, for example, an ultraviolet ray or a visible ray containing light having a wavelength of 150 nm to 800 nm but is particularly preferably an ultraviolet ray having a wavelength of 270 nm to 450 nm. Examples of the light source include xenon lamps, high-pressure mercury lamps, ultrahigh-pressure mercury lamps, and metal halide lamps. Linear polarized light can be obtained from these light sources through polarizing filters and polarizing prisms. The ultraviolet light and visible light obtained from such light sources may have a wavelength range restricted by using an interference filter or a color filter. The irradiation energy is preferably 15 mJ/cm$^2$ to 500 mJ/cm$^2$ and more preferably 20 mJ/cm$^2$ to 300 mJ/cm$^2$. The luminous intensity is preferably 15 to 500 mW/cm$^2$ and more preferably 20 mJ/cm$^2$ to 300 mW/cm$^2$.

The thickness of the photoalignment film to be formed is preferably about 10 to 250 nm and more preferably about 10 to 100 nm.

[Method for Producing Liquid Crystal Display Element]

A liquid crystal cell including a pair of substrates and a liquid crystal composition sandwiched between the substrates and a liquid crystal display element including the liquid crystal cell can be produced by using the alignment films formed by the aforementioned methods.

A liquid crystal cell can be produced by preparing two substrates each having the alignment film of the invention thereon and placing a liquid crystal in the space between the two substrates. Alternatively, the alignment film may be formed on only one of the two substrates.

An example of the method for producing the liquid crystal cell is as follows. First, two substrates are arranged so that the alignment films face each other. The peripheral portions of the two substrates are bonded with a sealing agent while maintaining a particular space (cell gap) between the two substrates. A liquid crystal is poured into a cell gap defined by the substrate surfaces and the sealing agent to fill the cell gap, and the inlet hole is sealed to produce a liquid crystal cell.

Alternatively, a liquid crystal cell can be produced by a technique called a one drop fill (ODF) technique. The process is, for example, as follows. First, a UV-curable sealing agent is applied to a particular position on a substrate on which an alignment film is formed, a liquid crystal is dropped onto the alignment film surface, and then another substrate is bonded so that the alignment films face each other. Then the entire surfaces of the substrates are irradiated with UV light to cure the sealing agent and to thereby form a liquid crystal cell.

In any method for producing a liquid crystal cell, the liquid crystal used is preferably heated to a temperature at which the liquid crystal transitions to an isotropic phase and slowly cooled to room temperature so as to eliminate the alignment induced by the flow during pouring.

For example, an epoxy resin may be used as the sealing agent. In order to retain a particular cell gap, beads of silica gel, alumina, acrylic resin, or the like may be used as a spacer prior to bonding the two substrates. These spacers may be spread over the alignment film or added to a sealing agent and then two substrates may be bonded.

Nematic-type liquid crystals may be used as the liquid crystal, for example. For a vertical alignment-type liquid crystal cell, a liquid crystal having a negative dielectric anisotropy is preferred. For example, dicyanobenzene-based liquid crystals, pyridazine-based liquid crystals, Schiff-base-based liquid crystals, azoxy-based liquid crystals, naphthalene-based liquid crystals, biphenyl-based liquid crystals, and phenylcyclohexane-based liquid crystals are used.

A liquid crystal display element can be obtained by bonding a polarizer to an outer surface of the liquid cell produced as such. Examples of the polarizer include a polarizer formed of an "H film" in which iodine has been absorbed while stretching a polyvinyl alcohol, and a polarizer having an H film sandwiched between cellulose acetate protective films.

A liquid crystal display element of the invention produced as such has excellent properties such as display properties and reliability.

EXAMPLES

The present invention will now be described in further detail by using Examples below. However, the present invention is not limited to Examples below. The structure of a compound was identified with a nuclear magnetic resonance (NMR) spectra, mass spectra (MS), or the like. Unless otherwise noted, "parts" and "%" are on a mass basis.
(Synthesis of Monomers Used as Raw Materials for a Polymer for Use in a Liquid Crystal Vertical Alignment Layer)

[Chem. 106]

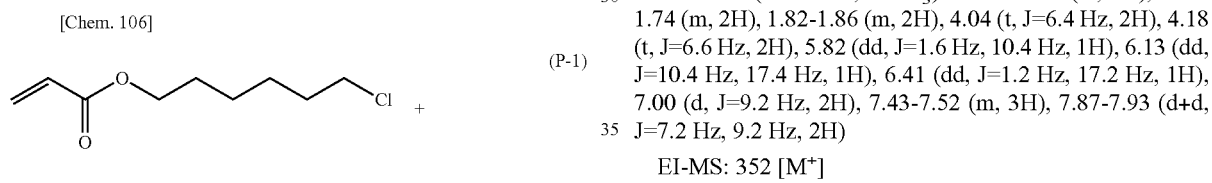

(P-1)

[Chem. 107]

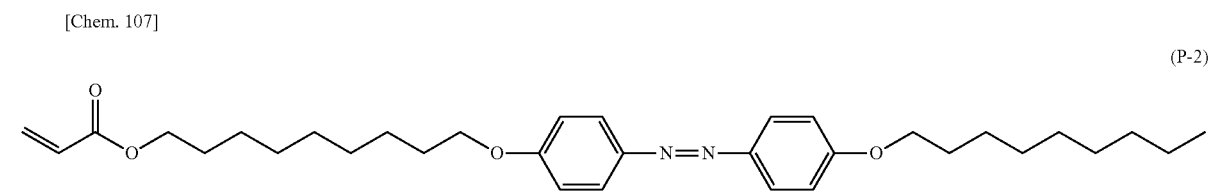

4-Hydroxyazobenzene (8.44 g) and 27.9 g of cesium carbonate were dissolved in 110 mL of dimethyl sulfoxide and the mixture was stirred at room temperature for 1 hour. To the reaction solution, 9.94 g of 6-chlorohexyl acrylate was added dropwise, followed by stirring at 85° C. for 4 hours. The reaction solution was cooled to room temperature and 150 mL of water was added thereto, followed by stirring at 5° C. for 30 minutes. Solid precipitates were filtered and washed with methanol. The collected solid was dissolved in 150 mL of dichloromethane and dried by adding sodium sulfate. Sodium sulfate was removed and the solvent was distilled away under a reduced pressure to reduce the volume to about 40 mL, and 80 mL of hexane was added. The resulting mixture was purified by column chromatography (alumina/silica gel, hexane/dichloromethane=2:1), the solvent was distilled away under a reduced pressure, and recrystallization was conducted. As a result, a white crystal (P-1) was obtained (9.67 g).

$^1$H-NMR (400 MHz, CDCl$_3$) δ: 1.47-1.54 (m, 4H), 1.71-1.74 (m, 2H), 1.82-1.86 (m, 2H), 4.04 (t, J=6.4 Hz, 2H), 4.18 (t, J=6.6 Hz, 2H), 5.82 (dd, J=1.6 Hz, 10.4 Hz, 1H), 6.13 (dd, J=10.4 Hz, 17.4 Hz, 1H), 6.41 (dd, J=1.2 Hz, 17.2 Hz, 1H), 7.00 (d, J=9.2 Hz, 2H), 7.43-7.52 (m, 3H), 7.87-7.93 (d+d, J=7.2 Hz, 9.2 Hz, 2H)

EI-MS: 352 [M$^+$]

(P-2)

A compound (P-2) was synthesized according to the procedure described in a known document (Journal of Materials Chemistry, Vol. 19 (2009), 60-62).

[Chem. 108]

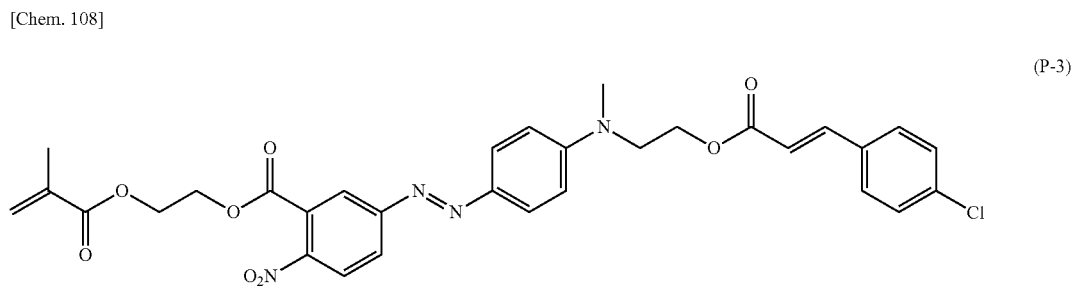

(P-3)

[Chem. 109]

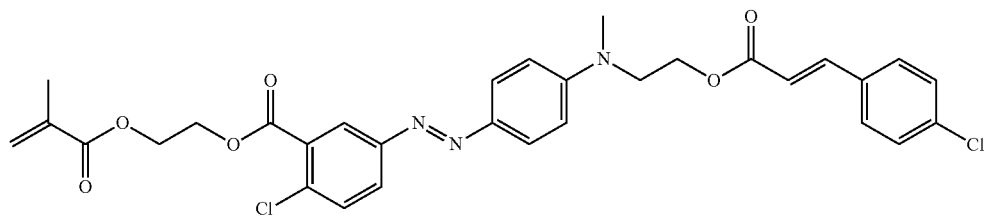
(P-4)

[Chem. 110]

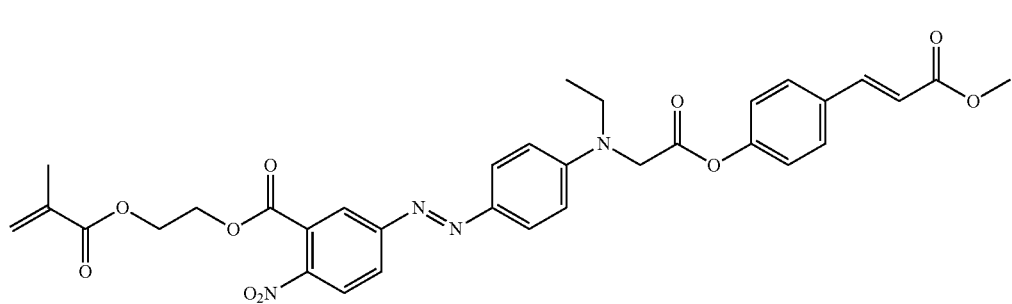
(P-5)

[Chem. 111]

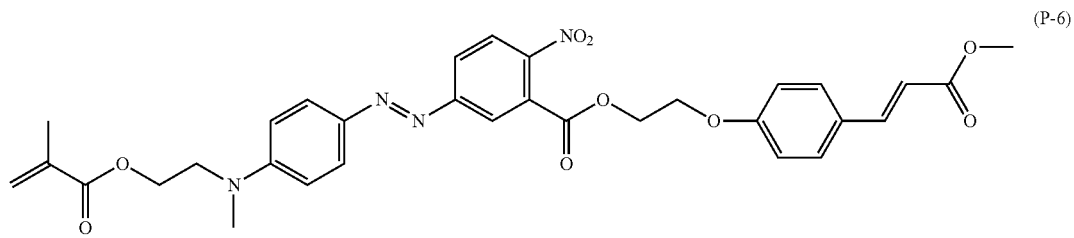
(P-6)

Compounds (P-3) to (P-6) were synthesized according to the procedure described in Examples of PCT Japanese Translation Patent Publication No. 6-509889.

A compound (P-7) was synthesized according to the procedure described in Example 5 of Japanese Unexamined Patent Application Publication No. 9-118717.

[Chem. 112]

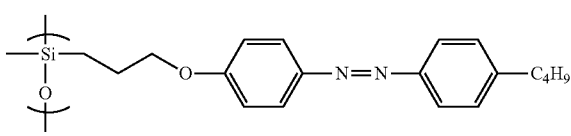
(P-7)

[Chem. 113]

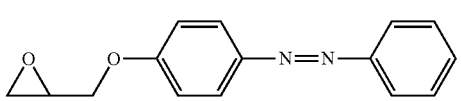
(P-8)

A compound (P-8) was synthesized according to the procedure described in a known document (Journal of Polymer Science: Part A: Polymer Chemistry (2009) 5426-5436).

[Chem. 114]

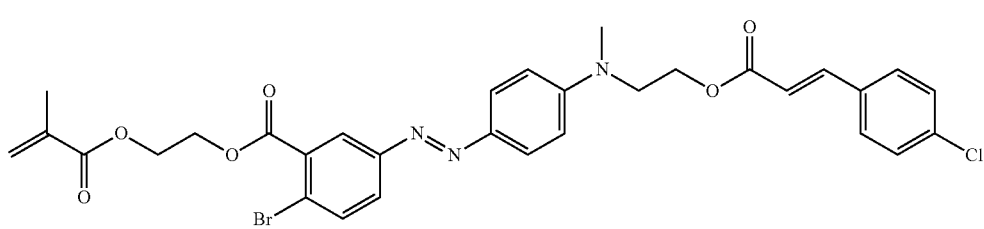
(P-14)

[Chem. 115]

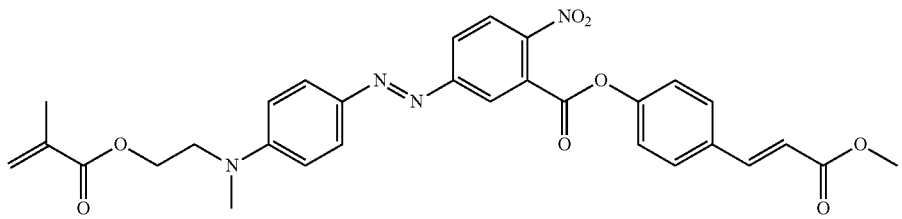

(P-15)

Compounds (P-14) to (P-15) were synthesized according to the procedure described in Examples of PCT Japanese Translation Patent Publication No. 6-509889.

[Chem. 116]

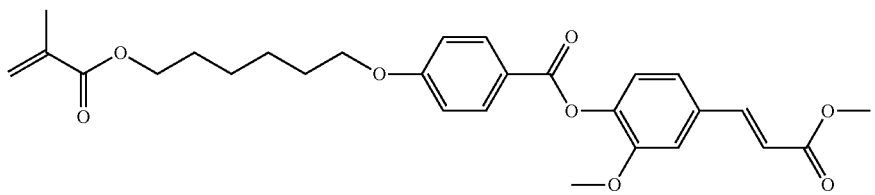

(D-1)

A compound (D-1) was synthesized according to the procedure described in Example 4 of Japanese Unexamined Patent Application Publication No. 9-118717.

[Chem. 117]

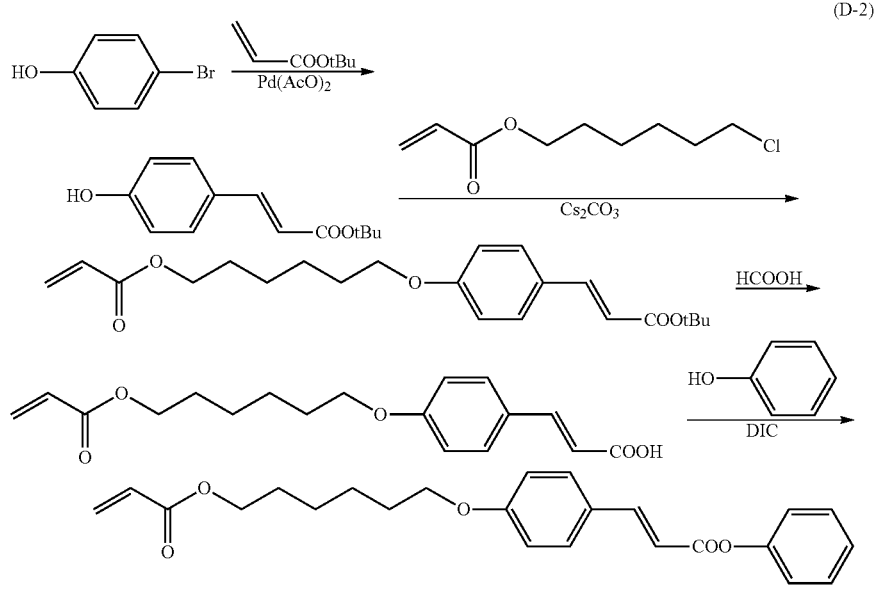

(D-2)

4-Bromophenol (30.0 g), 33.5 g of tert-butyl acrylate, 50 mg of palladium acetate, and 27.9 g of potassium carbonate were dissolved in 300 mL of N-methylpyrrolidone, followed by stirring at 120° C. for 3 hours. The reaction solution was cooled to room temperature and 900 mL of water and 300 mL of dichloromethane were added thereto. The organic layer was separated and the water layer was extracted with 100 mL of dichloromethane twice. The organic layer was collected, washed with a 10% hydrochloric acid, saturated sodium bicarbonate water, and saturated saline, and dried by adding sodium sulfate. Sodium sulfate was removed and the mixture was purified by column chromatography (alumina/silica gel, dichloromethane), and the solvent was distilled away under a reduced pressure. As a result, tert-butyl 4-hydroxycinnamate (51 g) was obtained as a white solid.

Next, 20.0 g of tert-butyl 4-hydroxycinnamate, 20.0 g of 6-chlorohexyl acrylate, and 59 g of cesium carbonate were dissolved in 150 mL of dimethyl sulfoxide and the mixture was stirred at 60° C. for 3 hours. The reaction solution was cooled to room temperature and 600 mL of water and 300 mL of dichloromethane were added thereto. The organic layer was separated and the water layer was extracted with 150 mL of dichloromethane twice. The organic layer was collected, washed with a 10% hydrochloric acid, saturated sodium bicarbonate water, and saturated saline, and dried by adding sodium sulfate. Sodium sulfate was removed and the mixture was purified by column chromatography (alumina/silica gel, dichloromethane), and the solvent was distilled away under a reduced pressure. As a result, tert-butyl 4-(6-acryloyloxy) cinnamate (23 g) was obtained as a white solid.

Next, 23 g of the obtained tert-butyl 4-(6-acryloyloxy) cinnamate was dissolved in 70 mL of formic acid, followed by stirring at 50° C. for 2 hours. To the reaction solution, 200 mL of water was added and solid precipitates were collected by filtering. The solid was air-dried overnight, 150 mL of ethyl acetate and 200 mL of hexane were added thereto, and the mixture was stirred and suspended. The solid was filtered. As a result, 4-(6-acryloyloxy)cinnamic acid (10.75 g) was obtained.

Next, 10.0 g of the obtained 4-(6-acryloyloxy)cinnamic acid, 3.0 g of phenol, and 0.19 g of N,N-dimethylaminopyridine were dissolved in 70 mL of dichloromethane. The mixture was stirred at 0° C., and 5.15 g of N,N-diisopropylcarbodiimide was added dropwise. The mixture was stirred at room temperature for 2 hours and purified by column chromatography (alumina/silica gel, dichloromethane (ethyl acetate 3%)). The solvent was distilled away under a reduced pressure and reprecipitation was conducted with methanol. As a result, a compound (D-2) (9.89 g) was obtained as a white solid.

$^1$H-NMR (400 MHz, CDCl$_3$) δ: 1.46-1.53 (m, 4H), 1.70-1.74 (m, 2H), 1.80-1.84 (m, 2H), 4.01 (t, J=6.2 Hz, 2H), 4.19 (t, J=6.6 Hz, 2H), 5.82 (dd, J=1.6 Hz, 10.4 Hz, 1H), 6.14 (dd, J=10.4 Hz, 17.4 Hz, 1H), 6.41 (dd, J=1.2 Hz, 17.2 Hz, 1H), 6.49 (d, J=16 Hz, 1H), 6.92 (d, J=8.4 Hz, 2H), 7.16 (d, J=8.4 Hz, 2H), 7.25 (dd, J=6.8 Hz, 1.0 Hz, 1H) 7.40 (dd, J=7.8 Hz, 7.8 Hz, 2H), 7.53 (d, J=8.4 Hz, 2H) 7.82 (d, J=16 Hz, 1H)

EI-MS: 394 [M$^+$]

[Chem. 118]

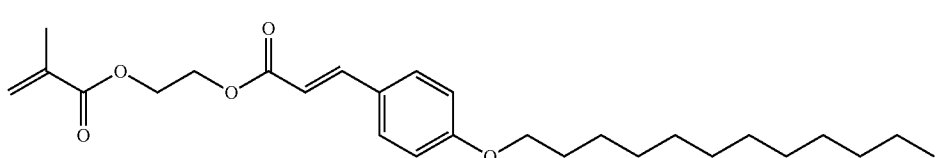

A compound (D-3) was synthesized according to the procedure described in Example 6 of European Patent Application Publication No. EP-A-0763552.

[Chem. 119]

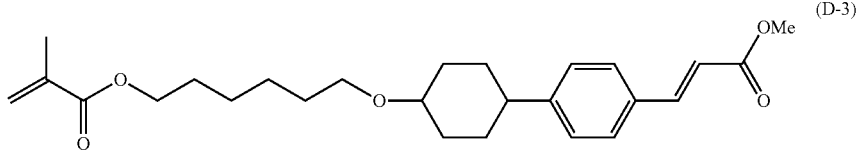

A compound (D-4) was synthesized according to the procedure described in a known document (Journal of Medicinal Chemistry, Vol. 23 (1980), 50-59).

[Chem. 120]

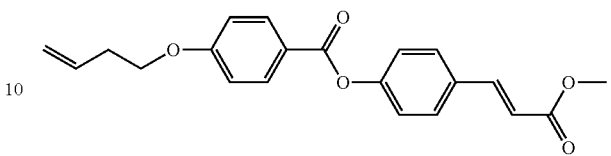

A compound (D-5) was synthesized according to the procedure described in Example 4 of Japanese Unexamined Patent Application Publication No. 9-118717.

[Chem. 121]

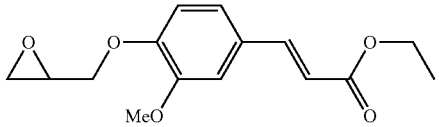

A compound (D-6) was synthesized according to the procedure described in a known document (Molecules vol. 11 (2007) 11, 2533-2545).

[Chem. 122]

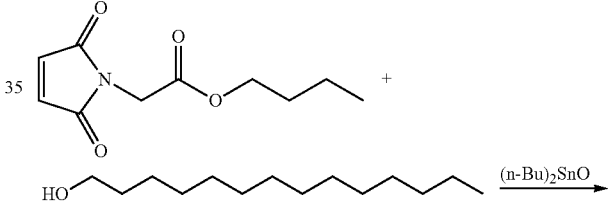

-continued

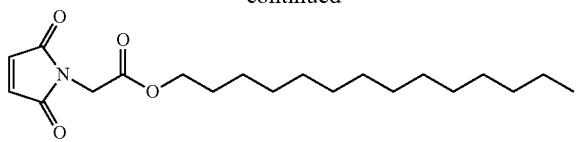

Butyl maleimidoacetate (9.01 g), 0.33 g of dibutyltin(IV) oxide, and 9.14 g of tetradecanol were dissolved in 40 mL of toluene, followed by stirring for 15 hours by being heated to reflux. The reaction solution was cooled to room temperature and 100 mL of toluene was added thereto. The resulting mixture was washed with saturated sodium bicarbonate water and then with saturated saline. To the resulting solution, sodium sulfate was added to conduct drying. Sodium sulfate was removed and the solvent was distilled away under a reduced pressure to reduce the volume to about 50 mL, and 40 mL of hexane and 20 mL of dichloromethane were added thereto. The resulting mixture was purified by column chromatography (alumina/silica gel, hexane/dichloromethane=2:1), the solvent was distilled away under a reduced pressure, and reprecipitation was conducted with methanol. As a result, a white crystal (V-1) was obtained (7.95 g).

$^1$H-NMR (400 MHz, CDCl$_3$) δ: 0.88 (t, J=6.8 Hz, 3H), 1.15-1.40 (m, 22H), 1.61-1.66 (tt, 2H), 4.14 (t, J=6.6 Hz, 2H), 4.15 (s, 2H), 6.79 (s, 2H)

EI-MS: 351 [M$^+$]

[Chem. 123]

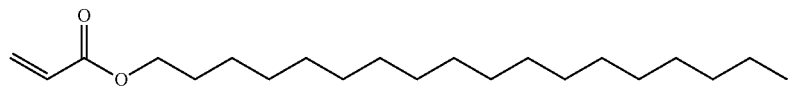

Stearyl acrylate (V-2) (produced by TCI) was purchased and used.

[Chem. 124]

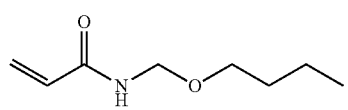

N-(Butoxymethyl)acrylamide (V-3) (produced by TCI) was purchased and used.

[Chem. 125]

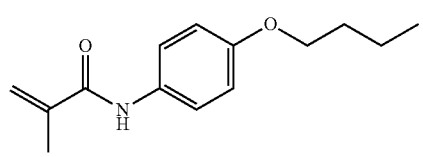

A compound (V-4) was synthesized according to the procedure described in a known document (Farmaco. Edizione Scientifica Vol. 22 (1967) 190, 590-598).

[Chem. 126]

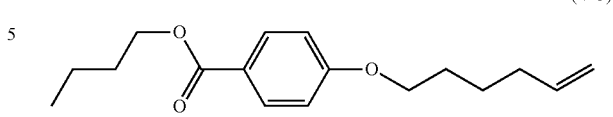

A compound (V-5) was synthesized according to the procedure described in a known document (Journal of the American Chemical Society Vol. 119 (1997) 13, 3027-3037).

[Chem. 127]

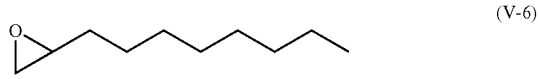

Epoxydecane (V-6) (produced by TCI) was purchased and used.

(Preparation of a Polymer (A-1) Having a Moiety that is Photochemically Isomerizable but not Photochemically Crosslinked)

In 10 parts of ethyl methyl ketone, 1 part (10.0 mmol) of a compound represented by formula (P-1) was dissolved to obtain a solution 1. To the solution 1, 0.01 parts of azobisisobutyronitrile (AIBN) was added. The mixture was heated to reflux for 2 days in a nitrogen atmosphere to obtain a solution 2. To 60 parts of methanol, the solution 2 was added dropwise under stirring, and solid precipitates were filtered. The obtained solid was dissolved in 5 parts of tetrahydrofuran (THF). The solution was added to 120 parts of iced hexane dropwise and solid precipitates were filtered. The obtained solid was dissolved in 5 parts of THF. The resulting solution was added to 120 parts of iced methanol dropwise under stirring, and solid precipitates were filtered. The obtained solid was dissolved in THF and vacuum dried. As a result, a polymer (A-1) having a moiety that is photochemically isomerizable but not photochemically crosslinked was obtained.

(Preparation of Polymers (A-2) to (A-6) Having a Moiety that is Photochemically Isomerizable but not Photochemically Crosslinked)

Polymers (A-2) to (A-6) having a moiety that is photochemically isomerizable but not photochemically crosslinked were obtained as with (A-1). The composition of each substance is as shown in Table 1.

TABLE 1

| Sample No. | Content (mol %) | | | | | | Amount of solvent (MEK) (parts) |
| --- | --- | --- | --- | --- | --- | --- | --- |
| | P-1 | P-2 | P-3 | P-4 | P-5 | P-6 | |
| A-1 | 100 | | | | | | 10 |
| A-2 | | 100 | | | | | 10 |

TABLE 1-continued

| Sample No. | Content (mol %) | | | | | | Amount of solvent (MEK) (parts) |
|---|---|---|---|---|---|---|---|
| | P-1 | P-2 | P-3 | P-4 | P-5 | P-6 | |
| A-3 | | | 100 | | | | 10 |
| A-4 | | | | 100 | | | 10 |
| A-5 | | | | | 100 | | 10 |
| A-6 | | | | | | 100 | 10 |

(Preparation of a Polymer (A-8) Having a Moiety that is Photochemically Isomerizable but not Photochemically Crosslinked)

Into a Schlenk flask having a silylated glass surface, a compound represented by formula (P-8) (10.0 mmol) and 3,5-di-tert-butylphenol were added. To the mixture 10 mL of dried tetrahydrofuran was added to dissolve the mixture and the reactor system was purged with nitrogen. Next, 0.2 mL of a 1 M hexane solution of phosphazene base t-Bu-$P_4$ was added and the mixture was heated at 60° C. for 2 days. As a result, a solution 5 was obtained. Next, the solution 5 was added to 600 mL of a mixed solvent (methanol:concentrated hydrochloric acid:water=97:1:2 (V:V:V)) dropwise under stirring and solid precipitates were separated. The obtained solid was dissolved in 15 mL of tetrahydrofuran and the solution was added to 400 mL of methanol dropwise. The obtained solid was dried under a high vacuum. As a result, a photoalignment film substance (A-8) was obtained.

(Preparation of Polymers (AV-1) to (AV-4) Having a Moiety that is Photochemically Isomerizable but not Photochemically Crosslinked)

Polymers (AV-1) to (AV-4) having a moiety that is photochemically isomerizable but not photochemically crosslinked were obtained as with (A-1). The composition of each substance is as shown in Table 2.

TABLE 2

| Sample No. | Content (mol %) | | | | | | | | Amount of solvent (MEK) (parts) |
|---|---|---|---|---|---|---|---|---|---|
| | P-1 | P-2 | P-3 | P-4 | V-1 | V-2 | V-3 | V-4 | |
| AV-1 | 50 | | | | 50 | | | | 10 |
| AV-2 | | 50 | | | | 50 | | | 10 |
| AV-3 | | | 50 | | | | 50 | | 10 |
| AV-4 | | | | 50 | | | | 50 | 10 |

(Preparation of a Polymer (AV-7) Having a Moiety that is Photochemically Isomerizable but not Photochemically Crosslinked)

A compound represented by formula (P-7) (0.7 mmol), a compound represented by (V-5) (0.7 mmol), and 0.04 g of poly(methylhydrogensiloxane) were dissolved in 3 mL of toluene to obtain a solution 3. The reaction system containing the solution 3 was vacuumed and purged with nitrogen. Next, while stirring the solution 3, 8 µL of a platinum-divinyltetramethyldisiloxane complex solution was sprayed to the reaction mixture at room temperature, followed by stirring at 55° C. for 24 hours. As a result, a solution 4 was obtained. The solution 4 was added to 400 mL of hexane dropwise under stirring, and solid precipitates were separated and dried. The obtained solid was dissolved in about 5 mL of toluene and precipitated in 400 mL of methanol. After conducting this operation twice, the mixture was dried under high vacuum. As a result, a polymer (AV-7) having a moiety that is photochemically isomerizable but not photochemically crosslinked was obtained.

(Preparation of a Polymer (AV-8) Having a Moiety that is Photochemically Isomerizable but not Photochemically Crosslinked)

Into a Schlenk flask having a silylated glass surface, a compound represented by formula (P-8) (5.0 mmol), a compound represented by formula (V-6) (5.0 mmol), and 3,5-di-tert-butylphenol were added. To the mixture, 10 mL of dried tetrahydrofuran was added to dissolve the mixture and the reactor system was purged with nitrogen. Next, 0.2 mL of a 1 M hexane solution of phosphazene base t-Bu-$P_4$ was added and the mixture was heated at 60° C. for 2 days. As a result, a solution 5 was obtained. Next, the solution 5 was added to 600 mL of a mixed solvent (methanol:concentrated hydrochloric acid:water=97:1:2 (V:V:V)) dropwise under stirring and solid precipitates were separated. The obtained solid was dissolved in 15 mL of tetrahydrofuran and the solution was added to 400 mL of methanol dropwise under stirring. The obtained solid was dried under a high vacuum. As a result, a polymer (AV-8) having a moiety that is photochemically isomerizable but not photochemically crosslinked was obtained.

(Preparation of a Polymer (AC-1) Having a Moiety that is Photochemically Isomerizable but not Photochemically Crosslinked and a Moiety that is Photochemically Crosslinkable)

Into 10 parts of ethyl methyl ketone, 0.5 parts (5.0 mmol) of a compound represented by formula (P-1) and 0.63 parts (5.0 mmol) or a compound represented by formula (D-1) were dissolved to obtain a solution 1. To the solution 1, 0.01 parts of azobisisobutyronitrile (AIBN) was added. The mixture was heated to reflux for 2 days in a nitrogen atmosphere to obtain a solution 2. To 60 parts of methanol, the solution 2 was added dropwise under stirring, and solid precipitates were filtered. The obtained solid was dissolved in 5 parts of tetrahydrofuran (THF). The solution was added to 120 parts of iced hexane dropwise under stirring and solid precipitates were filtered. The obtained solid was dissolved in 5 parts of THF. The resulting solution was added to 120 parts of iced methanol dropwise under stirring, and solid precipitates were filtered. The obtained solid was dissolved in THF and vacuum dried. As a result, a polymer (AC-1) having a moiety that is photochemically isomerizable but not photochemically crosslinked and a moiety that is photochemically crosslinkable was obtained.

(Preparation of Polymers (AC-2) to (AC-8) Having a Moiety that is Photochemically Isomerizable but not Photochemically Crosslinked and a Moiety that is Photochemically Crosslinkable)

Polymers (AC-2) to (AC-8) were obtained as with (AC-1). The composition of each substance is as shown in Table 3.

TABLE 3

| Sample No. | Content (mol %) | | | | | | Amount of solvent (MEK) (parts) |
|---|---|---|---|---|---|---|---|
| | P-1 | P-2 | D-1 | D-2 | D-3 | D-4 | |
| AC-1 | 50 | | 50 | | | | 10 |
| AC-2 | 50 | | | 50 | | | 10 |
| AC-3 | 50 | | | | 50 | | 10 |
| AC-4 | 20 | | 80 | | | | 10 |
| AC-5 | 80 | | 20 | | | | 10 |
| AC-6 | | 20 | | 80 | | | 10 |
| AC-7 | | 50 | | 50 | | | 10 |
| AC-8 | | 80 | | 20 | | | 10 |

(Preparation of a Polymer (AC-9) Having a Moiety that is Photochemically Isomerizable but not Photochemically Crosslinked and a Moiety that is Photochemically Crosslinkable)

A compound represented by formula (P-7) (0.7 mmol), a compound represented by formula (D-5) (0.7 mmol), and 0.04 g of poly(methylhydrogensiloxane) were dissolved in 3 mL of toluene to obtain a solution 3. The reaction system containing the solution 3 was vacuumed and purged with nitrogen. Next, while stirring the solution 3, 8 µL of a platinum-divinyltetramethyldisiloxane complex solution was sprayed to the reaction mixture at room temperature, followed by stirring at 55° C. for 24 hours. As a result, a solution 4 was obtained. The solution 4 was added to 400 mL of hexane dropwise under stirring, and solid precipitates were separated and dried. The obtained solid was dissolved in about 5 mL of toluene and precipitated in 400 mL of methanol. This operation was conducted twice and then drying was conducted under a high vacuum. As a result, a polymer (AC-9) having a moiety that is photochemically isomerizable but not photochemically crosslinked and a moiety that is photochemically crosslinkable was obtained.

(Preparation of a Polymer (AC-10) Having a Moiety that is Photochemically Isomerizable but not Photochemically Crosslinked and a Moiety that is Photochemically Crosslinkable)

Into a Schlenk flask having a silylated glass surface, a compound represented by formula (P-8) (5.0 mmol), a compound represented by formula (D-6) (5.0 mmol), and 3,5-di-tert-butylphenol were added. To the mixture, 10 mL of dried tetrahydrofuran was added to dissolve the mixture and the reactor system was purged with nitrogen. Next, 0.2 mL of a 1 M hexane solution of phosphazene base t-Bu-$P_4$ was added and the mixture was heated at 60° C. for 2 days. As a result, a solution 5 was obtained. Next, the solution 5 was added to 600 mL of a mixed solvent (methanol:concentrated hydrochloric acid:water=97:1:2 (V:V:V)) dropwise under stirring and solid precipitates were separated. The obtained solid was dissolved in 15 mL of tetrahydrofuran and the solution was added to 400 mL of methanol dropwise under stirring. The obtained solid was dried under a high vacuum. As a result, a polymer (AC-10) having a moiety that is photochemically isomerizable but not photochemically crosslinked and a moiety that is photochemically crosslinkable was obtained.

(Preparation of a Polymer (C-1) Having a Moiety that is Photochemically Crosslinkable)

To 10 parts of ethyl methyl ketone, 1 part (10.0 mmol) of a compound represented by formula (D-1) was dissolved to obtain a solution 1. To the solution 1, 0.01 parts of azobisisobutyronitrile (AIBN) was added. The mixture was heated to reflux for 2 days in a nitrogen atmosphere to obtain a solution 2. To 60 parts of methanol, the solution 2 was added dropwise under stirring and solid precipitates were filtered. The obtained solid was dissolved in 5 parts of tetrahydrofuran (THF). The solution was added to 120 parts of iced hexane dropwise under stirring and solid precipitates were filtered. The obtained solid was dissolved in 5 parts of THF. The resulting solution was added to 120 parts of iced methanol dropwise under stirring, and solid precipitates were filtered. The obtained solid was dissolved in THF and vacuum dried. As a result, a polymer (C-1) having a moiety that is photochemically crosslinkable was obtained.

(Preparation of Polymers (C-2) to (C-4) Having a Moiety that is Photochemically Crosslinkable)

Polymers (C-2) to (C-4) having a moiety that is photochemically crosslinkable were obtained as with (C-1). The composition of each substance is as shown in Table 4.

TABLE 4

| Sample | Content (mol %) | | | | Amount of solvent |
|---|---|---|---|---|---|
| No. | D-1 | D-2 | D-3 | D-4 | (MEK) (parts) |
| C-1 | 100 | | | | 10 |
| C-2 | | 100 | | | 10 |
| C-3 | | | 100 | | 10 |
| C-4 | | | | 100 | 10 |

(Preparation of Polymers (CV-1) to (CV-4) Having a Moiety that is Photochemically Crosslinkable)

Polymers (CV-1) to (CV-4) having a moiety that is photochemically crosslinkable were obtained as with (C-1). The composition of each substance is as shown in Table 5.

TABLE 5

| Sample No. | Content (mol %) | | | | | | | | Amount of solvent (MEK) (parts) |
|---|---|---|---|---|---|---|---|---|---|
| | D-1 | D-2 | D-3 | D-4 | V-1 | V-2 | V-3 | V-4 | |
| CV-1 | 60 | | | | 40 | | | | 10 |
| CV-2 | | 60 | | | | 40 | | | 10 |
| CV-3 | | | 60 | | | | 40 | | 10 |
| CV-4 | | | | 60 | | | | 40 | 10 |

EXAMPLE 1

Preparation of a Polymer (LPM-1) for Use in a Liquid Crystal Vertical Alignment Layer In a round-bottomed flask, 0.05 g of (A-5) and 0.95 g of (CV-1) were dissolved in 10 mL of tetrahydrofuran, and then tetrahydrofuran was distilled away under a reduced pressure to obtain a polymer (LPM-1) for use in a liquid crystal vertical alignment layer.

(Preparation of Liquid Crystal Vertical Alignment Layer and Liquid Crystal Display Element)

The polymer (LPM-1) for use in a liquid crystal vertical alignment layer was dissolved in N-methylpyrrolidone (NMP) to prepare a 0.5% solution, and the solution was stirred at room temperature for 10 minutes. The solution was then applied to a transparent-ITO-electrode-mounted glass plate serving as a substrate by using a spin coater and dried at 100° C. for 30 minutes. Parallel and linear polarized light of visible UV light (wavelength: 365 nm, irradiation intensity: 20 mW/cm$^2$) was applied from an ultrahigh-pressure mercury lamp to the coated glass plate substrate via a wavelength cut filter, a band-pass filter, and a polarizing filter. Application of the light was conducted in a direction 45 degrees with respect to the substrate. The irradiation dose was 90 mJ/cm$^2$. A liquid crystal cell was fabricated by using the coated glass plate prepared by the aforementioned method. The gap between the plates was set to 10 µm and the two glass plates were bonded.

Next, a nematic liquid crystal mixture having a negative dielectric anisotropy and a composition described below was charged in the cell at a temperature just exceeding a transparent point (Tc=85° C.)

[Chem. 128]

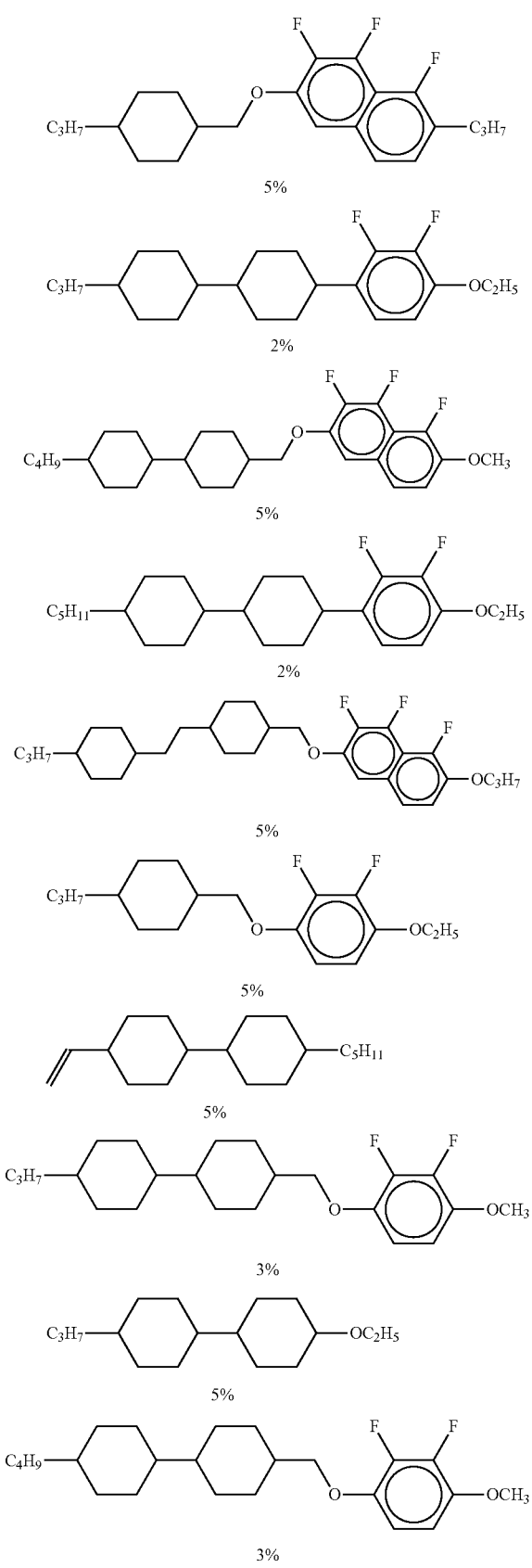

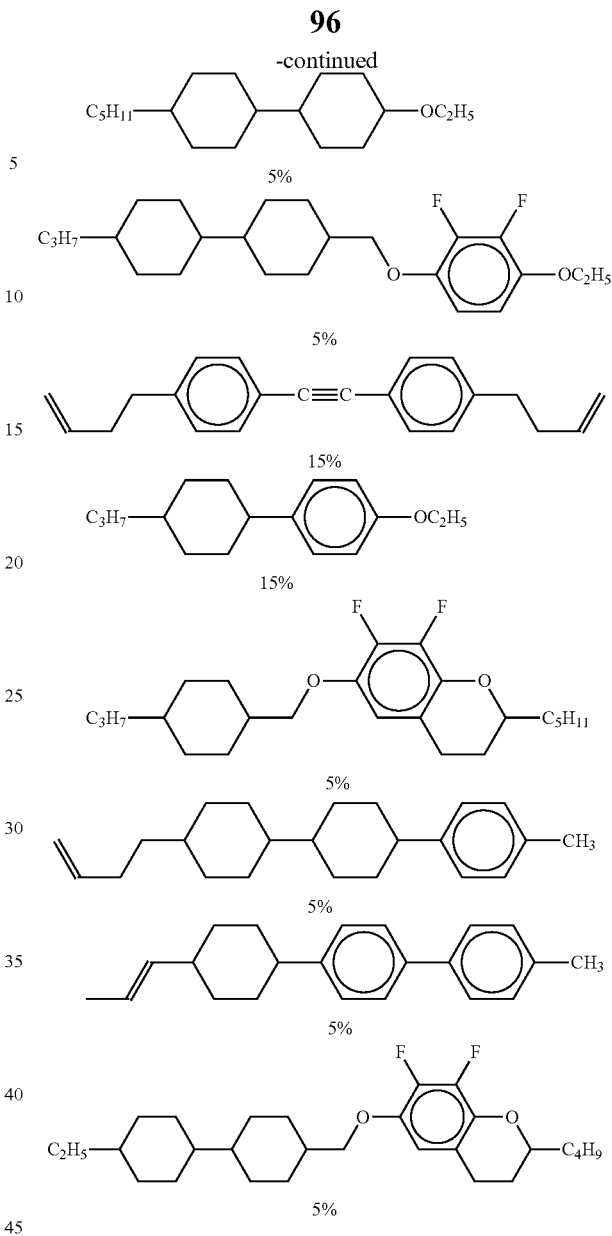

Then the mixture was cooled to room temperature. The tilt angle (pretilt angle) of the liquid crystal in the cell measured by a rotating crystal method was 88 degrees. The alignment of the liquid crystal was satisfactory. It was found that a liquid crystal vertical alignment layer can be obtained at a low irradiation dose. The liquid crystal cell obtained as such was interposed between two polarizers. When voltage was turned ON and OFF between the electrodes of the liquid crystal cell, dark-light changes were clearly observed and a liquid crystal display element was obtained.

EXAMPLES 2 to 17

Preparation of Polymers (LPM-2) to (LPM-17) for Use in Liquid Crystal Vertical Alignment Layers Polymers (LPM-2) to (LPM-17) for use in liquid crystal vertical alignment layers were obtained as in the preparation of the polymer (LPM-1) for use in a liquid crystal vertical alignment layer obtained in Example 1. The composition of each polymer for use in a liquid crystal vertical alignment layer is as shown in Tables 6 to 10.

TABLE 6

| Sample No. | A-1 | A-2 | A-3 | A-4 | A-5 | A-6 | A-8 | CV-1 | CV-2 | CV-3 | CV-4 |
|---|---|---|---|---|---|---|---|---|---|---|---|
| LPM-1 | | | | | 5 | | | 95 | | | |
| LPM-2 | | | | | | 5 | | | 95 | | |
| LPM-3 | | | 5 | | | | | | | | 95 |

TABLE 7

| Sample No. | AV-1 | AV-2 | AV-3 | AV-4 | AV-7 | AV-8 | C-1 | C-2 | C-3 | C-4 |
|---|---|---|---|---|---|---|---|---|---|---|
| LPM-4 | | | | 5 | | | | | | 95 |
| LPM-5 | | | | | | 5 | | | | 95 |

TABLE 8

| Sample No. | AV-1 | AV-2 | AV-3 | AV-4 | AV-7 | AV-8 | CV-1 | CV-2 | CV-3 | CV-4 |
|---|---|---|---|---|---|---|---|---|---|---|
| LPM-6 | 5 | | | | | | 95 | | | |
| LPM-7 | | 5 | | | | | | 95 | | |
| LPM-8 | | | 5 | | | | | | | 95 |
| LPM-9 | | | | | 5 | | | 95 | | |

TABLE 9

| Sample No. | AC-1 | AC-2 | AC-3 | AC-4 | AC-5 | CV-1 | CV-2 | CV-3 | CV-4 |
|---|---|---|---|---|---|---|---|---|---|
| LPM-10 | 10 | | | | | 90 | | | |
| LPM-11 | | 10 | | | | | 90 | | |
| LPM-12 | | | 10 | | | | | | 90 |
| LPM-13 | | | | 10 | | 90 | | | |

TABLE 10

| Sample No. | AC-6 | AC-7 | AC-8 | AC-9 | AC-10 | CV-1 | CV-2 | CV-3 | CV-4 |
|---|---|---|---|---|---|---|---|---|---|
| LPM-14 | 10 | | | | | 90 | | | |
| LPM-15 | | 10 | | | | | | | 90 |
| LPM-16 | | | 10 | | | | 90 | | |
| LPM-17 | | | | 10 | | 90 | | | |

(Preparation of Liquid Crystal Vertical Alignment Layer and Liquid Crystal Display Element)

Liquid crystal cells were fabricated using the polymers (LPM-2) to (LPM-17) for use in liquid crystal vertical alignment layers as in Example 1. The observed tilt angles (pretilt angles) are shown in Tables 11, 12, and 13. Regarding the liquid crystal alignment property, the presence of abnormal domains and alignment nonuniformity in the liquid crystal cell was observed. Samples with zero abnormal domain or alignment nonuniformity were rated A, samples with two or less abnormal domains or alignment nonuniformity were rated B, and samples with three or more abnormal domains or alignment nonuniformity were rated C. The pretilt angle was optically measured with a rotating crystal method. Samples with a pretilt angle of 88 degrees or more and 89 degrees or less were rated A, samples with a pretilt angle of 80 degree or more and less than 88 degrees or a pretilt angle of more than 89 degrees but not more than 90 degrees were rated B, and samples with a pretilt angle less than 80 degrees were rated C. Regarding optical stability, 3 J/cm$^2$ of unpolarized UV light was applied to the liquid crystal cell. Samples with a change of less than 0.3 degrees in pretilt angle between before and after irradiation were rated A, samples with a change of 0.3 degree or more and less than 1 degree were rated B, and samples with a change of 1 degree or more were rated C.

TABLE 11

| | Sample No. | UV dose mJ/cm2 | Alignment direction | Liquid crystal alignment property | Pretilt angle | Optical stability |
|---|---|---|---|---|---|---|
| EXAMPLE 1 | LPM-6 | 90 | Vertical | A | A | A |

TABLE 11-continued

| | Sample No. | UV dose mJ/cm2 | Alignment direction | Liquid crystal alignment property | Pretilt angle | Optical stability |
|---|---|---|---|---|---|---|
| EXAMPLE 2 | LPM-7 | 90 | Vertical | A | A | A |
| EXAMPLE 3 | LPM-9 | 90 | Vertical | A | A | A |

TABLE 12

| | Sample No. | UV dose mJ/cm2 | Alignment direction | Liquid crystal alignment property | Pretilt angle | Optical stability |
|---|---|---|---|---|---|---|
| EXAMPLE 4 | LPM-13 | 90 | Vertical | A | A | A |
| EXAMPLE 5 | LPM-15 | 90 | Vertical | A | A | A |
| EXAMPLE 6 | LPM-16 | 90 | Vertical | A | A | A |
| EXAMPLE 7 | LPM-17 | 90 | Vertical | A | A | A |
| EXAMPLE 8 | LPM-19 | 90 | Vertical | A | A | A |
| EXAMPLE 9 | LPM-21 | 90 | Vertical | A | A | A |

TABLE 13

|  | Sample No. | UV dose mJ/cm2 | Alignment direction | Liquid crystal alignment property | Pretilt angle | Optical stability |
|---|---|---|---|---|---|---|
| EXAMPLE 10 | LPM-32 | 70 | Vertical | A | A | A |
| EXAMPLE 11 | LPM-33 | 70 | Vertical | A | A | A |
| EXAMPLE 12 | LPM-35 | 70 | Vertical | A | A | A |
| EXAMPLE 13 | LPM-36 | 70 | Vertical | A | A | A |
| EXAMPLE 14 | LPM-37 | 70 | Vertical | A | A | A |
| EXAMPLE 15 | LPM-39 | 70 | Vertical | A | A | A |
| EXAMPLE 16 | LPM-40 | 70 | Vertical | A | A | A |
| EXAMPLE 17 | LPM-41 | 70 | Vertical | A | A | A |

These results show that the polymers (LPM-2) to (LPM-17) for use in liquid crystal vertical alignment layers can be used to fabricate a liquid crystal vertical alignment layer having a good liquid crystal alignment property, a large pretilt angle, and high optical stability by using a significantly low UV dose, and to fabricate a liquid crystal display element that uses the liquid crystal vertical alignment layer. The voltage applied to the liquid crystal cells was turned ON and OFF as in Example 1. As a result, switching was clearly observed, indicating a liquid crystal display element was obtained.

COMPARATIVE EXAMPLES 1 to 4

For comparison, polymers (LPM-A1), (LPM-C1), (LPM-AV1), and (LPM-CV1) shown in Table 14 were prepared as in Example 1.

TABLE 14

| Sample No. | Content (mol %) | | | Amount of solvent (MEK) (parts) |
|---|---|---|---|---|
|  | P-1 | D-3 | V-1 | |
| LPM-A1 | 100 | | | 10 |
| LPM-C1 | | 100 | | 10 |
| LPM-AV1 | 50 | | 50 | 10 |
| LPM-CV1 | | 50 | 50 | 10 |

The results of measurements conducted as in Example 1 are shown in Table 15.

TABLE 15

|  | Sample No. | UV dose (mJ/cm$^2$) | Alignment direction | Liquid crystal alignment property | Pretilt angle | Optical stability |
|---|---|---|---|---|---|---|
| Comparative Example 1 | LPM-A1 | 20 | Horizontal | A | A | C |
| Comparative Example 2 | LPM-C1 | 300 | Horizontal | B | B | A |
| Comparative Example 3 | LPM-AV1 | 50 | Vertical | A | A | C |
| Comparative Example 4 | LPM-CV1 | 300 | Vertical | B | B | A |

As results show, a liquid crystal vertical alignment layer having a good liquid crystal alignment property, a large pretilt angle, and high optical stability was not obtained at a low UV dose in Comparative Examples 1 to 4.

EXAMPLES 18 to 29

Preparation of Polymers (ACV-1) to (ACV-12) for Use in Liquid Crystal Vertical Alignment Layers Into 10 parts of ethyl methyl ketone, 0.1 parts (1.0 mmol) of a compound represented by formula (P-1), 0.9 parts (8.0 mmol) or a compound represented by formula (D-1), and 0.09 parts (1.0 mmol) of a compound represented by formula (V-1) were dissolved to obtain a solution 1. To the solution 1, 0.01 parts of azobisisobutyronitrile (AIBN) was added. The mixture was heated to reflux for 2 days in a nitrogen atmosphere to obtain a solution 2. To 60 parts of methanol, the solution 2 was added dropwise under stirring, and solid precipitates were filtered. The obtained solid was dissolved in 5 parts of tetrahydrofuran (THF). The solution was added to 120 parts of iced hexane dropwise under stirring and solid precipitates were filtered. The obtained solid was dissolved in 5 parts of THF. The resulting solution was added to 120 parts of iced methanol dropwise under stirring, and solid precipitates were filtered. The obtained solid was dissolved in THF and vacuum dried. As a result, a polymer (ACV-1) for use in a liquid crystal vertical alignment layer was obtained.

Polymers (ACV-2) to (ACV-10) for use in liquid crystal vertical alignment layers were obtained as with the polymer (ACV-1) for use in a liquid crystal vertical alignment layer. The composition of each substance is as shown in Table 16.

TABLE 16

| Sample No. | Content (mol %) | | | | | | | | Amount of solvent (MEK) (parts) |
|---|---|---|---|---|---|---|---|---|---|
|  | (P-1) | (D-1) | (D-2) | (D-3) | (V-1) | (V-2) | (V-3) | (V-4) | |
| ACV-1 | 10 | 80 | | | 10 | | | | 10 |
| ACV-2 | 1 | 89 | | | 10 | | | | 10 |
| ACV-3 | 1 | 96 | | | 3 | | | | 10 |
| ACV-4 | 1 | 96 | | | | 3 | | | 10 |
| ACV-5 | 1 | 96 | | | | | 3 | | 10 |
| ACV-6 | 1 | 96 | | | | | | 3 | 10 |
| ACV-7 | 1 | | 96 | | 3 | | | | 10 |
| ACV-8 | 1 | | 96 | | | 3 | | | 10 |
| ACV-9 | 1 | | | 96 | 3 | | | | 10 |
| ACV-10 | 1 | | | 96 | | 3 | | | 10 |

A compound represented by formula (P-7) (0.014 mmol), a compound represented by formula (D-5) (1.344 mmol), a compound represented by formula (V-5) (0.042 mmol), and 0.071 g of poly(methylhydrogensiloxane) were dissolved in 3 mL of toluene to obtain a solution 3. The reaction system containing the solution 3 was vacuumed and purged with nitrogen. Next, while stirring the solution 3, 8 µL of a platinum-divinyltetramethyldisiloxane complex solution was sprayed to the reaction mixture at room temperature, followed by stirring at 55° C. for 24 hours. As a result, a solution 4 was obtained. The solution 4 was added to 400 mL of hexane dropwise under stirring, and solid precipitates were separated and dried. The obtained solid was dissolved in about 5 mL of toluene and precipitated in 400 mL of methanol. This operation was conducted twice and then drying was conducted under a high vacuum. As a result, a polymer (ACV-11) for use in a liquid crystal vertical alignment layer was obtained.

Into a Schlenk flask having a silylated glass surface, a compound represented by formula (P-8) (0.1 mmol), a compound represented by formula (D-6) (9.6 mmol), a compound represented by formula (V-6) (0.3 mmol), and 3,5-di-tert-butylphenol were added. To the mixture, 10 mL of dried tetrahydrofuran was added to dissolve the mixture and the reactor system was purged with nitrogen. Next, 0.2 mL of a 1 M hexane solution of phosphazene base t-Bu-$P_4$ was added and the mixture was heated at 60° C. for 2 days. As a result, a solution 5 was obtained. Next, the solution 5 was added to 600 mL of a mixed solvent (methanol:concentrated hydrochloric acid:water=97:1:2 (V:V:V)) dropwise under stirring and solid precipitates were separated. The obtained solid was dissolved in 15 mL of tetrahydrofuran and the solution was added to 400 mL of methanol dropwise under stirring. The obtained solid was dried under a high vacuum. As a result, a polymer (ACV-12) for use in a liquid crystal vertical alignment layer was obtained.

(Preparation of Liquid Crystal Vertical Alignment Layer and Liquid Crystal Display Element)

Liquid crystal cells were fabricated using the polymer (ACV-1) to (ACV-12) for use in liquid crystal vertical alignment layers as in Example 1. The observed tilt angles (pretilt angles) are shown in Table 17. Regarding the liquid crystal alignment property, the presence of abnormal domains and alignment nonuniformity in the liquid crystal cell was observed. Samples with zero abnormal domain or alignment nonuniformity were rated A, samples with two or less abnormal domains or alignment nonuniformity were rated B and samples with three or more abnormal domains or alignment nonuniformity were rated C. The pretilt angle was optically measured with a rotating crystal method. Samples with a pretilt angle of 88 degrees or more and 89 degrees or less were rated A, samples with a pretilt angle of 80 degree or more and less than 88 degrees or a pretilt angle of more than 89 degrees but not more than 90 degrees were rated B, and samples with a pretilt angle less than 80 degrees were rated C. Regarding optical stability, 3 J/cm$^2$ of unpolarized UV light was applied to the liquid crystal cell. Samples with a change of less than 0.3 degrees in pretilt angle between before and after irradiation were rated A, samples with a change of 0.3 degree or more and less than 1 degree were rated B, and samples with a change of 1 degree or more were rated C.

TABLE 17

|  | Sample No. | UV dose (mJ/cm$^2$) | Liquid crystal alignment property | Pretilt angle | Optical stability |
|---|---|---|---|---|---|
| Example 18 | ACV-1 | 70 | A | A | B |
| Example 19 | ACV-2 | 90 | A | A | B |

TABLE 17-continued

|  | Sample No. | UV dose (mJ/cm$^2$) | Liquid crystal alignment property | Pretilt angle | Optical stability |
|---|---|---|---|---|---|
| Example 20 | ACV-3 | 90 | A | A | A |
| Example 21 | ACV-4 | 90 | A | A | A |
| Example 22 | ACV-5 | 90 | A | A | A |
| Example 23 | ACV-6 | 90 | A | A | A |
| Example 24 | ACV-7 | 90 | A | A | A |
| Example 25 | ACV-8 | 90 | A | A | A |
| Example 26 | ACV-9 | 90 | A | A | A |
| Example 27 | ACV-10 | 90 | A | A | A |
| Example 28 | ACV-11 | 90 | A | A | A |
| Example 29 | ACV-12 | 90 | A | A | A |

These results show that the polymers for use in liquid crystal vertical alignment layers of the invention can be used to fabricate a liquid crystal vertical alignment layer having a good liquid crystal alignment property, a large pretilt angle, and high optical stability by using a significantly low UV dose. The voltage applied to the liquid crystal cells was turned ON and OFF as in Example 1. As a result, switching was clearly observed, indicating a liquid crystal display element was obtained.

EXAMPLES 30 to 53

Preparation of Polymers for Use in Liquid Crystal Vertical Alignment Layers

To 10 parts of ethyl methyl ketone (MEK), 1 part (10 mmol) of a compound represented by formula (P-3) was dissolved to obtain a solution 1. To the solution 1, 0.01 parts of azobisisobutyronitrile (AIBN) was added. The mixture was heated to reflux for 2 days in a nitrogen atmosphere to obtain a solution 2. To 60 parts of methanol, the solution 2 was added dropwise under stirring, and solid precipitates were filtered. The obtained solid was dissolved in 5 parts of tetrahydrofuran (THF). The solution was added to 120 parts of iced hexane dropwise under stirring and solid precipitates were filtered. The obtained solid was dissolved in 5 parts of THF. The resulting solution was added to 120 parts of iced methanol dropwise under stirring, and solid precipitates were filtered. The obtained solid was dissolved in THF and vacuum dried. As a result, a polymer (ACV-21) for use in a liquid crystal vertical alignment layer was obtained.

Polymers (ACV-22) to (ACV-26), (ACVC-1) to (ACVC-10), and (ACVV-1) to (ACVV-8) for use in liquid crystal vertical alignment layers were obtained as with the polymer for use in a liquid crystal vertical alignment layer (ACV-21). The composition of each polymer for use in a liquid crystal vertical alignment layer is as shown in Tables 18, 19, and 20.

TABLE 18

| Sample No. | Content (mol %) | | | | | | Amount of solvent |
|---|---|---|---|---|---|---|---|
|  | (P-3) | (P-4) | (P-5) | (P-14) | (P-15) | (P-6) | (MEK) (parts) |
| ACV-21 | 100 |  |  |  |  |  | 10 |
| ACV-22 |  | 100 |  |  |  |  | 10 |
| ACV-23 |  |  | 100 |  |  |  | 10 |
| ACV-24 |  |  |  | 100 |  |  | 10 |
| ACV-25 |  |  |  |  | 100 |  | 10 |
| ACV-26 |  |  |  |  |  | 100 | 10 |

TABLE 19

| Sample No. | P-3 | P-4 | P-5 | P-14 | P-15 | P-6 | D-1 | D-2 | D-3 | D-4 | Amount of solvent (MEK) (parts) |
|---|---|---|---|---|---|---|---|---|---|---|---|
| ACVC-1 |  | 80 |  |  |  |  |  | 20 |  |  | 10 |
| ACVC-2 |  | 50 |  |  |  |  |  | 50 |  |  | 10 |
| ACVC-3 |  | 20 |  |  |  |  |  | 80 |  |  | 10 |
| ACVC-4 |  | 5 |  |  |  |  |  | 95 |  |  | 10 |
| ACVC-5 |  | 1 |  |  |  |  |  | 99 |  |  | 10 |
| ACVC-6 | 1 |  |  |  |  |  |  | 99 |  |  | 10 |
| ACVC-7 |  |  | 1 |  |  |  |  |  | 99 |  | 10 |
| ACVC-8 |  |  |  | 1 |  |  |  |  |  | 99 | 10 |
| ACVC-9 |  |  |  |  | 1 |  |  |  |  | 99 | 10 |
| ACVC-10 |  |  |  |  |  | 1 |  | 99 |  |  | 10 |

TABLE 20

| Sample No. | P-4 | D-1 | D-2 | D-3 | D-4 | V-1 | V-3 | V-4 | Amount of solvent (MEK) (parts) |
|---|---|---|---|---|---|---|---|---|---|
| ACVV-1 | 10 | 87 |  |  |  | 3 |  |  | 10 |
| ACVV-2 | 10 |  | 87 |  |  |  | 3 |  | 10 |
| ACVV-3 | 10 |  |  | 87 |  |  |  | 3 | 10 |
| ACVV-4 | 10 |  |  |  | 87 | 3 |  |  | 10 |
| ACVV-5 | 1 | 96 |  |  |  |  | 3 |  | 10 |
| ACVV-6 | 1 |  | 96 |  |  |  |  | 3 | 10 |
| ACVV-7 | 1 |  |  | 96 |  | 3 |  |  | 10 |
| ACVV-8 | 1 |  |  |  | 96 |  | 3 |  | 10 |

EXAMPLES 54 to 77

Preparation of Liquid Crystal Vertical Alignment Layer and Liquid Crystal Display Element Liquid crystal cells of Examples 54 to 77 were fabricated using the polymers (ACV-21) to (ACV-26), (ACVC-1) to (ACVC-10), and (ACVV-1) to (ACVV-8) for use in liquid crystal vertical alignment layers as in Example 1. The observed tilt angles (pretilt angles) are shown in Tables 21, 22, and 23. Regarding the liquid crystal alignment property, the presence of abnormal domains and alignment nonuniformity in the liquid crystal cell was observed. Samples with zero abnormal domain or alignment nonuniformity were rated A, samples with two or less abnormal domains or alignment nonuniformity were rated B and samples with three or more abnormal domains or alignment nonuniformity were rated C. The pretilt angle was optically measured with a rotating crystal method. Samples with a pretilt angle of 88 degrees or more and 89 degrees or less were rated A, samples with a pretilt angle of 80 degree or more and less than 88 degrees or a pretilt angle of more than 89 degrees but not more than 90 degrees were rated B, and samples with a pretilt angle less than 80 degrees were rated C. Regarding optical stability, 3 J/cm² of unpolarized UV light was applied to the liquid crystal cell. Samples with a change of less than 0.3 degrees in pretilt angle between before and after irradiation were rated A, samples with a change of 0.3 degree or more and less than 1 degree were rated B, and samples with a change of 1 degree or more were rated C.

TABLE 21

| Sample No. | UV dose (mJ/cm²) | Liquid crystal alignment property | Pretilt angle | Optical stability |
|---|---|---|---|---|
| Example 30 | ACV-21 | 70 | A | A | A |
| Example 31 | ACV-22 | 70 | A | A | A |
| Example 32 | ACV-23 | 70 | A | A | A |
| Example 33 | ACV-24 | 70 | A | A | A |
| Example 34 | ACV-25 | 70 | A | A | A |
| Example 35 | ACV-26 | 70 | A | A | A |

TABLE 22

| Sample No. | UV dose (mJ/cm²) | Liquid crystal alignment property | Pretilt angle | Optical stability |
|---|---|---|---|---|
| Example 36 | ACVC-1 | 70 | A | A | A |
| Example 37 | ACVC-2 | 80 | A | A | A |
| Example 38 | ACVC-3 | 90 | A | A | A |
| Example 39 | ACVC-4 | 90 | A | A | A |
| Example 40 | ACVC-5 | 90 | A | A | A |
| Example 41 | ACVC-6 | 90 | A | A | A |
| Example 42 | ACVC-7 | 90 | A | A | A |
| Example 43 | ACVC-8 | 90 | A | A | A |
| Example 44 | ACVC-9 | 90 | A | A | A |
| Example 45 | ACVC-10 | 90 | A | A | A |

TABLE 23

| Sample No. | UV dose (mJ/cm²) | Liquid crystal alignment property | Pretilt angle | Optical stability |
|---|---|---|---|---|
| Example 46 | ACVV-1 | 90 | A | A | A |
| Example 47 | ACVV-2 | 90 | A | A | A |
| Example 48 | ACVV-3 | 90 | A | A | A |
| Example 49 | ACVV-4 | 90 | A | A | A |
| Example 50 | ACVV-5 | 90 | A | A | A |
| Example 51 | ACVV-6 | 90 | A | A | A |
| Example 52 | ACVV-7 | 90 | A | A | A |
| Example 53 | ACVV-8 | 90 | A | A | A |

These results show that the polymer for use in a liquid crystal vertical alignment layers of the invention can be used to fabricate a liquid crystal vertical alignment layer having a good liquid crystal alignment property, a large pretilt angle, and high optical stability by using a significantly low UV dose. The voltage applied to the liquid crystal cells was turned ON and OFF as in Example 1. As a result, switching was clearly observed, indicating a liquid crystal display element was obtained.

COMPARATIVE EXAMPLES 5 to 8

For comparison, polymers (C-1), (AC-11), (AV-11), and (CV-11) having compositions shown in Table 24 were prepared as in Example 1.

TABLE 24

| Sample No. | (P-1) | (D-1) | (D-2) | (D-3) | (V-1) | (V-2) | (V-3) | (V-4) | Amount of solvent (MEK) (parts) |
|---|---|---|---|---|---|---|---|---|---|
| C-1 |  | 100 |  |  |  |  |  |  | 10 |
| AC-11 | 1 | 99 |  |  |  |  |  |  | 10 |

TABLE 24-continued

| Sample No. | Content (mol %) | | | | | | | Amount of solvent (MEK) (parts) |
|---|---|---|---|---|---|---|---|---|
| | (P-1) | (D-1) | (D-2) | (D-3) | (V-1) | (V-2) | (V-3) | (V-4) | |
| AV-11 | 25 | | | | | 75 | | | 10 |
| CV-11 | | 97 | | | | 3 | | | 10 |

The results of measurements conducted as in Example 1 are shown in Table 25.

TABLE 25

| | Sample No. | UV dose (mJ/cm$^2$) | Liquid crystal alignment property | Pretilt angle | Optical stability |
|---|---|---|---|---|---|
| Comparative Example 5 | C-1 | 300 | B | C | A |
| Comparative Example 6 | AC-11 | 90 | A | C | A |
| Comparative Example 7 | AV-11 | 50 | A | A | C |
| Comparative Example 8 | CV-11 | 300 | B | A | A |

These results show that a polymer that does not have a moiety that is photochemically isomerizable but not photochemically crosslinked requires a high UV dose and exhibits an inferior liquid crystal alignment property. The results also show that a polymer that does not have a photochemically crosslinkable moiety has low optical stability. The results also show that a polymer that does not have a moiety that stabilizes a vertical alignment cannot form a desired pretilt angle.

Accordingly, it has been found that the present invention provides a polymer for use in a liquid crystal vertical alignment layer that enables control of alignment at a low UV dose and provides a large pretilt angle and superior alignment stability and optical stability, a liquid crystal vertical alignment layer using the polymer, and a liquid crystal display element using the liquid crystal vertical alignment layer.

The invention claimed is:

1. A polymer for use in a liquid crystal vertical alignment layer, comprising (a) a moiety that is photochemically isomerizable but not photochemically crosslinked; (b) a moiety that is photochemically crosslinkable; and (c) a moiety that stabilizes a vertical alignment.

2. The polymer for use in a liquid crystal vertical alignment layer according to claim 1, wherein the polymer is a cured product of monomers represented by general formulae (Iaaa-1), (Iaaa-2), and (Iaaa-3):

$$M_a\text{-}S_a\text{-}P \quad \text{(Iaaa-1)}$$

$$M_b\text{-}S_b\text{-}D \quad \text{(Iaaa-2)}$$

$$M_c\text{-}S_c\text{-}V_c \quad \text{(Iaaa-3)}$$

(where $M_a$, $M_b$, and $M_c$ each represent a monomer unit of the polymer and may be different from one another; $S_a$, $S_b$, and $S_c$ each represent a spacer unit and may be different from one another; P represents a moiety that is photochemically isomerizable but not photochemically crosslinked; D represents a moiety that is photochemically crosslinkable; and $V_c$ represents a moiety that stabilizes a vertical alignment).

3. The polymer for use in a liquid crystal vertical alignment layer according to claim 2, further comprising one monomer unit or two or more different monomer units each represented by a formula selected from the group consisting of the following formulae (QIII-1) to (QIII-17):

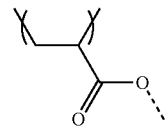
(QIII-1)

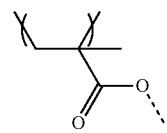
(QIII-2)

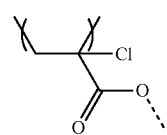
(QIII-3)

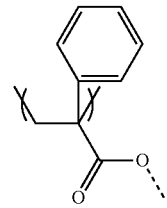
(QIII-4)

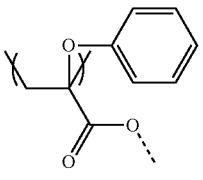
(QIII-5)

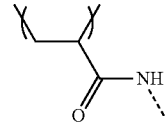
(QIII-6)

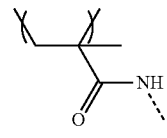
(QIII-7)

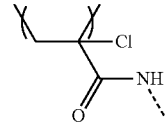
(QIII-8)

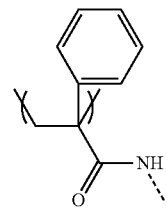
(QIII-9)

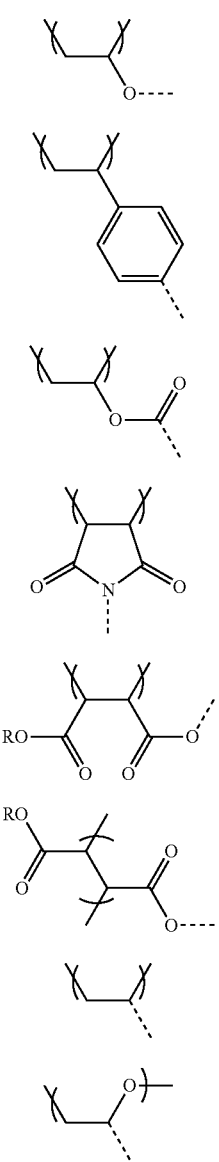

(QIII-10)

(QIII-11)

(QIII-12)

(QIII-13)

(QIII-14)

(QIII-15)

(QIII-16)

(QIII-17)

(where a broken line represents a bond to a monovalent organic group; R independently represents hydrogen or an alkyl group having 1 to 5 carbon atoms; any hydrogen in each structure may be substituted with a fluorine atom, a chlorine atom, a methyl group, or a methoxy group; and said monovalent organic group is hydrogen or an alkyl group having 1 to 12 carbon atoms (i) in which any hydrogen atom in the alkyl group may be substituted with a fluorine atom, a chlorine atom, a methyl group, or a methoxy group and (ii) in which one CH$_2$ group or two or more non-neighboring CH$_2$ groups in the alkyl group may be substituted with —O—, —CO—O—, —O—CO—, —CH=CH—, a trans-1,4-cyclohexylene group, a trans-1,3-dioxan-2,5-yl group, a 1,4-naphthylene group, a 2,6-naphthylene group, a 2,5-thiophenylene group, a 2,5-furanylene group, or 1,4-phenylene group in which any hydrogen of each group may be substituted with a fluorine atom, a chlorine atom, a methyl group, or a methoxy group), wherein the polymer has a structural unit represented by general formula (Iaaa):

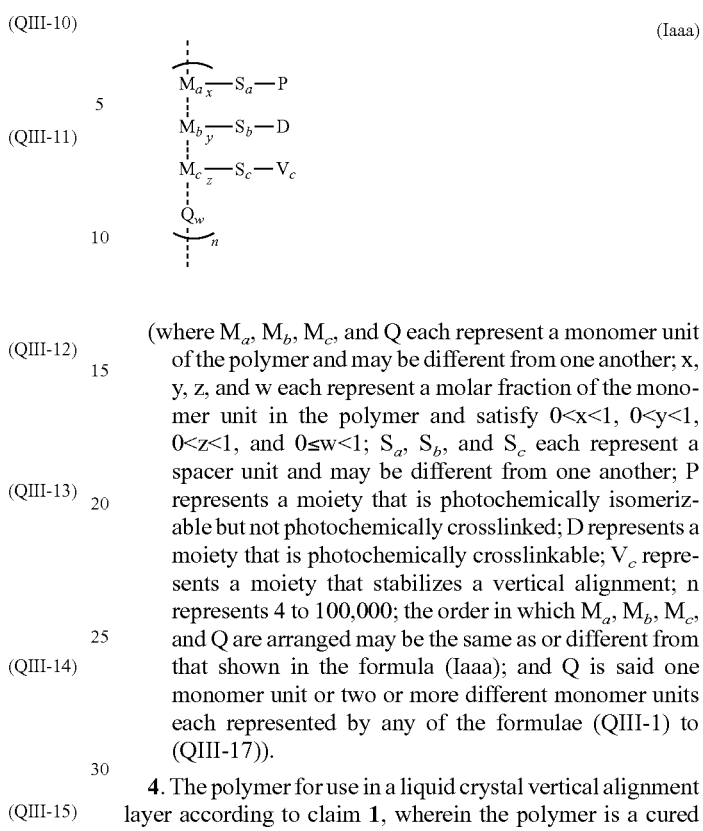

(Iaaa)

(where $M_a$, $M_b$, $M_c$, and Q each represent a monomer unit of the polymer and may be different from one another; x, y, z, and w each represent a molar fraction of the monomer unit in the polymer and satisfy 0<x<1, 0<y<1, 0<z<1, and 0≤w<1; $S_a$, $S_b$, and $S_c$ each represent a spacer unit and may be different from one another; P represents a moiety that is photochemically isomerizable but not photochemically crosslinked; D represents a moiety that is photochemically crosslinkable; $V_c$ represents a moiety that stabilizes a vertical alignment; n represents 4 to 100,000; the order in which $M_a$, $M_b$, $M_c$, and Q are arranged may be the same as or different from that shown in the formula (Iaaa); and Q is said one monomer unit or two or more different monomer units each represented by any of the formulae (QIII-1) to (QIII-17)).

4. The polymer for use in a liquid crystal vertical alignment layer according to claim 1, wherein the polymer is a cured product of monomers represented by general formulae (Ibbb-1) and (Ibbb-2):

$$M_a\text{-}S_a\text{-}P\text{-}S_{aa}\text{-}V_a \quad \text{(Ibbb-1)}$$

$$M_b\text{-}S_b\text{-}D \quad \text{(Ibbb-2)}$$

(where $M_a$ and $M_b$ each represent a monomer unit of the polymer and may be different from one another; $S_a$, $S_b$, and $S_{aa}$ each represent a spacer unit and may be different from one another; P represents a moiety that is photochemically isomerizable but not photochemically crosslinked; D represents a moiety that is photochemically crosslinkable; and $V_a$ represents a moiety that stabilizes a vertical alignment).

5. The polymer for use in a liquid crystal vertical alignment layer according to claim 4, further comprising one monomer unit or two or more different monomer units each represented by a formula selected from the group consisting of the following formulae (QIII-1) to (QIII-17):

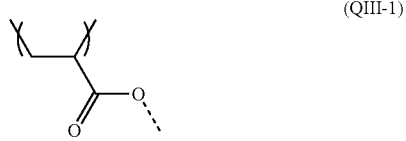

(QIII-1)

(QIII-2)

-continued (QIII-3) 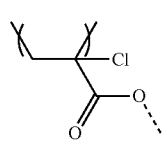

(QIII-4) 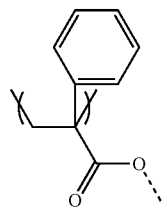

(QIII-5) 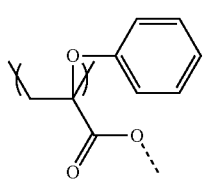

(QIII-6) 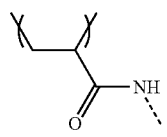

(QIII-7) 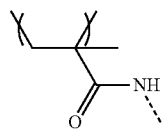

(QIII-8) 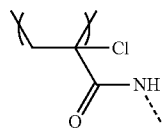

(QIII-9) 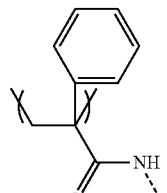

(QIII-10) 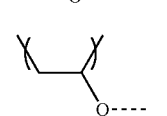

(QIII-11) 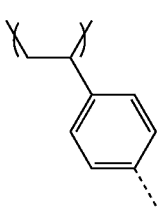

(QIII-12) 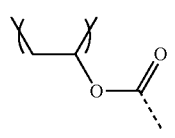

-continued (QIII-13) 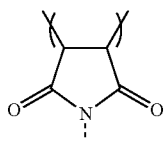

(QIII-14) 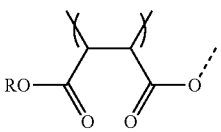

(QIII-15) 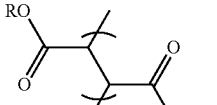

(QIII-16) 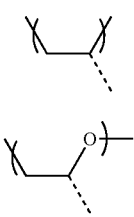

(QIII-17) 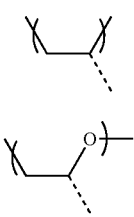

(where a broken line represents a bond to a monovalent organic group; R independently represents hydrogen or an alkyl group having 1 to 5 carbon atoms; any hydrogen in each structure may be substituted with a fluorine atom, a chlorine atom, a methyl group, or a methoxy group; and said monovalent organic group is hydrogen or an alkyl group having 1 to 12 carbon atoms (i) in which any hydrogen atom in the alkyl group may be substituted with a fluorine atom, a chlorine atom, a methyl group, or a methoxy group and (ii) in which one $CH_2$ group or two or more non-neighboring $CH_2$ groups in the alkyl group may be substituted with —O—, —CO—O—, —O—CO—, —CH=CH—, a trans-1,4-cyclohexylene group, a trans-1,3-dioxan-2,5-yl group, a 1,4-naphthylene group, a 2,6-naphthylene group, a 2,5-thiophenylene group, a 2,5-furanylene group, or 1,4-phenylene group in which any hydrogen of each group may be substituted with a fluorine atom, a chlorine atom, a methyl group, or a methoxy group), wherein the polymer has a structural unit represented by general formula (Ibbb):

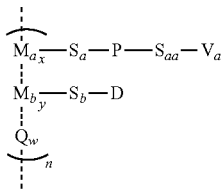

(Ibbb)

(where $M_a$, $M_b$, and Q each represent a monomer unit of the polymer and may be different from one another; x, y, and w each represent a molar fraction of the monomer unit in the polymer and satisfy $0<x<1$, $0<y<1$, and $0 \leq w<1$; $S_a$, $S_b$, and $S_{aa}$ each represent a spacer unit and may be different from one another; P represents a moiety that is photochemically isomerizable but not photochemically crosslinked; D represents a moiety that is photochemically crosslinkable; $V_a$ represents a moiety that stabilizes a vertical alignment; n represents 4 to 100,000; the order in which $M_a$, $M_b$, and Q are arranged may be the same as or different from that shown in the formula (Ibbb); and Q is said one monomer unit or two or more different monomer units each represented by any of the formulae (QIII-1) to (QIII-17)).

6. The polymer for use in a liquid crystal vertical alignment layer according to claim 1, wherein the polymer is a cured product of monomers represented by general formulae (Iccc-1) and (Iccc-2):

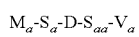

$M_a\text{-}S_a\text{-}D\text{-}S_{aa}\text{-}V_a$     (Iccc-1)

$M_b\text{-}S_b\text{-}P$     (Iccc-2)

(where $M_a$ and $M_b$ each represent a monomer unit of the polymer and may be different from one another; $S_a$, $S_b$, and $S_{aa}$ each represent a spacer unit and may be different from one another; P represents a moiety that is photochemically isomerizable but not photochemically crosslinked; D represents a moiety that is photochemically crosslinkable; and $V_a$ represents a moiety that stabilizes a vertical alignment).

7. The polymer for use in a liquid crystal vertical alignment layer according to claim 6, further comprising one monomer unit or two or more different monomer units each represented by a formula selected from the group consisting of the following formulae (QIII-1) to (QIII-17):

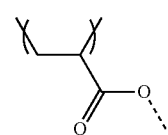

(QIII-1)

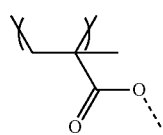

(QIII-2)

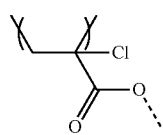

(QIII-3)

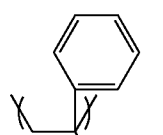

(QIII-4)

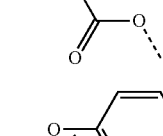

(QIII-5)

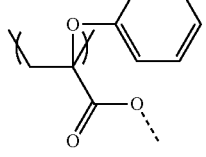

-continued

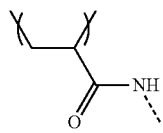

(QIII-6)

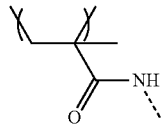

(QIII-7)

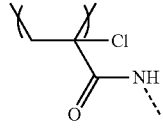

(QIII-8)

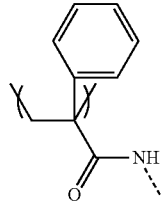

(QIII-9)

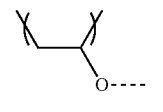

(QIII-10)

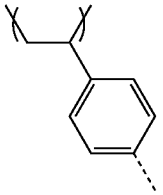

(QIII-11)

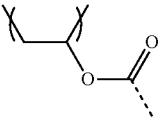

(QIII-12)

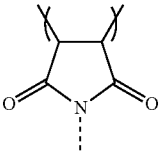

(QIII-13)

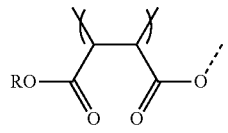

(QIII-14)

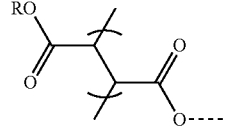

(QIII-15)

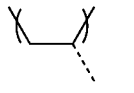

(QIII-16)

-continued (QIII-17)

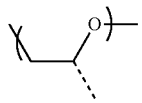

(where a broken line represents a bond to a monovalent organic group; R independently represents hydrogen or an alkyl group having 1 to 5 carbon atoms; any hydrogen in each structure may be substituted with a fluorine atom, a chlorine atom, a methyl group, or a methoxy group; and said monovalent organic group is hydrogen or an alkyl group having 1 to 12 carbon atoms (i) in which any hydrogen atom in the alkyl group may be substituted with a fluorine atom, a chlorine atom, a methyl group, or a methoxy group and (ii) in which one $CH_2$ group or two or more non-neighboring $CH_2$ groups in the alkyl group may be substituted with —O—, —CO—O—, —O—CO—, —CH=CH—, a trans-1,4-cyclohexylene group, a trans-1,3-dioxan-2,5-yl group, a 1,4-naphthylene group, a 2,6-naphthylene group, a 2,5-thiophenylene group, a 2,5-furanylene group, or 1,4-phenylene group in which any hydrogen of each group may be substituted with a fluorine atom, a chlorine atom, a methyl group, or a methoxy group),
wherein the polymer has a structural unit represented by general formula (Iccc):

(Iccc)

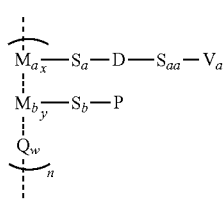

(where $M_a$, $M_b$, and Q each represent a monomer unit of the polymer and may be different from one another; x, y, and w each represent a molar fraction of the monomer unit in the polymer and satisfy $0<x<1$, $0<y<1$, and $0≤w<1$; $S_a$, $S_b$, and $S_{aa}$ each represent a spacer unit and may be different from one another; P represents a moiety that is photochemically isomerizable but not photochemically crosslinked; D represents a moiety that is photochemically crosslinkable; $V_a$ represents a moiety that stabilizes a vertical alignment; n represents 4 to 100,000; the order in which $M_a$, $M_b$, and Q are arranged may be the same as or different from that shown in the formula (Iccc); and Q is said one monomer unit or two or more different monomer units each represented by any of the formulae (QIII-1) to (QIII-17)).

8. The polymer for use in a liquid crystal vertical alignment layer according to claim 1, wherein the polymer is a cured product of monomers represented by general formulae (Iddd-1) and (Iddd-2):

$$M_a\text{-}S_a\text{-}P\text{-}S_{aa}\text{-}V_a \quad \text{(Iddd-1)}$$

$$M_b\text{-}S_b\text{-}D\text{-}S_{bb}\text{-}V_b \quad \text{(Iddd-2)}$$

(where $M_a$ and $M_b$ each represent a monomer unit of the polymer and may be different from one another; $S_a$, $S_b$, $S_{aa}$, and $S_{bb}$ each represent a spacer unit and may be different from one another; P represents a moiety that is photochemically isomerizable but not photochemically crosslinked; D represents a moiety that is photochemically crosslinkable; and $V_a$ and $V_b$ each represent a moiety that stabilizes a vertical alignment and may be different from one another).

9. The polymer for use in a liquid crystal vertical alignment layer according to claim 8, further comprising one monomer unit or two or more different monomer units each represented by a formula selected from the group consisting of the following formulae (QIII-1) to (QIII-17):

(QIII-1)

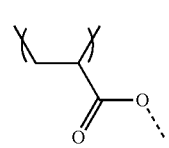

(QIII-2)

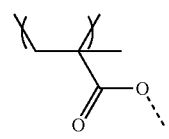

(QIII-3)

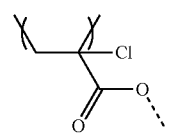

(QIII-4)

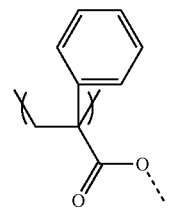

(QIII-5)

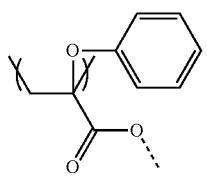

(QIII-6)

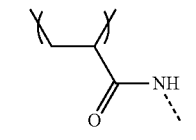

(QIII-7)

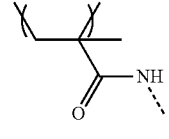

(QIII-8)

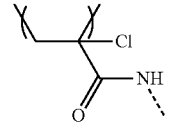

-continued (QIII-9)

(QIII-10)

(QIII-11)

(QIII-12)

(QIII-13)

(QIII-14)

(QIII-15)

(QIII-16)

(QIII-17)

(where a broken line represents a bond to a monovalent organic group; R independently represents hydrogen or an alkyl group having 1 to 5 carbon atoms; any hydrogen in each structure may be substituted with a fluorine atom, a chlorine atom, a methyl group, or a methoxy group; and said monovalent organic group is hydrogen or an alkyl group having 1 to 12 carbon atoms (i) in which any hydrogen atom in the alkyl group may be substituted with a fluorine atom, a chlorine atom, a methyl group, or a methoxy group and (ii) in which one $CH_2$ group or two or more non-neighboring $CH_2$ groups in the alkyl group may be substituted with —O—, —CO—O—, —O—CO—, —CH=CH—, a trans-1,4-cyclohexylene group, a trans-1,3-dioxan-2,5-yl group, a 1,4-naphthylene group, a 2,6-naphthylene group, a 2,5-thiophenylene group, a 2,5-furanylene group, or 1,4-phenylene group in which any hydrogen of each group may be substituted with a fluorine atom, a chlorine atom, a methyl group, or a methoxy group), wherein the polymer has a structural unit represented by general formula (Iddd):

$$\begin{array}{c} \overbrace{M_{a\overline{x}}-S_a-P-S_{aa}-V_a} \\ M_{b\overline{y}}-S_b-D-S_{bb}-V_b \\ \underbrace{Q_w}_{n} \end{array}$$ (Iddd)

(where $M_a$, $M_b$, and Q each represent a monomer unit of the polymer and may be different from one another; x, y, and w each represent a molar fraction of the monomer unit in the polymer and satisfy $0<x<1$, $0<y<1$, and $0 \leq w<1$; $S_a$, $S_b$, $S_{aa}$, and $S_{bb}$ each represent a spacer unit and may be different from one another; P represents a moiety that is photochemically isomerizable but not photochemically crosslinked; D represents a moiety that is photochemically crosslinkable; $V_a$ and $V_b$ each represent a moiety that stabilizes a vertical alignment and may be different from each other; n represents 4 to 100,000; the order in which $M_a$, $M_b$, and Q are arranged may be the same as or different from that shown in the formula (Iddd); and Q is said one monomer unit or two or more different monomer units each represented by any of the formulae (QIII-1) to (QIII-17)).

10. The polymer for use in a liquid crystal vertical alignment layer according to claim 1, wherein the polymer is a cured product of a monomer represented by general formula (Iaa-1) or (Ibb-1), a cured product of monomers represented by general formulae (Icc-1) and (Icc-2), or a cured product of monomers represented by general formulae (Idd-1) and (Idd-2):

$$M_a\text{-}S_a\text{-}P\text{-}S_{aa}\text{-}D\text{-}S_{aaa}\text{-}V_a \quad \text{(Iaa-1)}$$

$$M_a\text{-}S_a\text{-}D\text{-}S_{aa}\text{-}P\text{-}S_{aaa}\text{-}V_a \quad \text{(Ibb-1)}$$

(where $M_a$ each represent a monomer unit of the polymer and may be different from one another; $S_a$, $S_{aa}$, and $S_{aaa}$ each represent a spacer unit and may be different from one another; P represents a moiety that is photochemically isomerizable but not photochemically crosslinked; D represents a moiety that is photochemically crosslinkable; and $V_a$ represents a moiety that stabilizes a vertical alignment);

$$M_a\text{-}S_a\text{-}P\text{-}S_{aa}\text{-}D \quad \text{(Icc-1)}$$

$$M_c\text{-}S_c\text{-}V_c \quad \text{(Icc-2)}$$

(where $M_a$ and $M_c$ each represent a monomer unit of the polymer and may be different from one another; $S_a$, $S_{aa}$, and $S_c$ each represent a spacer unit and may be different from one another; P represents a moiety that is photochemically isomerizable but not photochemically crosslinked; D represents a moiety that is photochemically crosslinkable; and $V_c$ represents a moiety that stabilizes a vertical alignment);

$M_a\text{-}S_a\text{-}D\text{-}S_{aa}\text{-}P$ (Idd-1)

$M_c\text{-}S_c\text{-}V_c$ (Idd-2)

(where $M_a$ and $M_c$ each represent a monomer unit of the polymer and may be different from one another; $S_a$, $S_{aa}$, and $S_c$ each represent a spacer unit and may be different from one another; P represents a moiety that is photochemically isomerizable but not photochemically crosslinked; D represents a moiety that is photochemically crosslinkable; and $V_c$ represents a moiety that stabilizes a vertical alignment).

11. The polymer for use in a liquid crystal vertical alignment layer according to claim 10, further comprising one monomer unit or two or more different monomer units each represented by a formula selected from the group consisting of the following formulae (QIII-1) to (QIII-17):

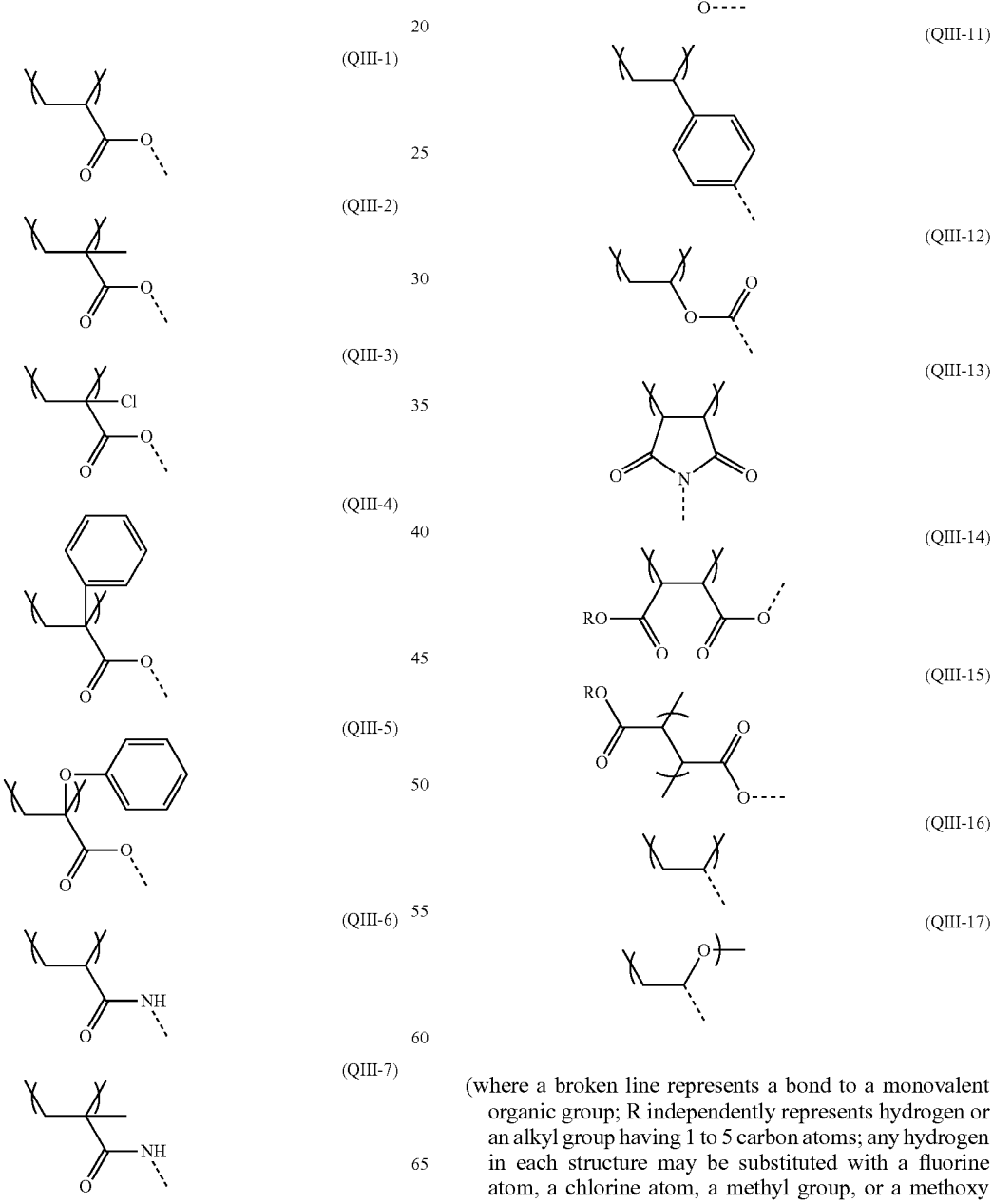

(where a broken line represents a bond to a monovalent organic group; R independently represents hydrogen or an alkyl group having 1 to 5 carbon atoms; any hydrogen in each structure may be substituted with a fluorine atom, a chlorine atom, a methyl group, or a methoxy group; and said monovalent organic group is hydrogen or an alkyl group having 1 to 12 carbon atoms (i) in which any hydrogen atom in the alkyl group may be substituted with a fluorine atom, a chlorine atom, a methyl group, or a methoxy group and (ii) in which one $CH_2$ group or two or more non-neighboring $CH_2$ groups in the alkyl group may be substituted with —O—, —CO—O—, —O—CO—, —CH=CH—, a trans-1,4-cyclohexylene group, a trans-1,3-dioxan-2,5-yl group, a 1,4-naphthylene group, a 2,6-naphthylene group, a 2,5-thiophenylene group, a 2,5-furanylene group, or 1,4-phenylene group in which any hydrogen of each group may be substituted with a fluorine atom, a chlorine atom, a methyl group, or a methoxy group),
wherein the polymer has a structural unit represented by general formula (Iaa), general formula (Ibb), general formula (Icc), or general formula (Idd):

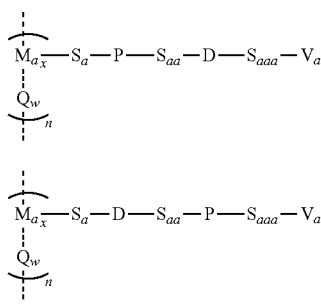

(Iaa)

(Ibb)

(where $M_a$ and Q each represent a monomer unit of the polymer and may be different from one another; Q is said one monomer unit or two or more different monomer units each represented by any of the formulae (QIII-1) to (QIII-17); x and w represent molar fractions of the monomer units in general formula (Iaa) and general formula (Ibb) and satisfy $0<x\leq 1$ and $0\leq w<1$; $S_a$, $S_{aa}$, and $S_{aaa}$ each represent a spacer unit and may be different from one another; P represents a moiety that is photochemically isomerizable but not photochemically crosslinked; D represents a moiety that is photochemically crosslinkable; $V_a$ represents a moiety that stabilizes a vertical alignment; and n represents 4 to 100,000);

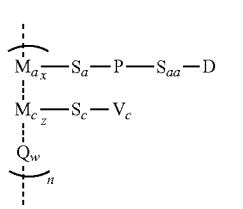

(Icc)

(where $M_a$, $M_c$, and Q each independently represent a monomer unit of the polymer; the order in which $M_a$, $M_c$, and Q are arranged may be the same as or different from that shown in the formula (Icc); Q is said one monomer unit or two or more different monomer units each represented by any of the formulae (QIII-1) to (QIII-17); x, z, and w represent molar fractions of the monomer units and satisfy $0<x<1$, $0<z<1$, and $0\leq w<1$; $S_a$, $S_{aa}$, and $S_c$ each represent a spacer unit and may be different from one another; P represents a moiety that is photochemically isomerizable but not photochemically crosslinked; D represents a moiety that is photochemically crosslinkable; $V_c$ represents a moiety that stabilizes a vertical alignment; and n represents 4 to 100,000);

(Idd)

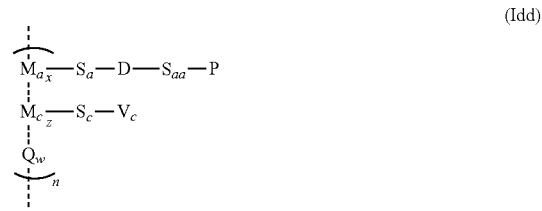

(where $M_a$, $M_c$, and Q each independently represent a monomer unit of the polymer; the order in which $M_a$, $M_c$, and Q are arranged may be the same as or different from that shown in the formula (Idd); Q is said one monomer unit or two or more different monomer units each represented by any of the formulae (QIII-1) to (QIII-17); x, z, and w represent molar fractions of the monomer units in the polymer and satisfy $0<x<1$, $0<z<1$, and $0\leq w<1$; $S_a$, $S_{aa}$, and $S_c$ each represent a spacer unit and may be different from one another; P represents a moiety that is photochemically isomerizable but not photochemically crosslinked; D represents a moiety that is photochemically crosslinkable; $V_c$ represents a moiety that stabilizes a vertical alignment; and n represents 4 to 100,000).

12. The polymer for use in a liquid crystal vertical alignment layer according to claim 1, wherein the polymer contains (a) a polymer having a moiety that is photochemically isomerizable but not photochemically crosslinked and (b) a polymer having a moiety that is photochemically crosslinkable, and the polymer (a) and the polymer (b) have structures different from each other.

13. The polymer for use in a liquid crystal vertical alignment layer according to claim 12, further comprising one monomer unit or two or more different monomer units each represented by a formula selected from the group consisting of the following formulae (QII-1) to (QII-17):

(QIII-1)

(QIII-2)

(QIII-3)

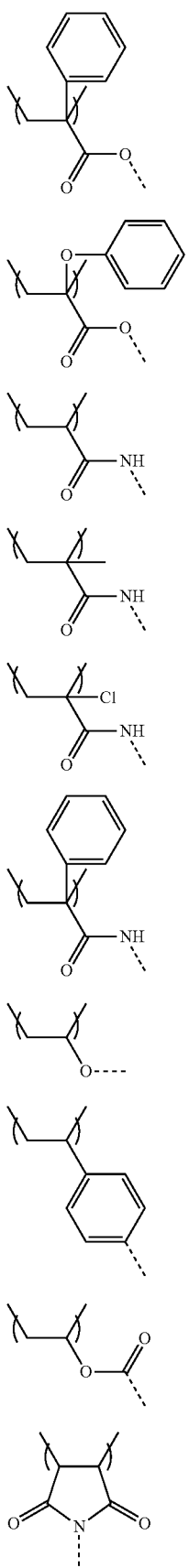
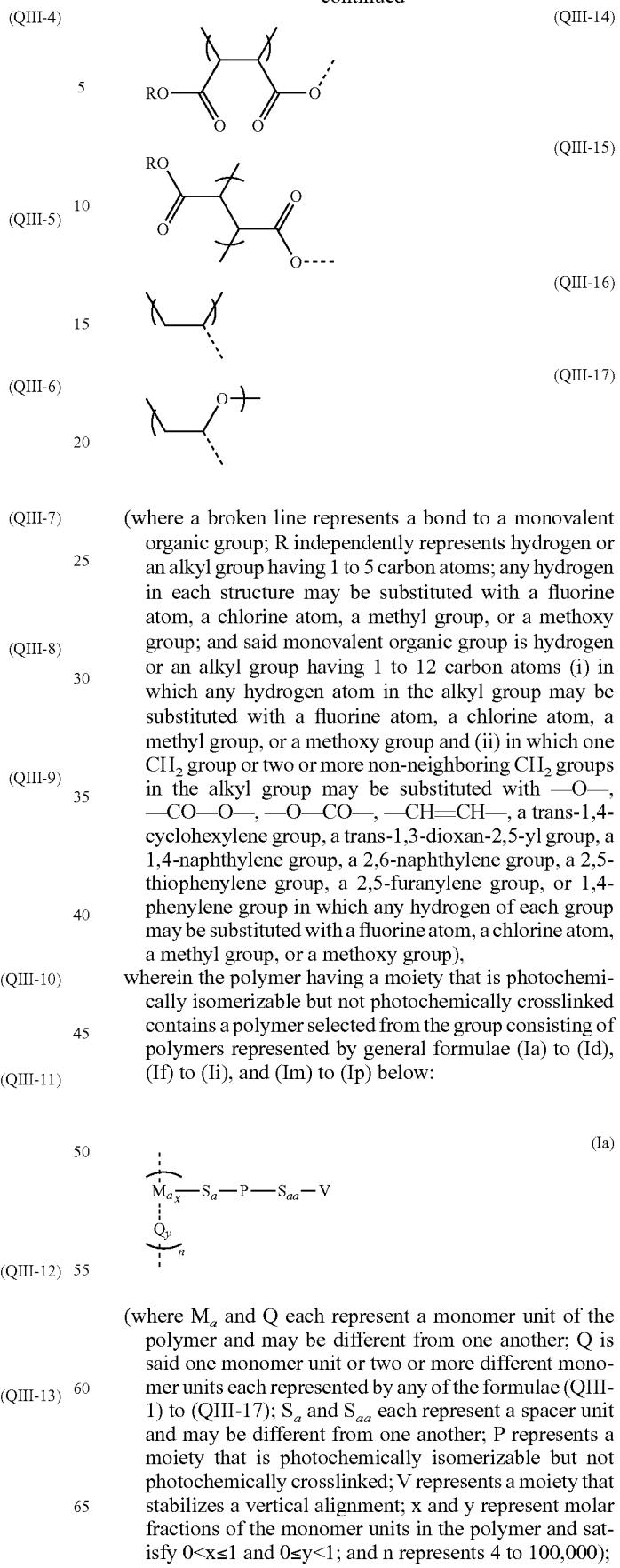

(where a broken line represents a bond to a monovalent organic group; R independently represents hydrogen or an alkyl group having 1 to 5 carbon atoms; any hydrogen in each structure may be substituted with a fluorine atom, a chlorine atom, a methyl group, or a methoxy group; and said monovalent organic group is hydrogen or an alkyl group having 1 to 12 carbon atoms (i) in which any hydrogen atom in the alkyl group may be substituted with a fluorine atom, a chlorine atom, a methyl group, or a methoxy group and (ii) in which one $CH_2$ group or two or more non-neighboring $CH_2$ groups in the alkyl group may be substituted with —O—, —CO—O—, —O—CO—, —CH=CH—, a trans-1,4-cyclohexylene group, a trans-1,3-dioxan-2,5-yl group, a 1,4-naphthylene group, a 2,6-naphthylene group, a 2,5-thiophenylene group, a 2,5-furanylene group, or 1,4-phenylene group in which any hydrogen of each group may be substituted with a fluorine atom, a chlorine atom, a methyl group, or a methoxy group), wherein the polymer having a moiety that is photochemically isomerizable but not photochemically crosslinked contains a polymer selected from the group consisting of polymers represented by general formulae (Ia) to (Id), (If) to (Ii), and (Im) to (Ip) below:

$$\left( M_{a_x} - S_a - P - S_{aa} - V \atop Q_y \right)_n \quad (Ia)$$

(where $M_a$ and Q each represent a monomer unit of the polymer and may be different from one another; Q is said one monomer unit or two or more different monomer units each represented by any of the formulae (QIII-1) to (QIII-17); $S_a$ and $S_{aa}$ each represent a spacer unit and may be different from one another; P represents a moiety that is photochemically isomerizable but not photochemically crosslinked; V represents a moiety that stabilizes a vertical alignment; x and y represent molar fractions of the monomer units in the polymer and satisfy $0 < x \leq 1$ and $0 \leq y < 1$; and n represents 4 to 100,000);

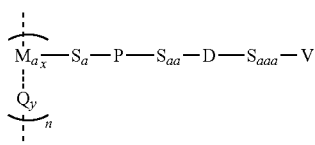

(Ib)

(where $M_a$ and Q each represent a monomer unit of the polymer and may be different from one another; Q is said one monomer unit or two or more different monomer units each represented by any of the formulae (QIII-1) to (QIII-17); $S_a$, $S_{aa}$, and $S_{aaa}$ each represent a spacer unit and may be different from one another; P represents a moiety that is photochemically isomerizable but not photochemically crosslinked; D represents a moiety that is photochemically crosslinkable; V represents a moiety that stabilizes a vertical alignment; x and y represent molar fractions of the monomer units in the polymer and satisfy $0<x\leq1$ and $0\leq y<1$; and n represents 4 to 100,000);

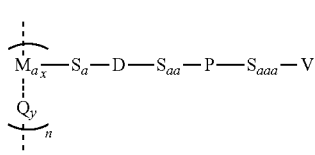

(Ic)

(where $M_a$ and Q each represent a monomer unit of the polymer and may be different from one another; Q is said one monomer unit or two or more different monomer units each represented by any of the formulae (QIII-1) to (QIII-17); $S_a$, $S_{aa}$, and $S_{aaa}$ each represent a spacer unit and may be different from one another; P represents a moiety that is photochemically isomerizable but not photochemically crosslinked; D represents a moiety that is photochemically crosslinkable; V represents a moiety that stabilizes a vertical alignment; x and y represent molar fractions of the monomer units in the polymer and satisfy $0<x\leq1$ and $0\leq y<1$; and n represents 4 to 100,000);

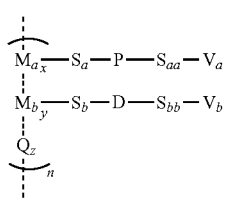

(Id)

(where $M_a$, $M_b$, and Q each represent a monomer unit of the polymer and may be different from one another; the order in which $M_a$, $M_b$, and Q are arranged may be the same as or different from that shown in the formula (Id); Q is said one monomer unit or two or more different monomer units each represented by any of the formulae (QIII-1) to (QIII-17); $S_a$, $S_{aa}$, $S_b$, and $S_{bb}$ each represent a spacer unit and may be different from one another; $V_a$ and $V_b$ each represent a moiety that stabilizes a vertical alignment; x, y, and z represent molar fractions of the monomer units in the polymer and satisfy $0<x<1$, $0<y<1$, and $0\leq z<1$; P represents a moiety that is photochemically isomerizable but not photochemically crosslinked; D represents a moiety that is photochemically crosslinkable; and n represents 4 to 100,000);

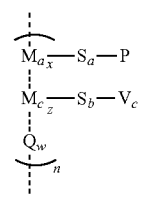

(If)

(where $M_a$, $M_c$, and Q each independently represent a monomer unit of the polymer; the order in which $M_a$, $M_c$, and Q are arranged may be the same as or different from that shown in the formula (If); Q is said one monomer unit or two or more different monomer units each represented by any of the formulae (QIII-1) to (QIII-17); x, z, and w represent molar fractions of the monomer units in the polymer and satisfy $0<x<1$, $0<z<1$, and $0\leq w<1$; $S_a$ and $S_c$ each represent a spacer unit and may be different from one another; P represents a moiety that is photochemically isomerizable but not photochemically crosslinked; $V_c$ represents a moiety that stabilizes a vertical alignment; and n represents 4 to 100,000);

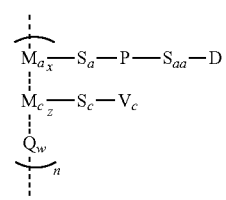

(Ig)

(where $M_a$, $M_c$, and Q each independently represent a monomer unit of the polymer; the order in which $M_a$, $M_c$, and Q are arranged may be the same as or different from that shown in the formula (Ig); Q is said one monomer unit or two or more different monomer units each represented by any of the formulae (QIII-1) to (QIII-17); x, z, and w represent molar fractions of the monomer units in the polymer and satisfy $0<x<1$, $0<z<1$, and $0\leq w<1$; $S_a$, $S_{aa}$, and $S_c$ each represent a spacer unit and may be different from one another; P represents a moiety that is photochemically isomerizable but not photochemically crosslinked; D represents a moiety that is photochemically crosslinkable; $V_c$ represents a moiety that stabilizes a vertical alignment; and n represents 4 to 100,000);

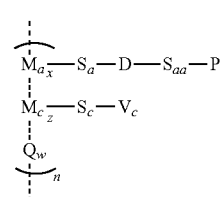

(Ih)

(where $M_a$, $M_c$, and Q each independently represent a monomer unit of the polymer; the order in which $M_a$, $M_c$, and Q are arranged may be the same as or different from that shown in the formula (Ih); Q is said one monomer unit or two or more different monomer units each represented by any of the formulae (QIII-1) to (QIII-17); x, z, and w represent molar fractions of the monomer units in the polymer and satisfy $0<x<1$, $0<z<1$, and $0 \leq w<1$; $S_a$, $S_{aa}$, and $S_c$ each represent a spacer unit and may be different from one another; P represents a moiety that is photochemically isomerizable but not photochemically crosslinked; D represents a moiety that is photochemically crosslinkable; $V_c$ represents a moiety that stabilizes a vertical alignment; and n represents 4 to 100,000);

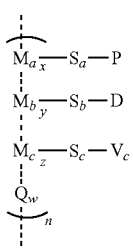

(Ii)

(where $M_a$, $M_b$, $M_c$, and Q each independently represent a monomer unit of the polymer; x, y, z, and w each represent a molar fraction of the monomer unit in the polymer and satisfy $0<x<1$, $0<y<1$, $0<z<1$, and $0 \leq w<1$; $S_a$, $S_b$, and $S_c$ each represent a spacer unit and may be different from one another; P represents a moiety that is photochemically isomerizable but not photochemically crosslinked; D represents a moiety that is photochemically crosslinkable; $V_c$ represents a moiety that stabilizes a vertical alignment; n represents 4 to 100,000; the order in which $M_a$, $M_b$, $M_c$, and Q are arranged may be the same as or different from that shown in the formula (Ii); and Q is said one monomer unit or two or more different monomer units each represented by any of the formulae (QIII-1) to (QIII-17));

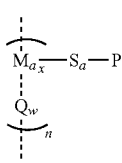

(Im)

(where $M_a$ and Q each represent a monomer unit of the polymer and may be different from one another; Q is said one monomer unit or two or more different monomer units each represented by any of the formulae (QIII-1) to (QIII-17); $S_a$ represents a spacer unit; P represents a moiety that is photochemically isomerizable but not photochemically crosslinked; x and w represent molar fractions of the monomer units in the polymer and satisfy $0<x \leq 1$ and $0 \leq w<1$; and n represents 4 to 100,000);

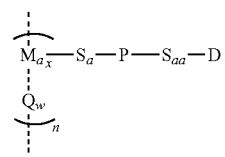

(In)

(where $M_a$ and Q each represent a monomer unit of the polymer and may be different from one another; Q is said one monomer unit or two or more different monomer units each represented by any of the formulae (QIII-1) to (QIII-17); $S_a$ and $S_{aa}$ each represent a spacer unit and may be different from one another; P represents a moiety that is photochemically isomerizable but not photochemically crosslinked; D represents a moiety that is photochemically crosslinkable; x and w represent molar fractions of the monomer units in the polymer and satisfy $0<x \leq 1$ and $0 \leq w<1$; and n represents 4 to 100,000);

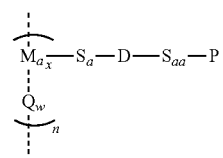

(Io)

(where $M_a$ and Q each represent a monomer unit of the polymer and may be different from one another; Q is said one monomer unit or two or more different monomer units each represented by any of the formulae (QIII-1) to (QIII-17); $S_a$ and $S_{aa}$ each represent a spacer unit and may be different from one another; P represents a moiety that is photochemically isomerizable but not photochemically crosslinked; D represents a moiety that is photochemically crosslinkable; x and w represent molar fractions of the monomer units in the polymer and satisfy $0<x \leq 1$ and $0 \leq w<1$; and n represents 4 to 100,000);

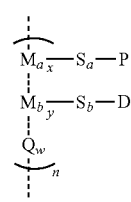

(Ip)

(where $M_a$, $M_b$, and Q each represent a monomer unit of the polymer and may be different from one another; the order in which $M_a$, $M_b$, and Q are arranged may be the same as or different from that shown in the formula (Ip); Q is said one monomer unit or two or more different monomer units each represented by any of the formulae (QIII-1) to (QIII-17); $S_a$ and $S_b$ each represent a spacer unit and may be different from one another; P represents a moiety that is photochemically isomerizable but not photochemically crosslinked; D represents a moiety that is photochemically crosslinkable; x, y, and w represent molar fractions of the monomer units in the polymer and satisfy $0<x<1$, $0<y<1$, and $0 \leq w<1$; and n represents 4 to 100,000).

14. The polymer for use in a liquid crystal vertical alignment layer according to claim 13, wherein the polymer having a moiety that is photochemically crosslinkable is a polymer represented by general formula (Ie), a polymer represented by general formula (Ij), or a polymer represented by a general formula (Iq):

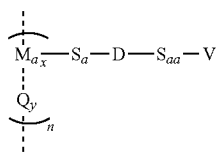
(Ie)

(where $M_a$ and Q each represent a monomer unit of the polymer and may be different from one another; Q is said one monomer unit or two or more different monomer units each represented by any of the formulae (QIII-1) to (QIII-17); $S_a$ and $S_{aa}$ each represent a spacer unit and may be different from one another; D represents a moiety that is photochemically crosslinkable; V represents a moiety that stabilizes a vertical alignment; x and y represent molar fractions of the monomer units in the polymer and satisfy $0 < x \leq 1$ and $0 \leq y < 1$; and n represents 4 to 100,000);

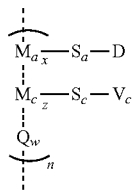
(Ij)

(where $M_a$, $M_c$, and Q each independently represent a monomer unit of the polymer; the order in which $M_a$, $M_c$, and Q are arranged may be the same as or different from that shown in the formula (Ij); Q is said one monomer unit or two or more different monomer units each represented by any of the formulae (QIII-1) to (QIII-17); x, z, and w represent molar fractions of the monomer units in the polymer and satisfy $0 < x < 1$, $0 < z < 1$, and $0 \leq w < 1$; $S_a$, $S_{aa}$, and $S_c$ each represent a spacer unit and may be different from one another; D represents a moiety that is photochemically crosslinkable; $V_c$ represents a moiety that stabilizes a vertical alignment; and n represents 4 to 100,000);

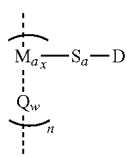
(Iq)

(where $M_a$ and Q each represent a monomer unit of the polymer and may be different from one another; Q is said one monomer unit or two or more different monomer units each represented by any of the formulae (QIII-1) to (QIII-17); $S_a$ represents a spacer unit; D represents a moiety that is photochemically crosslinkable; x and w represent molar fractions of the monomer units in the polymer and satisfy $0 < x \leq 1$ and $0 \leq w < 1$; and n represents 4 to 100,000).

15. The polymer for use in a liquid crystal vertical alignment layer according to claim 12, wherein the polymer contains a structural unit represented by general formula (Ik-1):

$$M_c\text{-}S_c\text{-}V_c \qquad (\text{Ik-1})$$

(where $M_c$ represents a monomer unit of the polymer; $S_c$ represents a spacer unit; and $V_c$ represents a moiety that stabilizes a vertical alignment).

16. The polymer for use in a liquid crystal vertical alignment layer according to claim 12, further comprising one monomer unit or two or more different monomer units each represented by a formula selected from the group consisting of the following formulae (QIII-1) to (QIII-17):

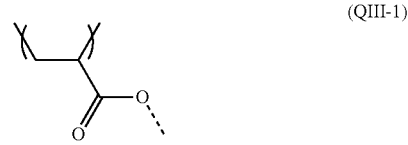
(QIII-1)

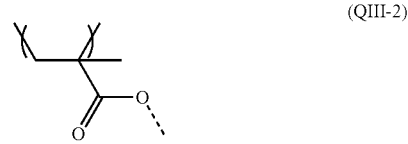
(QIII-2)

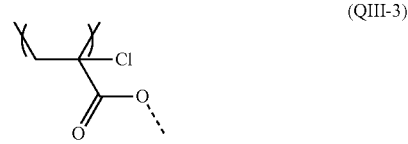
(QIII-3)

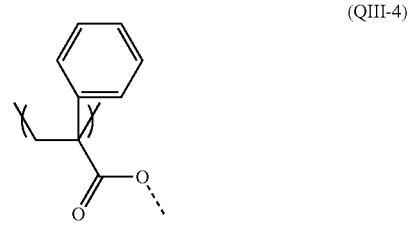
(QIII-4)

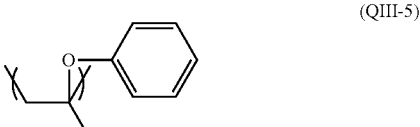
(QIII-5)

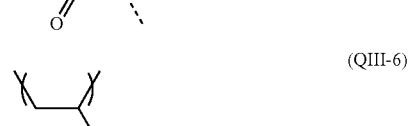
(QIII-6)

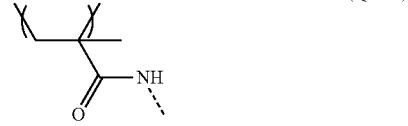
(QIII-7)

-continued

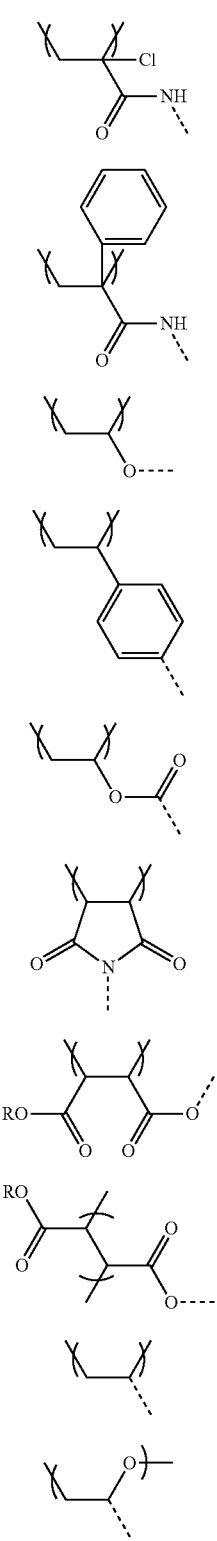

(QIII-8)

(QIII-9)

(QIII-10)

(QIII-11)

(QIII-12)

(QIII-13)

(QIII-14)

(QIII-15)

(QIII-16)

(QIII-17)

(where a broken line represents a bond to a monovalent organic group; R independently represents hydrogen or an alkyl group having 1 to 5 carbon atoms; any hydrogen in each structure may be substituted with a fluorine atom, a chlorine atom, a methyl group, or a methoxy group; and said monovalent organic group is hydrogen or an alkyl group having 1 to 12 carbon atoms (i) in which any hydrogen atom in the alkyl group may be substituted with a fluorine atom, a chlorine atom, a methyl group, or a methoxy group and (ii) in which one $CH_2$ group or two or more non-neighboring $CH_2$ groups in the alkyl group may be substituted with —O—, —CO—O—, —O—CO—, —CH=CH—, a trans-1,4-cyclohexylene group, a trans-1,3-dioxan-2,5-yl group, a 1,4-naphthylene group, a 2,6-naphthylene group, a 2,5-thiophenylene group, a 2,5-furanylene group, or 1,4-phenylene group in which any hydrogen of each group may be substituted with a fluorine atom, a chlorine atom, a methyl group, or a methoxy group), wherein the polymer contains a polymer represented by general formula (Ik):

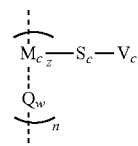

(Ik)

(where $M_c$ and Q each represent a monomer unit of the polymer and may be different from one another; Q is said one monomer unit or two or more different monomer units each represented by any of the formulae (QIII-1) to (QIII-17); $S_c$ represents a spacer unit; $V_c$ represents a moiety that stabilizes a vertical alignment; z and w represent molar fractions of the monomer units in the polymer and satisfy $0 < z \leq 1$ and $0 \leq w < 1$; and n represents 4 to 100,000).

17. The polymer for use in a liquid crystal vertical alignment layer according to claim 12, wherein the polymer having a moiety that is photochemically crosslinkable is a polymer having a group selected from groups represented by formulae (II-1) to (II-8):

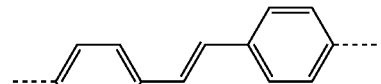

(II-1)

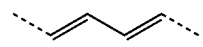

(II-2)

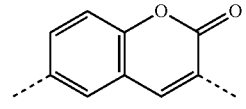

(II-3)

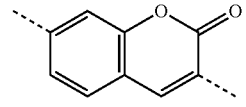

(II-4)

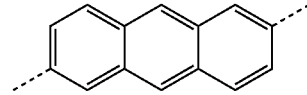

(II-5)

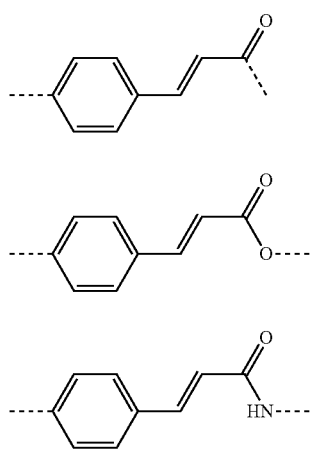

(where a broken line represents a bond to $S_a$, $S_{aa}$, $S_{aaa}$, $S_b$, or $S_{bb}$; any hydrogen atom in each structure may be substituted with a fluorine atom, a chlorine atom, a methyl group, or a methoxy group).

18. The polymer for use in a liquid crystal vertical alignment layer according to claim 2, wherein $M_a$, $M_b$, and $M_c$ each independently represent one of formulae (III-1) to (III-17):

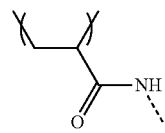

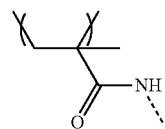

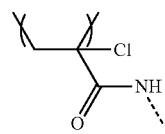

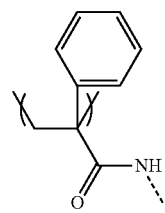

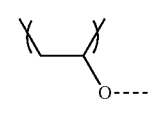

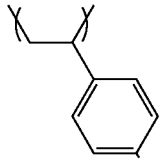

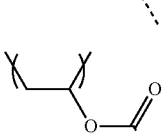

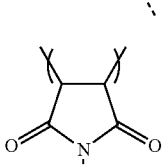

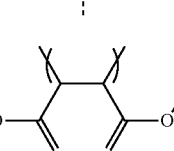

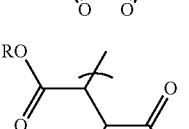

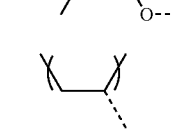

(III-17)

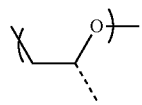

(where a broken line represents a bond to $S_a$, $S_b$, or $S_c$; R independently represents hydrogen or an alkyl group having 1 to 5 carbon atoms; and any hydrogen atom in each structure may be substituted with a fluorine atom, a chlorine atom, a methyl group, or a methoxy group).

19. The polymer for use in a liquid crystal vertical alignment layer according to claim 2, wherein $S_a$, $S_{aa}$, $S_{aaa}$, $S_b$, $S_{bb}$, and $S_c$ are each independently represented by general formula (IV) below:

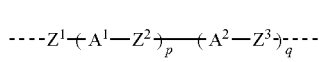

(where a broken line represents a bond to $M_a$, $M_b$, $M_c$, P, V, $V_a$, $V_b$, $V_c$, or D;

$Z^1$, $Z^2$, and $Z^3$ each independently represent a single bond, —(CH$_2$)$_u$—, —OCH$_2$—, —CH$_2$O—, —COO—, —OCO—, —CH=CH—, —CF=CF—, —CF$_2$O—, —OCF$_2$—, —CF$_2$CF$_2$—, or u represents 1 to 20, one or more non-neighboring CH$_2$ groups in an alkylene group may be independently substituted with —O—, —CO—, —CO—O—, —O—CO—, —Si(CH3)$_2$-O—Si(CH$_3$)$_2$—, —NR—, —NR—CO—, —CO—NR—, —NR—CO—O—, —O—CO—NR—, —NR—CO—NR—, —CH=CH—, or —O—CO—O—, and R independently represents hydrogen or an alkyl group having 1 to 5 carbon atoms;

$A^1$ and $A^2$ each independently represent a trans-1,4-cyclohexylene group, a trans-1,3-dioxan-2,5-diyl group, a 1,4-naphthylene group, a 2,6-naphthylene group, a 2,5-pyridyl group, a 2,5-pyrimidyl group, a 2,5-thiophenylene group, a 2,5-furanylene group, or a 1,4-phenylene group which may be unsubstituted or have one or more hydrogen atoms substituted with a fluorine atom, a chlorine atom, a methyl group, or a methoxy group; and p and q represent 0 or 1).

20. The polymer for use in a liquid crystal vertical alignment layer according to claim 2, wherein V, $V_a$, $V_b$, and $V_c$ are each independently represented by general formula (V) below:

(V)

---(-A³—Z⁴)ᵣ—(A⁴—Z⁵)ₛ—(A⁵—Z⁶)ₜ—(A⁶—Z⁷)_w—R²

(where a broken line represents a bond to $S_c$, $S_{aa}$, $S_{bb}$, or $S_{aaa}$;

$Z^4$, $Z^5$, $Z^6$ and $Z^7$ each independently represent a single bond, —(CH$_2$)$_u$—, —OCH$_2$—, —CH$_2$O—, —COO—, —OCO—, —CH=CH—, —CF=CF—, —CF$_2$O—, —OCF$_2$—, —CF$_2$CF$_2$—, or u represents 1 to 20, and one or more non-neighboring CH$_2$ groups in an alkylene group may be independently substituted with —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH=CH—, or —O—CO—O—, and R independently represents hydrogen or an alkyl group having 1 to 5 carbon atoms;

$A^3$, $A^4$, $A^5$, and $A^6$ each independently represent a trans-1,4-cyclohexylene group, a trans-1,3-dioxan-2,5-diyl group, a 1,4-naphthylene group, a 2,6-naphthylene group, a 2,5-pyridyl group, a 2,5-pyrimidyl group, a 2,5-thiophenylene group, a 2,5-furanylene group, or a 1,4-phenylene group which may be unsubstituted or have one or more hydrogen atoms substituted with a fluorine atom, a chlorine atom, a methyl group, or a methoxy group;

r, s, t, and w represent 0 or 1; and $R^2$ represents hydrogen, fluorine, chlorine, a cyano group, or an alkyl group having 1 to 20 carbon atoms (which may be substituted with fluorine or have one CH$_2$ group or two or more non-neighboring CH2 groups substituted with —O—, —CO—O—, —O—CO—, and/or —CH=CH—)).

21. The polymer for use in a liquid crystal vertical alignment layer according to claim 2, wherein P is represented by general formula (VI) below:

(VI)

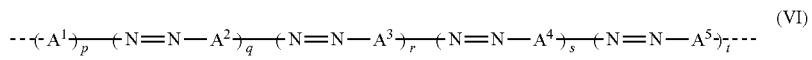

(where broken lines each represent a bond to $S_a$, $S_b$, $S_{aa}$, or $S_{aaa}$ but when the bond is formed only at one of the broken lines, the other broken line represents a bond to a hydrogen atom;

$A^1$, $A^2$, $A^3$, $A^4$, and $A^5$ each independently represent a 1,4-naphthylene group, a 2,6-naphthylene group, a 2,5-pyridyl group, a 2,5-pyrimidyl group, a 2,5-thiophenylene group, a 2,5-furanylene group, or a 1,4-phenylene group which may be unsubstituted or mono- or polysubstituted with a fluorine atom, a chlorine atom, a bromine atom, a methyl group, a methoxy group, a nitro group, a —NR$^1$R$^2$, or a linear or branched alkyl residue having 1 to 10 carbon atoms, where the alkyl residue is unsubstituted or mono- or polysubstituted with fluorine, one or more non-neighboring CH$_2$ groups may be independently substituted with Q representing —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH=CH—, —C≡C—, or —O—CO—O—, and R, R$^1$, and R$^2$ independently represent hydrogen or an alkyl group having 1 to 5 carbon atoms; and p, q, r, s, and t each independently represent 0 or 1 and 0<q+r+s+t).

22. The polymer for use in a liquid crystal vertical alignment layer according to claim 2, wherein D is represented by general formula (VII) below:

(VII)

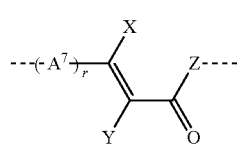

(where broken lines each represent a bond to $S_a$, $S_{aa}$, $S_{aaa}$, $S_b$, or $S_{bb}$ but when the bond is formed only at one of the broken lines, the other broken line represents a bond to a hydrogen atom;

$A^7$ each independently represent a 1,4-naphthylene group, a 2,6-naphthylene group, a 2,5-pyridyl group, a 2,5-pyrimidyl group, a 2,5-thiophenylene group, a 2,5-furanylene group, or a 1,4-phenylene group which may be unsubstituted or have one or more hydrogen atoms substituted with a fluorine atom, a chlorine atom, a methyl group, or a methoxy group;

X and Y each independently represent hydrogen, fluorine, chlorine, a cyano group, or an alkyl group having 1 to 20 carbon atoms (which may be substituted with fluorine or have one $CH_2$ group or two or more non-neighboring $CH_2$ groups substituted with —O—, —CO—O—, —O—CO—, and/or —CH=CH—);

Z represents a single bond, —O—, or —$NR^1$— (where $R^1$ represents hydrogen, a linear or branched C1-C20 alkyl group which may be substituted with fluorine or chlorine, or a 3- to 8-membered cycloalkyl group which may be substituted with fluorine, chlorine, an alkyl group, or an alkoxy group); and r represents 0, 1, or 2).

23. A liquid crystal vertical alignment layer using the polymer for use in a liquid crystal vertical alignment layer according to claim 1.

24. A liquid crystal display element comprising the liquid crystal vertical alignment layer according to claim 23.

\* \* \* \* \*